United States Patent
Fukuyama et al.

(10) Patent No.: US 7,123,798 B2
(45) Date of Patent: Oct. 17, 2006

(54) OPTICAL DEVICE AND METHOD OF PRODUCING THE SAME

(75) Inventors: Masashi Fukuyama, Inuyama (JP); Akiyoshi Ide, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/396,734

(22) Filed: Mar. 25, 2003

(65) Prior Publication Data

US 2004/0086231 A1    May 6, 2004

Related U.S. Application Data

(60) Provisional application No. 60/368,716, filed on Mar. 29, 2002, provisional application No. 60/368,542, filed on Mar. 29, 2002, provisional application No. 60/368,532, filed on Mar. 29, 2002.

(51) Int. Cl.
*G02B 6/30* (2006.01)

(52) U.S. Cl. .................... 385/49; 385/47; 385/48; 385/65

(58) Field of Classification Search ............ 385/15–18, 385/31, 38, 39, 44–52, 65, 83, 147, 33
See application file for complete search history.

(56) References Cited

U.S. PATENT DOCUMENTS

| | | | |
|---|---|---|---|
| 4,165,496 A | 8/1979 | Di Domenico, Jr. et al. | |
| 4,756,590 A | 7/1988 | Forrest et al. | |
| 4,989,338 A | 2/1991 | Tsuji et al. | |
| 5,497,438 A | 3/1996 | Ishikawa et al. | |
| 5,499,309 A * | 3/1996 | Kozuka et al. | 385/38 |
| 5,535,296 A | 7/1996 | Uchida | |
| 5,771,322 A | 6/1998 | Matsumoto et al. | |
| 5,793,106 A | 8/1998 | Yasukawa et al. | |
| 5,930,423 A * | 7/1999 | Chen et al. | 385/49 |
| 6,027,253 A | 2/2000 | Ota et al. | |
| 6,075,911 A | 6/2000 | Goto | |
| 6,118,915 A | 9/2000 | Sato | |
| 6,250,820 B1 | 6/2001 | Melchior et al. | |
| 6,304,708 B1 | 10/2001 | Fukuyama et al. | |
| 6,327,407 B1 | 12/2001 | Mitsuda et al. | |
| 6,344,248 B1 | 2/2002 | Suga | |
| 6,406,196 B1 | 6/2002 | Uno et al. | |
| 6,491,447 B1 | 12/2002 | Aihara | 385/92 |
| 6,507,680 B1 | 1/2003 | Nishimura et al. | 385/14 |
| 6,784,764 B1 | 8/2004 | Kadota et al. | |
| 6,793,410 B1 | 9/2004 | Nakanishi et al. | |

(Continued)

FOREIGN PATENT DOCUMENTS

EP    0 840 150 A2    5/1998

(Continued)

OTHER PUBLICATIONS

U.S. Appl. No. 10/952,387, filed Sep. 28, 2004, Fukuyama et al.

(Continued)

*Primary Examiner*—Phan T. H. Palmer
(74) *Attorney, Agent, or Firm*—Burr & Brown

(57) ABSTRACT

An optical fiber, which is provided in each of channels of an optical fiber array disposed on V-grooves, has a portion (reflecting section) at which a core is cut out at an intermediate position of the optical fiber. The reflected light, which is split from a signal light transmitted in the core of the optical fiber on the basis of a refractive index difference at the reflecting section, is obtained through a index matching layer provided outside a clad of the optical fiber. The reflected light is monitored by a photodetector of a photo-detecting array.

21 Claims, 45 Drawing Sheets

U.S. PATENT DOCUMENTS

| | | | |
|---|---|---|---|
| 6,819,840 | B1 | 11/2004 | Tohgoh et al. |
| 2003/0044119 | A1 | 3/2003 | Sasaki et al. |
| 2003/0095756 | A1 | 5/2003 | Tohgoh et al. |
| 2004/0042728 | A1 | 3/2004 | Ito et al. |

FOREIGN PATENT DOCUMENTS

| | | |
|---|---|---|
| EP | 0 908 746 A2 | 4/1999 |
| EP | 0 943 941 A1 | 9/1999 |
| EP | 1 063 542 A1 | 12/2000 |
| FR | 2 549 243 | 1/1985 |
| JP | 62-056908 | 3/1987 |
| JP | 63-191111 A | 8/1988 |
| JP | 63-205611 | 8/1988 |
| JP | 63-249118 | 10/1988 |
| JP | 64-42610 A | 2/1989 |
| JP | 2-15203 A | 1/1990 |
| JP | 2-96609 | 4/1990 |
| JP | 02-113708 | 4/1990 |
| JP | 3-103804 A | 4/1991 |
| JP | 03-271706 | 12/1991 |
| JP | 04-308804 | 10/1992 |
| JP | 05-203830 A1 | 8/1993 |
| JP | 06-075137 | 3/1994 |
| JP | 6-103821 A1 | 4/1994 |
| JP | 06-331837 | 12/1994 |
| JP | 7-104146 A | 4/1995 |
| JP | 07-104148 | 4/1995 |
| JP | 7-159658 A | 6/1995 |
| JP | 07-234345 | 9/1995 |
| JP | 07-294742 A1 | 11/1995 |
| JP | 8-179128 A1 | 7/1996 |
| JP | 08-179171 | 7/1996 |
| JP | 8-213427 | 8/1996 |
| JP | 09-021912 A1 | 1/1997 |
| JP | 9-033729 A1 | 2/1997 |
| JP | 09-061664 A1 | 3/1997 |
| JP | 09-101435 | 4/1997 |
| JP | 09-105824 A1 | 4/1997 |
| JP | 9-120014 | 5/1997 |
| JP | 09-186348 A1 | 7/1997 |
| JP | 10-062660 | 3/1998 |
| JP | 10-133054 | 5/1998 |
| JP | 10-186182 | 7/1998 |
| JP | 10-293219 | 11/1998 |
| JP | 10-300936 A | 11/1998 |
| JP | 10-307221 A1 | 11/1998 |
| JP | 10-325917 | 12/1998 |
| JP | 11-133255 A | 5/1999 |
| JP | 11-142690 | 5/1999 |
| JP | 2000-009953 | 1/2000 |
| JP | 2000-249874 A | 9/2000 |
| JP | 2000-347050 | 12/2000 |
| JP | 2001-100063 A1 | 4/2001 |
| JP | 2001-513216 | 8/2001 |
| JP | 2001-264594 A | 9/2001 |
| JP | 2002-182051 A | 6/2002 |
| JP | 2002-343983 | 11/2002 |
| JP | 2003-107301 A1 | 4/2003 |
| JP | 2003-156665 A1 | 5/2003 |
| JP | 2003-294992 A1 | 10/2003 |
| WO | WO97/06458 | 2/1997 |
| WO | 02/31547 | 4/2002 |

OTHER PUBLICATIONS

K. Motoki et al., "Connecting Technology of Anisotropic Conductive Materials," Fujikura Giho, No. 99, Oct. 2000, pp. 32-38 (with partial translation of pertinent portion thereof).

U.S. Appl. No. 11/156,315, filed Jun. 17, 2005, Fukuyama et al.
U.S. Appl. No. 11/156,324, filed Jun. 17, 2005, Fukuyama et al.
U.S. Appl. No. 11/156,298, filed Jun. 17, 2005, Fukuyama et al.
U.S. Appl. No. 11/288,936, filed Nov. 29, 2005, inventor Fukuyama et al.

* cited by examiner

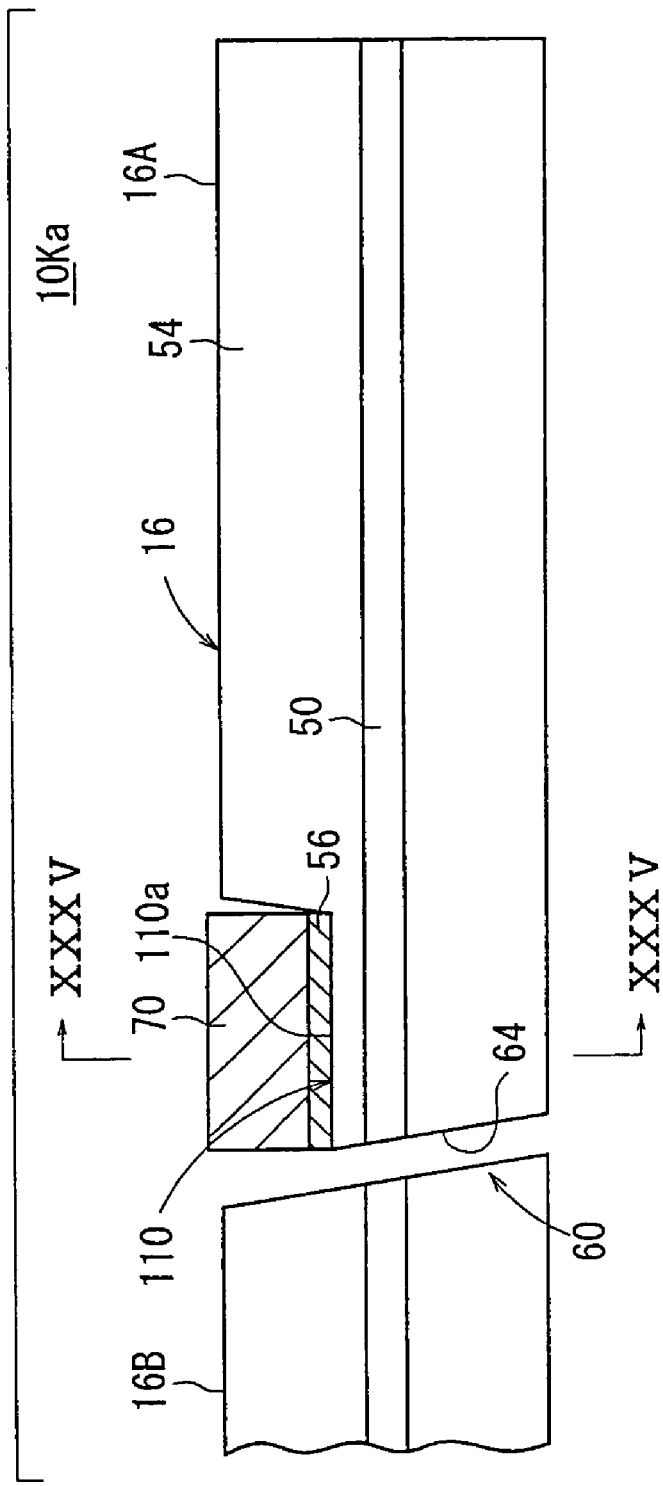

PRIOR ART

PRIOR ART

PRIOR ART

OPTICAL DEVICE AND METHOD OF PRODUCING THE SAME

BACKGROUND OF THE INVENTION

1. Field of the Invention

The present invention relates to an optical device having one optical fiber or a plurality of optical fibers (optical fiber array) and a method of producing the same. In particular, the present invention relates to an optical device which is preferably used when a signal light, which is transmitted through an optical fiber, is monitored at an intermediate position of the optical fiber, and a method of producing the same.

2. Description of the Related Art

Nowadays, a wavelength division multiplexing by an optical fiber amplifier has been developed. A quantity of light transmitted through an optical fiber is monitored at respective wavelengths in the wavelength division multiplexing. After a quantity of light monitored is adjusted, a quantity of light adjusted is amplified by the optical fiber amplifier to maintain an amplifier's characteristics.

A variety of methods are known for the monitoring. However, monitor devices are mounted for respective fibers. Therefore, an optical device is larger in size.

For this reason, it is demanded to realize a small size and a high density of the monitor device. Further, when the monitoring is performed, a part of the signal light is split from the optical fiber. However, it is demanded to monitor a signal light transmitted through the optical fiber without attenuation of the signal light.

A technique as shown in FIG. 42 has been hitherto disclosed (for example, see Japanese Laid-Open Patent Publication No. 2001-264594). In this technique, an optical fiber 204 is disposed on a V-groove 202 formed on a glass substrate 200, and then a parallel groove 206 is formed in the glass substrate 200 so that the parallel groove 206 extends obliquely across the optical fiber 204 (with respect to the optical axis of the optical fiber 204). As shown in FIG. 44, a member 208 for reflecting light (optical member) is inserted into the parallel groove 206, and a gap of the parallel groove 206 is filled with an ultraviolet-curable resin (adhesive) 210.

Accordingly, as shown in FIG. 43, a signal light 212 transmitted through the optical fiber 204 is reflected by the member 208 and a light component (reflected light) 214 of the signal light 212 is split outside a clad of the optical fiber 204. Therefore, when the reflected light 214 is detected, for example, by a photodetector 216, it is possible to monitor the signal light 212.

The conventional art is also disclosed as shown in FIG. 45 (for example, see Japanese Laid-Open Patent Publication No. 2001-264594). In this art, a groove 200 is provided on the upper surface of a glass substrate 202, and an optical fiber 204 is placed and fixed in the groove 204 of the glass substrate 202. An end surface 206 (inclined end surface) is formed by cutting with a dicing saw. Further, a reflector 208 of a metal film is stuck with a resin to the inclined end surface 206. A light-receiving element 210 is provided on the upper surface of the glass substrate 202.

Accordingly, a light component 214 having a specified wavelength, which is included in a signal light 212 transmitted through the optical fiber 204, is reflected by the reflector 208, and the light component 214 is split to the outside of the clad. Therefore, when the reflected light 214 is detected with the light-receiving element 216 disposed on the glass substrate 202, it is possible to monitor the signal light.

In the case of the conventional monitor device as shown in FIG. 42, the member 208 is a distinct optical member from the glass substrate 200 and the optical fiber 204 and is inserted into the parallel groove 206 provided to the glass substrate 200 and the optical fiber 204. Therefore, at first, it is necessary to position the member 208 accurately. However, when the adhesive 210 is injected into the gap, the position of the member 208 in the parallel groove 206 is shifted by the adhesive 210 and it is difficult to position the member 208 in the parallel groove 206.

Further, it is necessary to decide the width of the parallel groove 206 so that the member 208 is inserted into the parallel groove 206 and the adhesive 210 is injected into the gap of the parallel groove 206. Therefore, it is difficult to realize an optical device having a relatively small size. Further, the signal light 212 transmitted through the optical fiber 204 is greatly attenuated at the parallel groove 206.

If the width of the parallel groove 206 becomes narrower, it is possible to realize an optical device having a small size and to restrain the attenuation of the signal light 212. In this case, it is necessary to narrow the width of the member 208. As a result, the mechanical strength of the member 208 is insufficient and the optical device cannot be used due to the a cycle and a handling during producing the optical device.

The parallel groove 206 is formed between the top surface of the glass substrate 200 and the bottom surface the glass substrate 200. Therefore, if the width of the parallel groove 206 becomes narrower, the machining load to the glass substrate 200 is increased during the cutting and the machining accuracy and the surface accuracy of the parallel groove 206 are decreased.

In the case of the conventional monitor device as shown in FIG. 45, the light-receiving element 210 is installed directly on the glass substrate 202. Therefore, the distance, which ranges from the clad surface of the optical fiber 204 to the upper surface of the glass substrate 202 (especially the surface on which the light-receiving element 210 is installed), is lengthened in some cases, and the reflected light 214, which comes from the reflector 208, comes into the light-receiving surface of the light-receiving element 210 in an oblique direction in other cases.

The spot diameter of the reflected light 214 is increased exponentially as the optical path of the reflected light 214 is lengthened. Therefore, the spot diameter of the reflected light 214 is possibly larger than the diameter of the light-receiving surface of the light-receiving element 210, for example, when the light-receiving element 210 is installed outside the clad with a refractive index-adjusting layer.

In another case, when the reflected light 214 comes obliquely with respect to the light-receiving surface, the spot diameter of the reflected light 214 may also be larger than the diameter of the light-receiving surface of the light-receiving element 210. In such a situation, a part of the spot of the reflected light 214 may protrude from the light-receiving surface, which may result in the loss of the reflected light 214, and the light-receiving sensitivity may be lowered. In the case of an optical fiber array in which a plurality of optical fibers 204 are arranged, the so-called crosstalk may be caused, in which the reflected light 214 of a certain optical fiber 204 comes into the light-receiving element 210 corresponding to an adjacent optical fiber 204.

In view of the above, in order to solve the problem as described above, the angle of the end surface 206 of the glass substrate 202, i.e., the angle with respect to the vertical plane may be increased to decrease the angle of incidence into the light-receiving surface of the light-receiving element 210. However, when it is assumed that another optical part is installed on the end surface 206 of the glass substrate 202, the angle of inclination of the end surface cannot be increased extremely for the optical part to be connected to the optical fiber 204 in relation to the strength and the demand for the miniaturization.

Therefore, if the angle of the end surface 206 of the glass substrate 202 is increased, it is difficult to fix another optical part to the end surface 206 of the glass substrate 202. Further, the distance, which ranges from the end surface of the optical fiber 204 to the other optical part, is lengthened, and the signal light may be greatly attenuated.

If the light-receiving element is installed closely to the end surface 206 on the upper surface of the glass substrate 202, the following problem may arise. When another optical part is installed on the end surface 206 of the glass substrate 202, for example, the end surface 206 of the glass substrate 202 and the other optical part may be fixed with a UV adhesive or UV-curable adhesive. In such a case, the ultraviolet light is radiated from a position over the end surface 206 of the glass substrate 202 toward the end surface 206. However, as described above, if the light-receiving element 210 is installed closely to the end surface 206, the light-receiving element 210 interposes in the path of radiation of the ultraviolet light. The ultraviolet light may not be radiated onto the UV-curable adhesive sufficiently, and it is impossible to cure the adhesive.

In the conventional monitor device as described above, another optical part (optical waveguide path) may be joined to an end surface of the optical fiber of the monitor device, for example, with an adhesive.

However, if the adhesive is used, exfoliation or deterioration of the adhesive may be caused due to changes over time thereof. For example, if any exfoliation of the adhesive is caused on the end surface of the optical fiber, the following situation is assumed. Even when an angle at which the reflected light is not returned to the core is adopted as the angle of inclination of the end surface of the optical fiber, the reflected light may be returned to the core depending on the condition of the exfoliation surface of the adhesive (for example, the shape and the angle of the surface of the adhesive).

In such a situation, if the reflected light is returned to the core of the optical fiber, the reflected light harmfully affects on the light source or the like.

SUMMARY OF THE INVENTION

The present invention has been made taking the foregoing problems into consideration, an object of which is to provide an optical device and a method of producing the same in which it is possible to realize a small size of the optical device having the monitoring function and achieve a high density of an optical fiber array and it is possible to restrain the attenuation of signal lights.

Another object of the present invention is to provide an optical device wherein the optical device having the monitoring function can be easily joined to another optical part, it is possible to realize a high density of an optical fiber array installed in the optical device, and it is possible to suppress the attenuation of signal lights.

A further object of the present invention is to provide an optical device which makes it possible to maintain a stable joined state with respect to another optical part for a long period of time and which makes it possible to maintain a high monitoring efficiency, when the optical device with a monitoring function is joined to the other optical part.

According to the present invention, there is provided an optical device having a structure wherein a reflected light, which is acquired by a refractive index difference, is obtained through an index matching layer from an intermediate position of one or more optical fibers to the outside of a clad of the one or more optical fibers.

The following definitions are herein used. The intermediate position of the one or more optical fibers is a portion at which the reflected light is generated, which can be defined as "reflecting section". The meaning or concept of the reflecting section includes a portion at which a core of the one or more optical fibers is cut put. A portion of the one or more optical fibers, which ranges up to the reflecting section, is located at a backward position with respect to the reflecting section in view of the transmission of light when the reflecting section is considered to be the center. Therefore, the portion of the one or more optical fibers, which ranges up to the reflecting section, can be defined as "rear fibers". Similarly, a portion of the one or more optical fibers, which ranges frontwardly with respect to the reflecting section, can be defined as "front fibers".

The light component of the signal light transmitted through the core of the rear fibers except for the reflected light component reflected by the reflecting section comes into the front fibers, which is transmitted through the core of the front fibers.

The present invention utilizes the refractive index difference. Therefore, it is unnecessary to insert any distinct optical member into the reflecting section from the one or more optical fibers. It is enough that a layer (for example, an air layer or an adhesive), which has a refractive index different from the refractive index of the one or more optical fibers, is interposed. For example, it is enough that a layer, in which the refractive index difference between the layer and the one or more optical fibers is 10% or more, exists in the reflecting section. Specifically, the reflecting section, especially the portion cut out can be formed by a slit which extends from a surface of the clad of the one or more optical fibers to the core. Alternatively, the reflecting section, especially the portion cut out can be formed by closely opposing surfaces of two optical fibers.

As described above, in the present invention, in correlation with the fact that it is unnecessary to insert any distinct optical member into the reflecting section as well, it is possible to miniaturize the reflecting section and consequently miniaturize the optical device. Further, the rear fibers and the front fibers can be mounted substantially coaxially. Therefore, it is unnecessary to adjust the respective optical axes of the rear fibers and the front fibers, and it is possible to simplify the production steps.

In the optical device constructed as described above, it is preferable that an angle, which is formed by the reflected light with respect to an optical axis of the one or more optical fibers, is a total reflection angle of the reflected light at an interface of the clad with respect to the air. Accordingly, almost of the reflected light is not returned to the core of the rear fibers, and it is advanced toward the clad surface of the rear fibers. This results in the prevention of the return reflection light and the improvement in the monitor efficiency.

Assuming that the plane, which is perpendicular to the direction of transmission of the signal light through the one or more optical fibers, is the reference plane, the angle, which is formed by the reflecting section with respect to the reference plane, is 6° to 12° and more preferably 8° to 10°, for the following reason. That is, if the angle is less than 6°, a large amount of the reflected light may be returned to the rear fibers. If the angle is larger than 12°, the optical axis of the signal light component having been transmitted through the reflecting section may be deviated from the optical axis of the front fibers.

It is preferable that the length of the reflecting section in the direction of transmission of the signal light through the one or more optical fibers is not more than 50 μm. Considering the fact that the rear fibers and the front fibers are mounted substantially coaxially, the amount of deviation between the optical axis of the signal light component having been transmitted through the reflecting section and the optical axis of the front fibers depends on the length of the reflecting section as well. When the length is within the range as described above, the deviation between the optical axes is scarcely caused.

It is also preferable that a total reflection plane, which changes an optical path of the reflected light, is formed in the clad of the rear fibers.

The spot diameter of the reflected light is increased exponentially as the optical path of the reflected light is lengthened. Therefore, the following situation may be sufficiently considered. That is, the spot diameter of the reflected light is larger than the diameter of a light-receiving surface of a photodetector, for example, when an arrangement, in which the photodetector is mounted outside the clad with an index matching layer intervening therebetween, is adopted. In another case, when the reflected light comes obliquely with respect to the light-receiving surface, the spot diameter of the reflected light is also larger than the diameter of the light-receiving surface of the photodetector. In such a situation, a part of the spot of the reflected light may protrude from the light-receiving surface, which may result in the loss of the reflected light, and the sensitivity in photodetecting may be lowered. In the case of an optical fiber array in which one or more optical fibers are arranged, the so-called crosstalk may be caused, in which the reflected light of a certain optical fiber comes into the photodetector corresponding to an adjacent optical fiber.

However, when the total reflection plane, which changes the optical path of the reflected light, is formed in the clad of the rear fibers as described above, then it is possible to shorten the optical path of the reflected light, for example, the optical path from the reflecting section to the index matching layer, and it is possible to come the reflected light into the light-receiving surface of the photodetector perpendicularly. Accordingly, it is possible to reduce the crosstalk in the optical fiber array, it is possible to realize a high density of the optical fiber array, and it is possible to improve the sensitivity in photodetecting when the photodetector is mounted.

In the optical device constructed as described above, it is also preferable that a total reflection plane, which changes an optical path of the reflected light obtained through the index matching layer, is provided outside the one or more optical fibers. Also in this arrangement, it is possible to reduce the crosstalk in the optical fiber array, it is possible to realize a high density of the optical fiber array, and it is possible to improve the sensitivity in photodetecting when the photodetector is mounted.

When the total reflection plane, which is mounted outside the one or more optical fibers, is constructed, a member, into which the reflected light comes through the index matching layer and which has a refractive index higher than that of an air layer, is mounted on the one or more optical fibers. Accordingly, the total reflection plane can be constructed at the interface between the member and the air layer.

Alternatively, a mirror member may be mounted on the one or more optical fibers, and the reflection plane may be constructed with a surface of the mirror member.

The optical device according to the present invention has such a feature that a substrate, which has one or more V-grooves for placing the one or more optical fibers on one or more V-grooves, is provided; a photodetector is mounted at a portion of the one or more optical fibers from which the reflected light is split; and the photodetector is mounted on a wiring board supported by the substrate.

In this arrangement, it is also preferable that a recess is formed on the clad of the one or more optical fibers; and the photodetector is mounted on the recess. Accordingly, it is possible to shorten the distance from the reflecting section to the light-receiving surface of the photodetector, and it is possible to effectively reduce the crosstalk when the optical fiber array is constructed.

It is also preferable that a top of the one or more optical fibers is located at a position higher than an upper surface of the one or more V-grooves when the one or more optical fibers are fixed on the one or more V-grooves; and a depth, which ranges from the upper surface of the one or more V-grooves to a bottom of a portion at which the core is cut out, is 100 μm or less.

When the reflecting section is constituted by machining a slit having a narrow width, it is impossible to increase the cutting depth (machining depth) so much. If the machining depth is large, the machining accuracy and the surface state of the slit may be harmfully affected. Therefore, it is preferable that the machining depth is decreased as small as possible.

However, the one or more optical fibers are mounted on the one or more V-grooves. Therefore, if the machining is performed until the one or more optical fibers are cut, then the substrate is machined together therewith, and the machining load is increased. Accordingly, in the present invention, the top of the one or more optical fibers is located at the position higher than the upper surface of the one or more V-grooves, and the depth, which ranges from the upper surface of the one or more V-grooves to the bottom of the portion cut out, is 100 μm or less. Therefore, it is possible to reduce the load exerted on the machining of the slit.

In the optical device constructed as described above, it is also preferable that the substrate has side walls which project in the upper direction of the substrate and in parallel to the one or more V-grooves on both sides of a portion at which the one or more V-grooves are formed; and the wiring board is disposed on upper surfaces of the side walls so that the photodetector is opposite to the one or more optical fibers.

Usually, when the photodetector is mounted outside the one or more optical fibers, it is conceived that the photodetector, which is mounted on the wiring board, is mounted on the one or more optical fibers in consideration of the electric wiring. Even when the wiring board is simply mounted on the substrate in a state in which the photodetector is directed upwardly, the distance from the surface of the clad to the photodetector is lengthened. Specifically, the distance is a total of the distance between the one or more optical fibers and the wiring board, the thickness of the wiring board, and the distance from the wiring board to the light-receiving surface of the photodetector. Therefore, as described above, the loss of the reflected light and the crosstalk may be caused.

However, in the present invention, when the wiring board is placed on the upper surfaces of the side walls of the substrate, the wiring board is placed while directing the photodetector to the one or more optical fibers. Therefore, it is possible that the light-receiving surface of the photodetector is disposed closely to the clad surface of the one or more optical fibers. It is possible to effectively improve the sensitivity in photodetecting and reduce the crosstalk.

When the photodetector is mounted on the one or more optical fibers, it is necessary that the photodetector is positioned at the portion from which the reflected light is split. On this condition, no serious problem arises when one optical fiber and one photodetector are used. However, for example, when the photodetectors are mounted for respective optical fibers of an optical fiber array arranged with eight or more optical fibers respectively, it is difficult to position the respective photodetectors. However, the photodetectors can be positioned with ease with respect to the respective optical fibers of the optical fiber array by arranging and mounting the photodetectors in an array form on the wiring board corresponding to the arrangement of the one or more optical fibers, and placing the wiring board on the upper surfaces of the side walls of the substrate. It is possible to improve the positioning accuracy and shorten the time required for the positioning operation.

In the optical device constructed as described above, it is preferable that the substrate has a recess which is formed at a portion corresponding to reflecting section of the one or more optical fibers, which has a depth ranging at least from a surface of the core to a bottom of the reflecting section (especially the portion at which the core is cut out), and which is formed between both sides of the substrate.

When the reflecting section is formed in the one or more optical fibers, it is conceived that a slit, which cuts the core, is formed in the one or more optical fibers. The following technique is conceived as a method of forming the slit. That is, one or more optical fibers are fixed on the one or more V-grooves of the substrate respectively, and then the slits are formed in the one or more optical fibers from the upper surface of the substrate, for example, by using a dicing machine.

In this technique, when the one or more V-grooves exist at a position lower than the upper surface of the substrate, it is necessary to cut the side portion of the substrate in the depth direction until the cutter of the dicing machine arrives at the one or more optical fibers. When the distance from the upper surface of the substrate to the one or more V-grooves is long, it is also necessary to increase the cutting amount in the depth direction for the side portion of the substrate corresponding thereto. This results in the increase in machining load. The machining accuracy and the surface accuracy of the slit to be formed in the one or more optical fibers may be deteriorated.

However, in the present invention, the substrate has the recess which is formed at the portion corresponding to the reflecting section of the one or more optical fibers, which has the depth ranging at least to the bottom of the portion cut out, and which is formed between both sides of the substrate. Therefore, the one or more optical fibers can be cut directly without cutting the side walls of the substrate with the dicing machine. The slit, which is excellent in machining accuracy and surface accuracy, can be provided in the one or more optical fibers.

According to another aspect of the present invention, there is provided a method of producing an optical device comprising the steps of fixing one or more optical fibers on one or more V-grooves of a substrate; applying an adhesive to be used as an index matching layer, to part of a surface of the one or more optical fibers; and forming a slit in part of the optical fiber so that the slit cuts at least a core.

Accordingly, it is possible to realize the high density and the miniaturization of the optical device having the structure wherein the reflected light, which is acquired by utilizing the difference in refractive index, is obtained through the index matching layer from an intermediate position of one or more optical fibers to the outside each clads of the one or more optical fibers, i.e., the monitor device. Further, it is possible to easily manufacture the optical device which makes it possible to restrain the attenuation of the signal light.

In the production method described above, it is preferable that the substrate has a recess which is formed at a portion corresponding to a portion of the one or more optical fibers for forming the slit, the recess having a depth ranging at least to a bottom of the slit, and being formed between both sides of the substrate.

Accordingly, the slit, which is superior in machining accuracy and surface accuracy, can be provided in the one or more optical fibers. In this procedure, for example, if the bottom of the recess is adjusted to the bottom of the one or more V-grooves, a structure is given, in which no V-groove exists at the portion corresponding to the recess, giving a state in which a portion of the one or more optical fibers corresponding to the recess is floated. However, when the adhesive, which is used as the index matching layer, is applied to the part of the surface of the one or more optical fibers prior to the formation of the slit in the one or more optical fibers, a state is given, in which the one or more optical fibers are coated with the adhesive. Accordingly, the floated state as described above disappears. Therefore, the one or more optical fibers are not fluctuated in the formation of the slit to be performed thereafter. Thus, the slit can be formed highly accurately.

In the production method described above, it is also preferable that the one or more optical fibers are fixed to the one or more V-grooves such that the one or more optical fibers are placed on the one or more V-grooves and then a plate is placed on the substrate to fix the one or more optical fibers to the one or more V-grooves with an adhesive supplied to a space between the plate and the substrate.

Accordingly, when the one or more optical fibers are fixed to the one or more V-grooves, the one or more optical fibers can be fixed with the adhesive while pressing the one or more optical fibers against the one or more V-grooves by using the plate. It is possible to reliably fix the one or more optical fibers to the one or more V-grooves.

It is also preferable that the adhesive, which is used as the index matching layer, is applied to the part of the surface of the one or more optical fibers by placing a temporary plate on the one or more optical fibers fixed on the one or more V-grooves and supplying the adhesive to a space between the temporary plate and the substrate, and then the temporary plate is removed.

In this procedure, the adhesive, which is used as the index matching layer, can be applied to only the necessary portion of the one or more optical fibers while holding the one or more optical fibers onto the one or more V-grooves.

In the production method described above, it is also preferable that the method further comprises the steps of fixing a total reflection member having a refractive index higher than at least that of an air layer by the adhesive to be used as the index matching layer on the one or more optical fibers after forming the slit in the part of the one or more optical fibers; and applying a second adhesive to be used as another index matching layer on the total reflection member.

Accordingly, it is possible to easily manufacture the optical device having the total reflection plane which is disposed outside the one or more optical fibers and which changes the optical path of the reflected light obtained through the index matching layer, i.e., the optical device which makes it possible to improve the sensitivity in photodetecting and which makes it possible to reduce the crosstalk.

It is also preferable that the method further comprises the step of positioning and fixing a photodetector on the adhesive to be used as the index matching layer or a second adhesive. Accordingly, it is easy to perform the positioning of the photodetector on the one or more optical fibers, the positioning of the total reflection member on the one or more optical fibers, and the positioning of the photodetector on the total reflection member. It is possible to efficiently introduce the reflected light into the photodetector.

It is also preferable that the step of positioning and fixing the photodetector is performed such that an adhesive is applied to upper surfaces of side walls rising on both sides of a V-groove-formed portion of the substrate, and then a wiring board, on which the photodetector is previously mounted, is placed on the upper surfaces of the side walls with the photodetector being directed to the one or more optical fibers.

According to the present invention, there is provided an optical device comprising one or more optical fibers, an end surface of each of which has a reflecting function; an optical element which is installed at a position outside a clad of the optical fiber on an optical path of a reflected light generated by the reflecting function; and means for allowing the reflected light to come into the optical element at a proper angle.

In this arrangement, the other light components of a signal light transmitted through a core of the optical fiber, from which the reflected light component reflected by the end surface of the optical fiber is excluded, come into, for example, another optical part which is joined to the downstream stage of the optical device.

In the present invention, the reflected light from the end surface of the optical fiber comes into the optical element at a proper angle. Therefore, for example, a part of the spot of the reflected light does not protrude from the optical element.

In particular, even when the position of installation of the optical element is located far from the end surface of the optical fiber, the reflected light will come into the optical element at a proper angle by the means described above. Therefore, it is possible to install the optical element at a position spaced from the end surface of the optical fiber. As a result, for example, when it is assumed that a UV-curable adhesive interposes between the end surface of the optical fiber and the other optical part arranged at the downstream stage thereof, the ultraviolet light is sufficiently radiated onto the UV-curable adhesive when the ultraviolet light is radiated onto the end surface of the optical fiber from a position thereover. Therefore, it is possible to join by the UV-curable adhesive.

It is also preferable that the reflecting function has a reflective film which is formed on the end surface of the optical fiber and which reflects a light component having a specified wavelength. The reflective film is a so-called HR coated film, which is constituted, for example, by a multilayer film of tantalum oxide and silicon oxide. It is possible to arbitrarily set the quantity of reflected light and the quantity of transmitted light by arbitrarily setting the structure of the film.

It is also preferable that the means has a total reflection plane which is formed in the clad of the optical fiber and which changes the optical path of the reflected light. In this arrangement, for example, when an oblique slit is provided at an arbitrary position in the clad with respect to the position of reflection on the end surface of the optical fiber, the reflected light is further reflected by the portion of the slit. When the angle of the oblique slit is set so that the total reflection occurs, for example, with respect to air, it is possible for the light to perpendicularly come into the optical element without attenuating the quantity of light. As a result, it is possible to reduce the crosstalk in the optical fiber array, it is possible to realize a high density of the optical fiber array, and it is possible to improve the light-receiving sensitivity when a light-receiving element is installed as the optical element.

In the optical device constructed as described above, it is also preferable that a refractive index-adjusting layer is formed at least on a portion of a surface of the optical fiber from which the reflected light is split; and the means has a total reflection plane which is installed outside the optical fiber and which changes the optical path of the reflected light split through the refractive index-adjusting layer.

Also in this arrangement, it is possible to reduce the crosstalk in the optical fiber array, it is possible to realize a high density of the optical fiber array, and it is possible to improve the light-receiving sensitivity when a light-receiving element is installed as the optical element.

When the total reflection plane is installed outside the optical fiber, a member is installed on the optical fiber, into which the reflected light comes through the refractive index-adjusting layer and which has a refractive index higher than that of an air layer. Accordingly, the total reflection plane can be constructed by the interface between the member and the air layer. Further, the optical element can be located spaced from the end surface of the optical fiber, which is advantageous when the fixation is effected together with another optical part with a UV-curable adhesive.

It is also preferable that a mirror member is installed on the optical fiber, and the reflection plane is constituted by a surface of the mirror member.

It is also preferable that the means has a waveguide member which is installed outside the optical fiber and which waveguides the reflected light to come through the refractive index-adjusting layer to the optical element. Also in this arrangement, the optical element can be located far from the end surface of the optical fiber, which is advantageous when the fixation is effected together with another optical part with a UV-curable adhesive.

In the optical device constructed as described above, it is also preferable that another optical part is secured to the end surface of the optical fiber having the reflecting function with an adhesive having a refractive index-adjusting function.

In the optical device constructed as described above, it is also preferable that the optical device further comprises a base on which a V-groove or V-grooves for placing the one or more optical fibers thereon are formed; wherein the optical element is mounted on a wiring board which is supported by the base; and an end surface of the base, which corresponds to the end surface of the optical fiber, is inclined at substantially the same angle as that of the end surface of the optical fiber.

In the optical device constructed as described above, it is also preferable that a recess is formed on the clad of the optical fiber; and the optical element is installed on the recess. Accordingly, it is possible to shorten the distance from the end surface of the optical fiber to the optical element, and it is possible to effectively reduce the crosstalk when an optical fiber array is constructed.

In the optical device constructed as described above, it is also preferable that the base has side walls which are formed in an integrated manner and which rise on both sides of a portion for forming the V-groove or V-grooves; and the wiring board is placed on upper end surfaces of the side walls with the optical element being directed to the optical fiber.

Usually, when the optical element is installed outside the optical fiber, the optical element mounted on the wiring board may be installed on the optical fiber in consideration of the electric wiring. Even when the wiring board is simply installed on the base in which the optical element is directed upwardly, the distance from the surface of the clad to the optical element is long. Specifically, the distance is a total of the distance between the optical fiber and the wiring board, the thickness of the wiring board, and the distance from the wiring board to the optical element. Therefore, as described above, the loss of the reflected light and the crosstalk may be caused.

However, in the present invention, when the wiring board is placed on the upper end surfaces of the side walls of the base, the wiring board is placed while directing the optical element to the optical fiber. Therefore, it is possible that the optical element is disposed closely to the clad surface of the optical fiber. It is possible to improve the light-receiving sensitivity when the optical element is a light-receiving element, and it is possible to effectively reduce the crosstalk.

When the optical element is installed on the optical fiber, it is necessary that the optical element is positioned at the portion from which the reflected light is split. On this condition, no serious problem arises when one optical fiber and one optical element are used. However, for example, when the optical elements are installed for eight or more optical fibers of an optical fiber array arranged, respectively, it is difficult to position the respective optical elements. However, the optical elements can be positioned with ease with respect to the respective optical fibers of the optical fiber array by arranging and mounting the optical elements in an array form on the wiring board corresponding to the arrangement of the optical fibers, and placing the wiring board on the upper end surfaces of the side walls of the base. It is possible to improve the positioning accuracy and shorten the time required for the positioning operation.

According to the present invention, there is provided an optical device provided with a waveguide path of another optical part, the waveguide path being disposed at least on a core end surface of each of one or more optical fibers, an air layer being interposed between the waveguide path and the core end surface.

Accordingly, the air layer rather than an adhesive is interposed between the other optical part and at least the core end surface of each of the one or more optical fibers. Because of this feature, it is unnecessary to consider, for example, the exfoliation of the adhesive caused by changes over time and the deterioration of the adhesive itself. Therefore, it is possible to maintain a stable joining with respect to another optical part for a long period of time.

In the optical device constructed as described above, it is also preferable that the optical device further comprises a substrate having one or more V-grooves formed thereon for placing the optical fiber or optical fibers thereon; and a base on which both of the substrate and the other optical part are fixed. That is, when both of the substrate having the optical fiber placed on the V-groove and the other optical part are fixed on the base, it is possible for the air layer to be interposed between at least the core end surface of each of the one or more optical fibers and the other optical part.

In the optical device constructed as described above, it is also preferable that the optical device further comprises a substrate having one or more V-grooves formed thereon for placing the one or more optical fibers thereon; wherein a portion of an end surface of the substrate except for at least the core end surface of each of the one or more optical fibers and the other optical part are fixed by a securing member. Also in this arrangement, the air layer can be interposed between at least the core end surface of each of the one or more optical fibers and the other optical part. The securing member may be either an adhesive or a welding member.

In the optical device constructed as described above, it is also preferable that the optical device is structured so that a reflected light acquired by utilizing a difference in refractive index with respect to the air layer is obtained at least from the core end surface of each of the one or more optical fibers to the outside of a clad of the optical fiber through a refractive index-adjusting layer.

In this arrangement, it is unnecessary to consider, for example, the exfoliation of the adhesive caused by changes over time and the deterioration of the adhesive itself at least on the core end surface of the one or more optical fibers. Therefore, it is possible to maintain a high monitoring efficiency for a long period of time.

In the optical device constructed as described above, it is also preferable that the optical device further comprises an optical element which is installed at a position outside the clad of the optical fiber on an optical path of the reflected light; and means for allowing the reflected light to come into the optical element at a proper angle.

In this arrangement, the light components of a signal light transmitted through a core of the optical fiber without the reflected light component reflected by at least the core end surface of the optical fiber, come into the other optical part which is joined to the core end surface with the air layer interposed.

In the present invention, the reflected light at least from the core end surface of the optical fiber comes into the optical element at a proper angle. Therefore, a problem such as a protrusion of a part of the spot of the reflected light from the optical element will not arise.

In particular, even when the position of installation of the optical element is spaced from the end surface of the optical fiber, the reflected light comes into the optical element at a proper angle by the means described above. Therefore, it is possible to install the optical element at a position spaced from the end surface of the optical fiber. As a result, for example, when it is assumed that a UV adhesive or UV-curable adhesive is used to fix the portion of the end surface of the substrate except for at least the core end surface of each of the one or more optical fibers and the other optical part, the ultraviolet light is sufficiently radiated onto the UV-curable adhesive from above. Therefore, it is possible to fix the other optical part by the UV-curable adhesive.

It is also preferable that an end surface of the substrate, which corresponds at least to the core end surface of each of the one or more optical fibers, is inclined at substantially the same angle as that of the core end surface.

In the optical device constructed as described above, it is also preferable that the optical element is mounted on a wiring board; the substrate has side walls which are formed integrally and which rise on both sides of a portion for forming the V-groove or V-grooves; and the wiring board is placed on upper end surfaces of the side walls with the optical element facing the optical fiber.

Usually, when the optical element is installed outside the optical fiber, it is conceived that the optical element mounted on the wiring board is installed on the optical fiber in consideration of the electric wiring. When the wiring board is simply installed on the base, in which the optical element is directed upwardly, the distance from the surface of the clad to the optical element is long. Specifically, the distance is a total of the distance between the optical fiber and the wiring board, the thickness of the wiring board, and the distance from the wiring board to the optical element. Therefore, as described above, the loss of the reflected light and the crosstalk may be caused.

However, in the present invention, when the wiring board is placed on the upper end surfaces of the side walls of the base, the wiring board is placed while directing the optical element to the optical fiber. Therefore, it is possible that the optical element is disposed closely to the clad surface of the optical fiber. It is possible to improve the sensitivity in photodetecting when the optical element is a photodetector, and it is possible to effectively reduce the crosstalk.

When the optical element is installed on the optical fiber, it is necessary that the optical element is positioned at the portion from which the reflected light is obtained. On this condition, no serious problem arises when one optical fiber and one optical element are used. However, for example, when the optical elements are installed for eight or more optical fibers of an optical fiber array arranged, respectively, it is difficult to position the respective optical elements. However, the optical elements can be positioned with ease with respect to the respective optical fibers of the optical fiber array by arranging and mounting the optical elements in an array form on the wiring board corresponding to the arrangement of the optical fibers, and placing the wiring board on the upper end surfaces of the side walls of the base. It is possible to improve the positioning accuracy and shorten the time required for positioning operation.

It is also preferable that the means for allowing the reflected light to come into the optical element at a proper angle may have a total reflection plane which is formed in the clad of the optical fiber and which changes the optical path of the reflected light. In this arrangement, for example, when an oblique slit is formed at an arbitrary position in the clad with respect to the position of reflection on the end surface of the optical fiber, the reflected light is further reflected by the portion of the slit. When the angle of the oblique slit is set so that the total reflection occurs, for example, with respect to the air, the light will also be able to come into the optical element perpendicularly without decreasing the quantity of light. As a result, it is possible to reduce the crosstalk in the optical fiber array, it is possible to realize a high density of the optical fiber array, and it is possible to improve the sensitivity in photodetecting when a photodetector is installed as the optical element.

In the optical device constructed as described above, it is also preferable that a refractive index-adjusting layer is formed at least on a portion of a surface of the optical fiber from which the reflected light is obtained; and the means has a total reflection plane which is installed outside the optical fiber and which changes the optical path of the reflected light obtained through the refractive index-adjusting layer.

Also in this arrangement, it is possible to reduce the crosstalk in the optical fiber array, it is possible to realize a high density of the optical fiber array, and it is possible to improve the sensitivity in photodetecting when a photodetector is installed as the optical element.

For the total reflection plane outside the optical fiber, a member is installed on the optical fiber. The reflected light comes into the member through the refractive index-adjusting layer, and the member has a refractive index higher than that of an air layer. Accordingly, the total reflection plane can be constructed by the interface between the member and the air layer. Further, the position of installation of the optical element can be spaced from the end surface of the optical fiber, which is advantageous when the substrate and another optical part are fixed with a UV-curable adhesive.

It is also preferable that a mirror member is installed on the optical fiber, and the reflection plane is constituted by a surface of the mirror member.

It is also preferable that the means has a waveguide member outside the optical fiber. The waveguide member waveguides the reflected light coming through the refractive index-adjusting layer to the optical element. Also in this arrangement, the position of installation of the optical element can be spaced from the end surface of the optical fiber, which is advantageous when the substrate and another optical part are fixed with a UV-curable adhesive.

In the optical device constructed as described above, it is also preferable that a recess is formed on the clad of the optical fiber; and the optical element is installed on the recess. Accordingly, it is possible to shorten the distance from at least the core end surface of the optical fiber to the optical element, and it is possible to effectively reduce the crosstalk when an optical fiber array is constructed.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 33 is a sectional view illustrating a first specified embodiment of the optical device according to the eleventh embodiment as viewed from a side position;

DETAILED DESCRIPTION OF THE INVENTION

Illustrative embodiments of the optical device and the method of producing the same according to the present invention will be explained below with reference to FIGS. 1 to 41.

Figure 1:
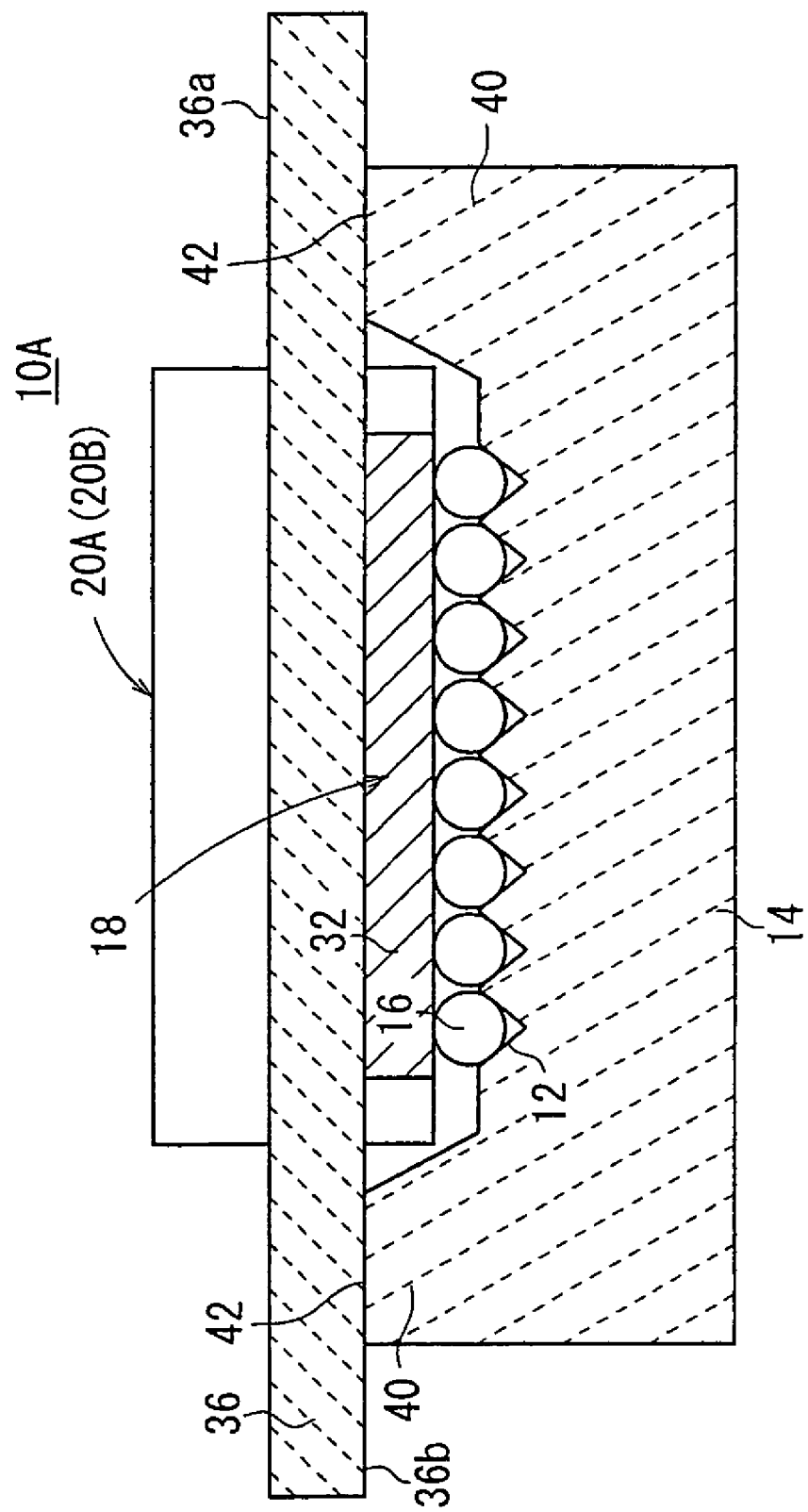
FIG. 1 is a sectional view illustrating an optical device according to a first embodiment as viewed from a front position.
Figure 2:
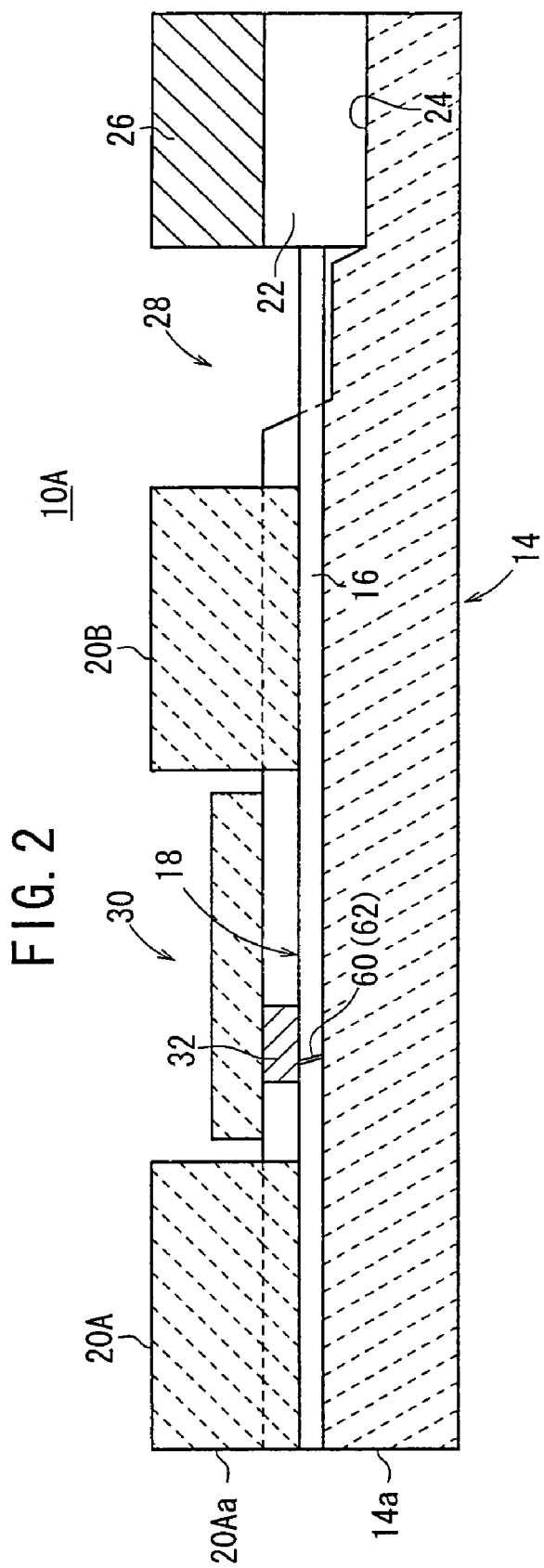
FIG. 2 is a sectional view illustrating the optical device according to the first embodiment as viewed from a side position.

At first, as shown in FIGS. 1 and 2, an optical device 10A according to a first embodiment has a substrate 14 including a plurality of (eight, in the illustrated embodiment) V-grooves 12 which are formed in parallel on the upper surface of the substrate 14. A plurality of optical fibers 16 is fixed on the V-grooves 12. That is, an optical fiber array 18, which comprises the plurality of optical fibers 16 arranged on the V-grooves 12, is fixed on the substrate 14.

Two plates (first and second plates 20A, 20B) for holding the optical fiber array 18 are secured on the optical fiber array 18 so that the optical fiber array 18 is fixed onto the V-grooves 12 by the two plates 20A, 20B. The first plate 20A is fixed on the optical fiber array 18 so that an end surface 20Aa of the first plate 20A is substantially flush with an end surface 14a of the substrate 14. The second plate 20B is fixed on the optical fiber array 18 so that the second plate 20B is at a distance from the first plate 20A.

A surface 24 for disposing a sheath 22 is formed on a portion of the upper surface of the substrate 14 on which the V-grooves 12 are not formed. The sheath 22 for covering a portion of the optical fiber array 18 is provided on the surface 24. A holder 26 for fixing the sheath 22 of the optical fiber array 18 onto the surface 24 is disposed on the surface 24. When the sheath 22 is held by the holder 26, it is possible to avoid problems such that the optical fiber array 18 disposed on the V-grooves 12 comes out of the optical device 10A and such that a fiber core of respective optical fibers 16 in the sheath 22 is bent by the sheath 22. An open section 28 is between the second plate 20B and the sheath 22. A portion of the optical fiber array 18 is exposed outside the optical device 10A by the open section 28.

Figure 3:
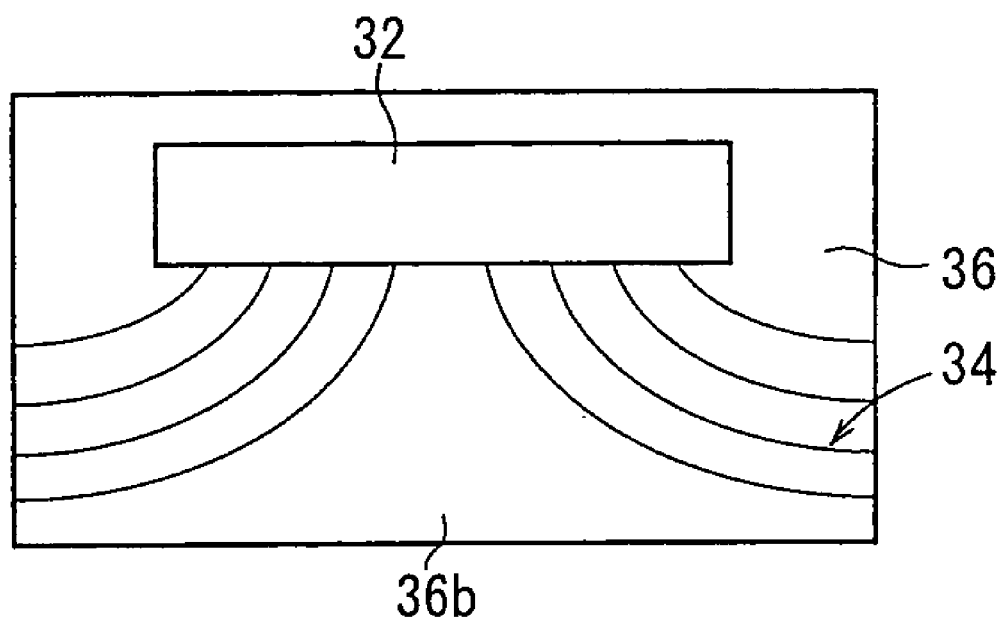
FIG. 3 is a view illustrating a wiring board on which a photodetecting array is mounted.

A monitor section 30 is interposed between the first and second plates 20A and 20B, respectively. A photodetecting array 32 is provided into the monitor section 30 so that part of respective signal lights transmitted from the left of the optical fiber array 18 to the right of the optical fiber array 18 (see FIG. 4) are split from the signal lights and are detected, for example, by the photodetecting array 32. The photodetecting array 32 has a plurality of photodetectors which are arranged at substantially the same pitches as the pitches between the optical fibers 16 of the optical fiber array 18. As shown in FIG. 3, the photodetecting array 32 is mounted on a wiring board 36 which has wiring patterns 34 formed on the surface of the wiring board 36.

The substrate 14 has side walls 40 which project in the upper direction of the substrate 14 and in parallel to the V-grooves 12 on both sides of the portion at which the V-grooves 12 are formed. The wiring board 36 is disposed on the upper surfaces 42 of the side walls 40 so that the photodetecting array 32 is opposite to the optical fiber array 18.

Figure 4:
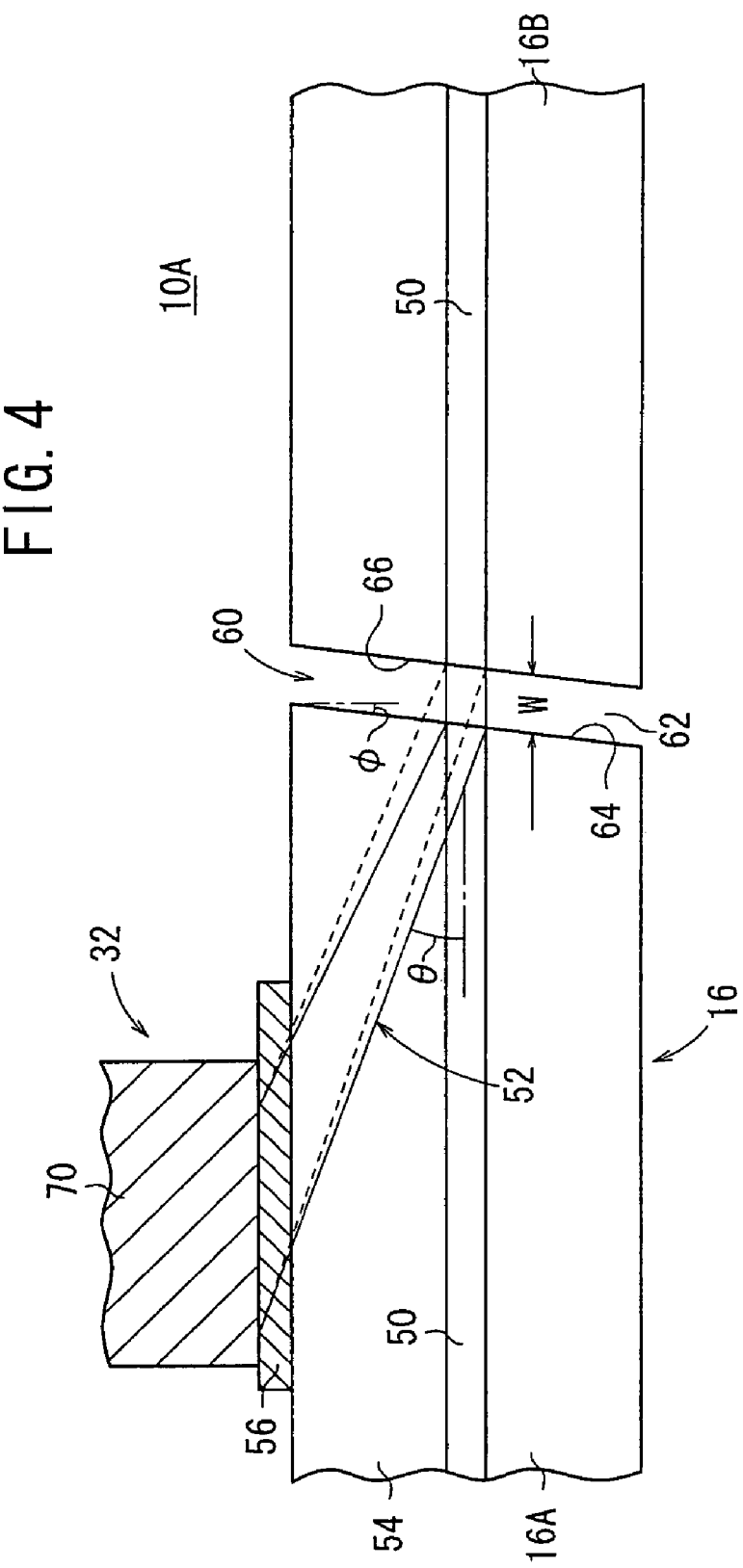
FIG. 4 is a magnified view illustrating a monitor section of the optical device according to the first embodiment.

As shown in a magnified view in FIG. 4, the optical device 10A according to the first embodiment has the following structure. That is, a portion of a fiber core (hereinafter referred to as "core 50") of respective optical fibers 16 (see FIG. 1) is cut out. A reflected light 52 is split from the signal light at the portion of the core 50 cut out due to the difference between a refractive index of the portion of the core 50 cut out and a refractive index of the core 50 and exits through a clad 54 of the optical fibers 16 and an index matching layer 56 provided outside the clads 54.

The following terms are herein defined. The portion, at which the core 50 of the optical fibers 16 is cut out, is a portion at which the reflected light 52 is generated, accordingly, the portion is defined as a reflecting section 60. The reflected light 52 generated in the reflecting section 60 exits outside of the clad 54 through the layer 50. Therefore, the optical device 10A can be used, for example, for monitoring the quantity of the signal light.

A portion between the left of the optical fibers 16 and the reflecting section 60 is defined as rear fiber 16A in which the signal light is transmitted from the left of the optical fibers 16 toward the reflecting section 60 and which is located at the rear of the reflecting section 60 in view of the transmission of signal light. Similarly, A portion between the reflecting section 60 and the right of the optical fibers 16 is defined as front fiber 16B in which part of the signal light is transmitted from the reflecting section 60 toward the right of the optical fibers 16 and which is located at the front of the reflecting section 60 in view of the transmission of signal light.

The signal light transmitted through the core 50 of the rear fiber 16A is split into a reflected light component of the reflected light 52 and a signal light component of a signal light excluded the reflected light component from the signal light transmitted through the core 50 of the rear fiber 16A at the reflecting section 60. The signal light component comes into the core 50 of the front fiber 16B and transmit into the core 50 of the front fiber 16B.

The reflecting section 60 may be formed as, for example, a slit 62 in the optical fibers 16. In this arrangement, the air layer contacts with the surface of the rear fiber 16A at the reflecting section 60 (hereinafter referred to as "rear reflecting surface 64") and the surface of the front fiber 16B at the reflecting section 60 (hereinafter referred to as "front reflecting surface 66"). The air layer has an refractive index of 1. Therefore, it is possible to obtain the reflected light 52 sufficient for monitoring the signal light 52.

The reflecting section 60 may be also formed by closely opposing surfaces of two optical fibers disposed on a V-groove instead of the slit 62 as described above. The reflecting section 60 may be also formed by filling an adhesive to be unnecessary the air layer between the rear reflecting surface 64 and the front reflecting surface 66. The adhesive has a large relative index difference with respect to the core 50.

An angle (hereinafter referred to as "reflecting angle $\theta$") of the reflected light 52 to the optical axis of the optical fibers 16, is preferably an angle at which a total reflection of the reflected light 52 occurs on the interface between the clad 54 and the air. If the layer 56 is not provided outside the clad 54, the angle at which a total reflection of the reflected light 52 occurs on an interface of the clad 54, is an angle at which a total reflection of the reflected light 52 occurs on an interface of the clad 54. Accordingly, most of the reflected light 52 is not returned to the core 50 of the rear fiber 16A, and is transmitted toward the interface of the clad 54 of the rear fiber 16A. This results in the prevention of the return of reflecting a light and the improvement in the monitor efficiency of the photodetecting array 32.

Assuming that a plane, which is perpendicular to the direction of transmission of the signal light through the optical fibers 16, is the reference plane (vertical plane), an angle $\phi$, which is an angle of rear and front reflecting surfaces 64, 66 of the reflecting section 60 to the reference plane, is 6° to 12° and more preferably 8° to 10°, for the following reason. That is, if the angle $\phi$ is less than 6°, the reflected light 52 returned to the core 50 of the rear fiber 16A is increased. If the angle $\phi$ is larger than 12°, the optical axis of the signal light component transmitted through the reflecting section 60 and come into the core 50 of the front fiber 16B does not correspond to the optical axis of the front fiber 16B.

A length of the reflecting section 60 (hereinafter referred to as "width W of the reflecting section 60") in the direction of transmission of the signal light through the optical fibers 16 is preferably 50 μm or less, more preferably 30 μm or less, and much more preferably 20 μm or less. The rear and front fibers 16A, 16B are disposed substantially coaxially on the V-grooves 12, a deviation between the optical axis of the signal light component transmitted through the reflecting section 60 and the optical axis of the front fiber 16B depends on the width W of the reflecting section 60. When the width W is within the range as described above, the deviation between the optical axes is scarcely caused.

When the layer (hereinafter referred to as "reflective layer") intervening in the reflecting section 60 was the air layer, the angle $\phi$ of the reflecting section 60 to the reference plane was 8°, and the width W of the reflecting section 60 was 20 μm, then a loss based on a gap of the reflecting section 60 and the deviation between the optical axes is 0.42 dB.

When the reflective layer is the air layer and the angle $\phi$ of the reflecting section 60 to the reference plane is 8°, then the reflected light 52 is combinations of a reflected light component of a signal light which is reflected at the rear reflecting surfaces 64 and a reflected light component of a signal light which is reflected at the front reflecting surfaces 66. The reflected light component of the signal light which is reflected at the rear reflecting surface 64 have an reflection angle of $\theta=16°$ and a quantity of light of about 14.5 dB (3.5%). On the other hand, the reflected light component of the signal light which is reflected at the front reflecting surfaces 66 is reflected at an reflection angle of $\theta=19.6°$ on the reflecting surfaces 66 of the front optical fibers 16B. When the reflected light component which is reflected at the front reflecting surfaces 66 comes into the clads 54, then the reflection angle is changed $\theta=16.3°$ and a quantity of light of 14.5 dB is obtained. Therefore, the reflected light component of the signal light which is reflected at the reflecting surface 64 and the reflected light component of the signal light which is reflected at the reflecting surface 66 have the same reflection angle θ and the reflected light 52 of 11.5 dB in total are obtained.

The reflected lights 52 from the respective optical fibers 16 transmit the layer 56 provided outside the clads 54 of the first fibers 16A respectively, and are detected by respective photodetectors 70 of the photodetecting array 32 disposed on the optical fibers 16.

It is preferable that the layer 56 has a refractive index such that the total reflection is not caused an interface between the layer 56 and the clad 54. The higher the refractive index of the layer 56 is, the smaller the incident angle of the reflective light 52 come into the photodetectors 70 is. However, it is necessary to select a refractive index of the layers 56 so that no total reflection of the reflected light 52 occurs on the light-receiving surface of the photodetectors 70.

Considering the facts as described above, it is preferable that the layer 56 has an intermediate refractive index between the refractive index of the optical fibers 16 and the refractive index of the light-receiving surface of the photodetectors 70. In this connection, the refractive index of the quartz fiber is 1.44, and the refractive index of the photodetectors (GaAs-photodiode) is 3.5.

A resin layer is exemplified as a specified example of the layer 56. When the resin layer before hardening is the resin layer and the adhesive layer, the material is liquid. Therefore, the material may be applied to an interface of an optical fiber having the circular shape, and it is possible to avoid the total reflection. In the case of the adhesive layer, the layer also plays a role to protect the photodetectors 70, which are more preferred.

As described above, in the optical device 10A according to the first embodiment, the reflected light 52 is generated due to the refractive index difference in the reflecting section 60. Accordingly, it is unnecessary to insert any distinct optical member from the optical fibers 16 into the reflecting section 60. Thus, it is possible to miniaturize the reflecting section 60, accordingly, to miniaturize the optical device 10A. Further, the rear fiber 16A and the front fiber 16B can be disposed substantially coaxially on the V-grooves 12. Therefore, it is unnecessary to adjust the respective optical axes of the rear fiber 16A and the front fiber 16B and it is possible to simplify the production steps of the optical device 10A.

Figure 5:
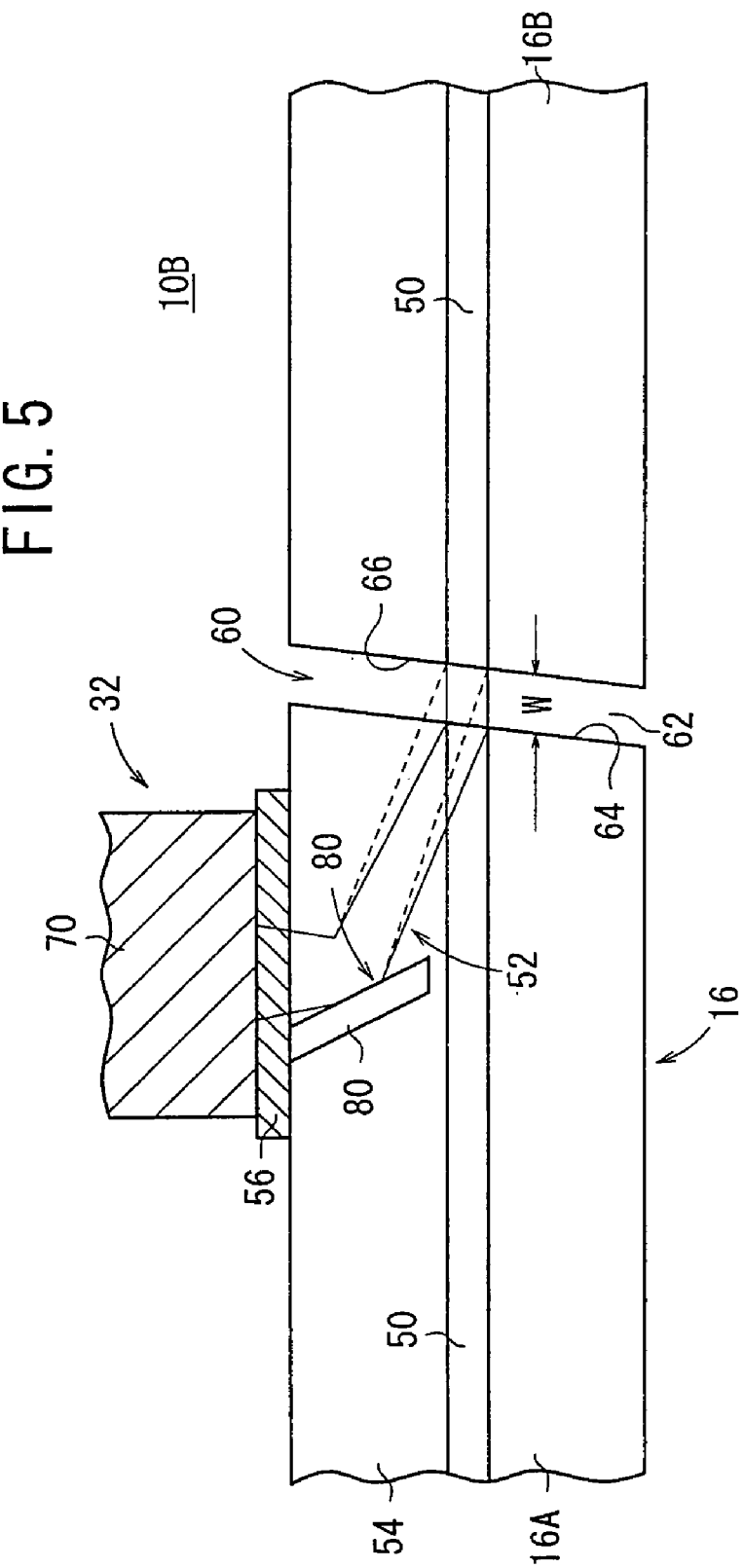
FIG. 5 is a magnified view illustrating a monitor section of an optical device according to a second embodiment.

Next, an optical device 10B according to a second embodiment will be explained with reference to FIG. 5.

The optical device 10B according to the second embodiment has approximately the same construction as the optical device 10A according to the first embodiment described above. However, the optical device 10B has a total reflection plane 80, which is formed in the clad 54 of the rear fiber 16A and which changes the optical path of the reflected light 52.

That is, a low refractive index layer (total reflection layer 82) for generating the total reflection of the reflected light 52 is provided in the rear fiber 16A separately from the reflective layer as described above. In the embodiment shown in FIG. 5, the total reflection layer (slit) 82 having an angle to generate the total reflection of the reflected light 52, is provided on the optical path of the reflected light 52 in the clad 54 of the rear fiber 16A. The total reflection layer 82 is an air layer. Therefore, the reflected light 52, which comes from the clad 54 having a refractive index of 1.44, causes the total reflection on the air layer having a refractive index of 1. When the angle of reflection θ of the reflected light 52 is 16°, the angle (angle formed with respect to the reference plane (vertical plane)) of the slit 82, is 28°.

However, the best incident angle of the reflected light 52 come into the photodetectors 70 is 0°. Therefore, it is more preferable to set an angle of the slit so as to realize above condition. In the case of the embodiment shown in FIG. 5, the angle is 37°.

When the slit 82 is directly provided in the rear fiber 16A, any microcrack or the like occur depending on the machining state of the optical fibers 16A. Therefore, any problem arises in relation to the long term reliability. Accordingly, for example, If the slit 82 is filled with an adhesive having a low refractive index, it is possible to solve the problem as described above.

Also in this embodiment, it is preferable to provide the layer 56 between the photodetectors 70 and the portion at which the reflected light 52 is split from the signal light transmitted through the core 50 of the rear optical fibers 16A, in consideration of a reflection on an interface in which a refractive index difference is. If the air layer is provided instead of the layer 56, the reflected light 52 is transmitted from the optical fibers 16 to the photodetectors 70 through the air layer. Therefore, the loss of the reflected light 52 is about 30% (loss: 1.55 dB) due to the reflection between the rear optical fibers 16A and the air layer and the reflection between the air layer and the photodetectors 70. In view of loss due to above reflections, the same reflectance are set on all of respective interfaces in which a refractive index difference is to obtain the minimum reflectance. Therefore, it is affirmed to be most appropriate. In this case, the reflection is about 9.5% in total by providing the layer 56 having a refractive index of 2.44. The reflection loss is 0.44 dB.

As described above, in the optical device 10B according to the second embodiment, the total reflection plane 80, which changes the optical path of the reflected light 52, is formed in the clad 54 of the rear fiber 16A.

The spot diameter of the reflected light 52 is increased exponentially as the optical path of the reflected light 52 increases. Therefore, the spot diameter of the reflected light 52 is larger than the diameter of the light-receiving surface of the photodetectors 70, for example, when the arrangement, in which the photodetectors 70 are mounted outside the clad 54 with the layer 56 intervening therebetween, is adopted. In another case, when the light comes in an oblique direction to the light-receiving surface, the spot diameter of the reflected light 52 is also larger than the diameter of the light-receiving surface of the photodetectors 70. In this case, a part of the spot of the reflected light 52 may protrude from the light-receiving surface, which may result in the loss of the reflected light 52, and the sensitivity in photodetecting may be lowered. In the case of the optical fiber array 18 in which the plurality of optical fibers 16 are arranged, the so-called crosstalk may be occurred, in which the reflected light 52 of a certain optical fiber 16 comes into the photodetectors 70 corresponding to an adjacent optical fiber 16.

However, in the second embodiment, the total reflection plane 80, which changes the optical path of the reflected light 52, is formed in the clad 54 of the rear fiber 16A. Therefore, it is possible to shorten the optical path of the reflected light 52, for example, the optical path from the reflecting section 60 to the layer 56. Further, it is also possible to come the reflected light 52 into the light-receiving surface of the photodetectors 70 perpendicularly. Accordingly, it is possible to reduce the crosstalk in the optical fiber array 18, it is possible to realize a high density of the optical fiber array 18, and to improve the sensitivity in photodetecting when the photodetectors 70 are mounted on the rear optical fibers 16A.

Figure 6:
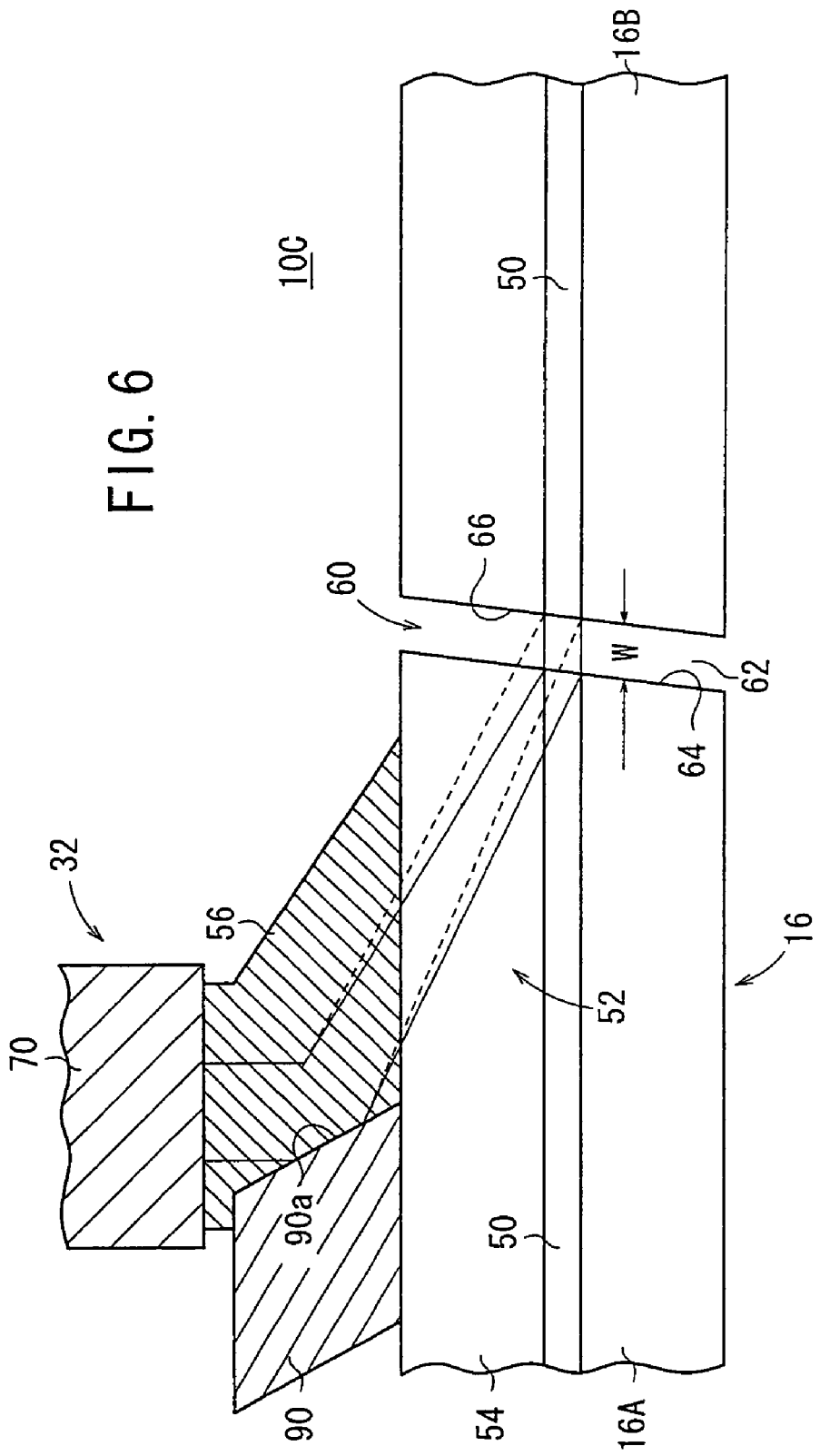
FIG. 6 is a magnified view illustrating a monitor section of an optical device according to a third embodiment.

Next, an optical device 10C according to a third embodiment will be explained with reference to FIG. 6.

The optical device 10C according to the third embodiment has approximately the same construction as the optical device 10A according to the first embodiment described above. However, the optical device 10C has a mirror member 90 mounted outside the rear fiber 16A. A mirror surface 90a of the mirror member 90 constitutes a reflection plane which changes the optical path of the reflected light 52 obtained through the layer 56.

The reflected light 52 is not transmitted through the interior of the mirror member 90. The reflected light 52 is totally reflected by the mirror surface 90a, and it arrives at the light-receiving surface of the photodetectors 70. In this embodiment, it is also necessary to provide the layer 56 in order to avoid the total reflection on the interface of the clad 54. The reflected light 52 is transmitted through the layer 56, and it is reflected by the mirror surface 90a. Therefore, the best refractive index of the layer 56 is 2.44.

For example, a general mirror member, in which a reflective film is formed on the surface of a glass substrate, can be used as the mirror member 90.

In the optical device 10C according to the third embodiment, it is possible to reduce the crosstalk in the optical fiber array 18, it is possible to realize a high density of the optical fiber array 18, and it is possible to improve the sensitivity in photodetecting when the photodetectors 70 are mounted on the rear optical fibers 16A. Further, it is unnecessary to perform any machining, for example, to provide the slit 82 (see FIG. 5) in the clad 54 of the optical fibers 16. Therefore, microcracks or the like are not generated in the optical fibers 16.

Figure 7:
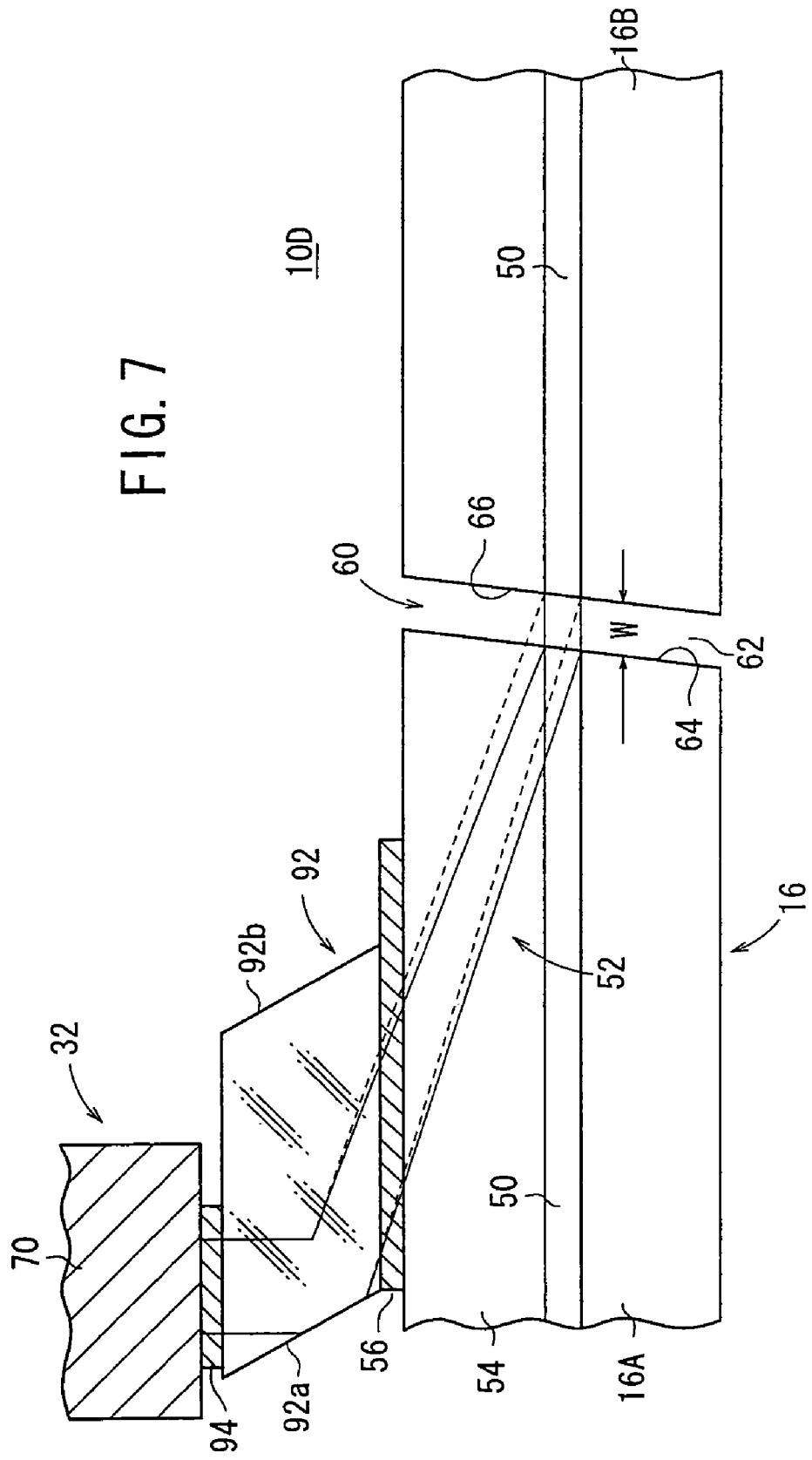
FIG. 7 is a magnified view illustrating a monitor section of an optical device according to a fourth embodiment.

Next, an optical device 10D according to a fourth embodiment will be explained with reference to FIG. 7.

The optical device 10D according to the fourth embodiment has approximately the same construction as the optical device 10C according to the third embodiment described above. However, the optical device 10D has a total reflection member 92, through which the reflected light 52 is transmitted, is mounted on the optical fibers 16 instead of the mirror member 90 (see FIG. 6). In the fourth embodiment, two types of index matching layers 56, 94 are formed, respectively. That is, there are provided the first layer 56 which is formed between the clad 54 of the rear fiber 16A and the total reflection member 92 and the second layer 94 which is formed between the upper surface of the total reflection member 92 and the photodetectors 70.

The total reflection member 92 has a refractive index which is higher than that of the air layer. The total reflection member 92 is positioned so that the reflected light 52 comes therein via the first layer 56. The total reflection plane is constituted by the interface (end surface 92a) between the total reflection member 92 and the air layer.

That is, the reflected light 52, which is obtained through the first layer 56 from the clad 54 of the rear fiber 16A, once comes into the total reflection member 92, and the reflected light 52 is totally reflected by the end surface 92a of the total reflection member 92.

Of course, in this case, if the total reflection member 92 is in the optical device 10D, the total reflection of the reflected light 52 may be also occurred. However, it is necessary to provide the first layer 56 in order to avoid the total reflection on the interface of the clad 54 in the same manner as in the third embodiment. Further, it is necessary to provide the second layer 94 in order to avoid the total reflection on the upper surface of the total reflection member 92.

Preferred conditions on the optical device 10D will be explained below. It is preferable that the refractive index of the total reflection member 92 is of such an extent that the reflected light 52, which is obtained through the first layer 56, is not totally reflected.

The reflected light 52 is come into the total reflection member 92 from the bottom surface thereof, and it is totally reflected by the end surface 92a of the total reflection member 92. The total reflection can be effected on the end surface 92a, because the refractive index of the total reflection member 92 is higher than that of the air layer. Of course, the angle of the end surface 92a must be an angle at which the total reflection occurs. The reflected light 52 arrives at the light-receiving surface of the photodetectors 70 via the second layer 94. In this arrangement, the following relationship is affirmed for the refractive indexes of the respective members: the light-receiving surface of the photodetectors 70>the second layer 94>the total reflection member 92>the first layer 56>the clad 54 of the rear fiber 16A.

Strictly, the minimum reflectance is obtained when the setting is made so that the reflection occurs on all of the respective refractive index interfaces at the same reflectance. In the case of the above, when the setting is made to provide those of 3.5, 2.8, 2.24, 1.8, and 1.44 in this order, then the reflection on the respective interfaces is 1.2%, and the reflection is 4.9% in total. As for the reflection loss, a value of about 0.22 dB is obtained.

As described above, in the optical device 10D according to the fourth embodiment, the refractive index can be changed in a stepwise manner from the optical fibers 16 to the light-receiving surface of the photodetectors 70 as compared with the first to third embodiments. Therefore, the optical device 10D has such a merit that the reflection loss is unexpectedly small as compared with the first to third embodiments.

Further, in the fourth embodiment, the total reflection is realized by mounting only the total reflection member 92 having the predetermined shape. Therefore, it is unnecessary to form any special mirror surface. Further, it is unnecessary to form the slit 82 (see FIG. 5) in the clad 54. Therefore, the reliability is not deteriorated as well.

Next, the effects common to the optical devices 10A to 10D according to the first to fourth embodiments will be explained.

There is no means such as an optical waveguide path for confining the light on the optical path of the reflected light 52 emitted from the reflective layer of the reflecting section 60. Therefore, the reflected light 52 is transmitted with a certain spread over the distance up to the photodetectors 70, for example, through the clad 54. Therefore, taking the monitoring into consideration, if the distance from the reflective layer to the photodetectors 70 is long, the spread of the reflected light 52 is increased. If the spot diameter exceeds the diameter of the light-receiving surface of the photodetectors 70, the loss occurs. Further, if the optical fibers 16, which constitute the optical fiber array 18, are aligned at narrow pitch spacing distances, for example, at 250 μm pitch or 127 μm pitch, the problem of crosstalk also arises.

Therefore, it is necessary that the distance from the reflective layer to the photodetectors 70 is decreased as short as possible. As one means for this requirement, it is preferable that the photodetectors 70 are disposed as near as possible to the optical fibers 16. In this case, a problem arises about the way for disposing the photodetectors 70 closely to the optical fibers 16, when the wiring board 36, on which the electric circuit for driving the photodetectors 70 is wired and the photodetectors 70 are mounted, is set.

In order to solve this problem, in the first to fourth embodiments, as typically illustrated in FIG. 1, the wiring board 36 is mounted on the substrate 14 while the back surface 36a of the wiring board 36 is directed upwardly and the surface 36b, on which the photodetecting array 32 is mounted, is directed downwardly. This arrangement is realized by the so-called flip chip mounting.

Further, for example, when it is assumed that the optical fiber array 18 has a large number of channels such as 40 channels, it is inevitable that the photodetecting array 32 is lengthened corresponding thereto. A problem also arises about the way of correct installation of the long photodetecting array 32 in the vicinity of the optical fiber array 18.

In order to solve this problem, in the first to fourth embodiments, the side walls 40, which have the mounting surfaces 42 for mounting the wiring board 36, are provided on both sides of the substrate 14 to be used for the optical fiber array 18. When the photodetecting array 32 is mounted on the basis of the upper surfaces (mounting surfaces 42) of the side walls 40, it is easy to positionally adjust the photodetectors 70 and the optical fibers 16 (in the height direction).

When the upper surfaces (mounting surfaces 42) of the side walls 40 are continuously connected by certain angles to the surface (upper surface of the V-groove) on which the V-grooves 12 exist, then it is possible to correctly recognize the positional relationship between the mounting surfaces 42 and the central position of the optical fibers 16 (center of the virtual circle of the V-grooves 12) by using a highly accurate contact type measuring method disclosed in Japanese Laid-Open Patent Publication No. 2-96609, and it is easy to perform the positional adjustment highly accurately.

For example, if it is intended to adjust the position actively without using the mounting surfaces 42 as described above, it is extremely difficult to mount the photodetecting array having a slender shape in parallel to the optical fiber array 18, because the width of the photodetecting array is as much as about 5 mm while the length of the photodetecting array itself is about 0.3 mm in the case of the photodetecting array of 127 μm pitch and 40 channels.

Therefore, it is preferable to mount the photodetecting array 32 on the basis of the upper surfaces (mounting surfaces 42) of the side walls 40 provided for the substrate 14 as in the first to fourth embodiments. Further, the first and second plates 20A, 20B and the photodetecting array 32 are mounted to the portion which is interposed between the mounting surfaces 42. Therefore, it is possible to mount the first and second plates 20A, 20B and the photodetecting array 32 with high reliability as described in Japanese Laid-Open Patent Publication No. 9-120014.

It is preferable that the reflective layer of the reflecting section 60 is formed by the slit machining. It is also allowable that opposing two optical fibers are coaxially arranged on the V-grooves 12 respectively to constitute the reflecting section 60. However, the end surfaces of the respective fibers have oblique angles. It is necessary to adjust the angle directions with each other. This angular adjustment is a laborious operation. This operation is especially complicated in the case of the 40 channels.

On the contrary, in the case of the slit machining, it is enough to apply the slit machining to the optical fiber array 18 once. Therefore, the treatment can be performed collectively even in the case of the optical fiber array 18 having 40 channels. In this procedure, the slit machining is applied after fixing the optical fiber array 18 to the V-grooves 12.

The slit 62, which constitutes the reflecting section 60, can function that the slit 62 arrives at the core 50. However, if the slit 62 merely extends to an intermediate position of the optical fibers 16, the reliability is consequently deteriorated in some cases in the same manner as in the total reflection layer (slit) 82. Therefore, it is preferable that the slit 62 is formed so that the optical fibers 16 are completely cut.

On the other hand, it is impossible to increase the cutting depth (machining depth) so much in order to machine the narrow slit 62 having a width of about 20 μm to 30 μm. If the machining depth is large, the surface state and the machining accuracy of the slit 62 may be harmfully affected. Therefore, it is preferable that the machining depth is decreased as small as possible.

The optical fibers 16 are disposed on the V-grooves 12. Therefore, if the machining is performed until the optical fibers 16 are cut, the substrate 14 is also machined together, in which the machining load is increased.

Accordingly, in order to solve this problem, the dimension is designed such that a part of the upper portion of the optical fibers 16 protrudes from the V-grooves 12. For example, if the top of the optical fibers 16 is coincident with the upper surface of the V-grooves 12, the machining depth with respect to the substrate 14 is 125 μm. On the contrary, when the depth dimension is designed such that a half of the optical fibers 16 protrudes from the V-grooves 12, the depth for machining the substrate 14 is a half of the above, i.e., 62.5 μm. Thus, the machining load can be reduced. That is, when the narrow slit 62 is machined as described above, it is preferable that the depth for machining the substrate 14 is not more than 100 μm.

Next, an explanation will be made with reference to FIGS. 8 to 11 about an embodiment in which the method of producing the optical device according to the present invention is applied to a case in which the optical device 10D according to the fourth embodiment is manufactured.

Figure 8:
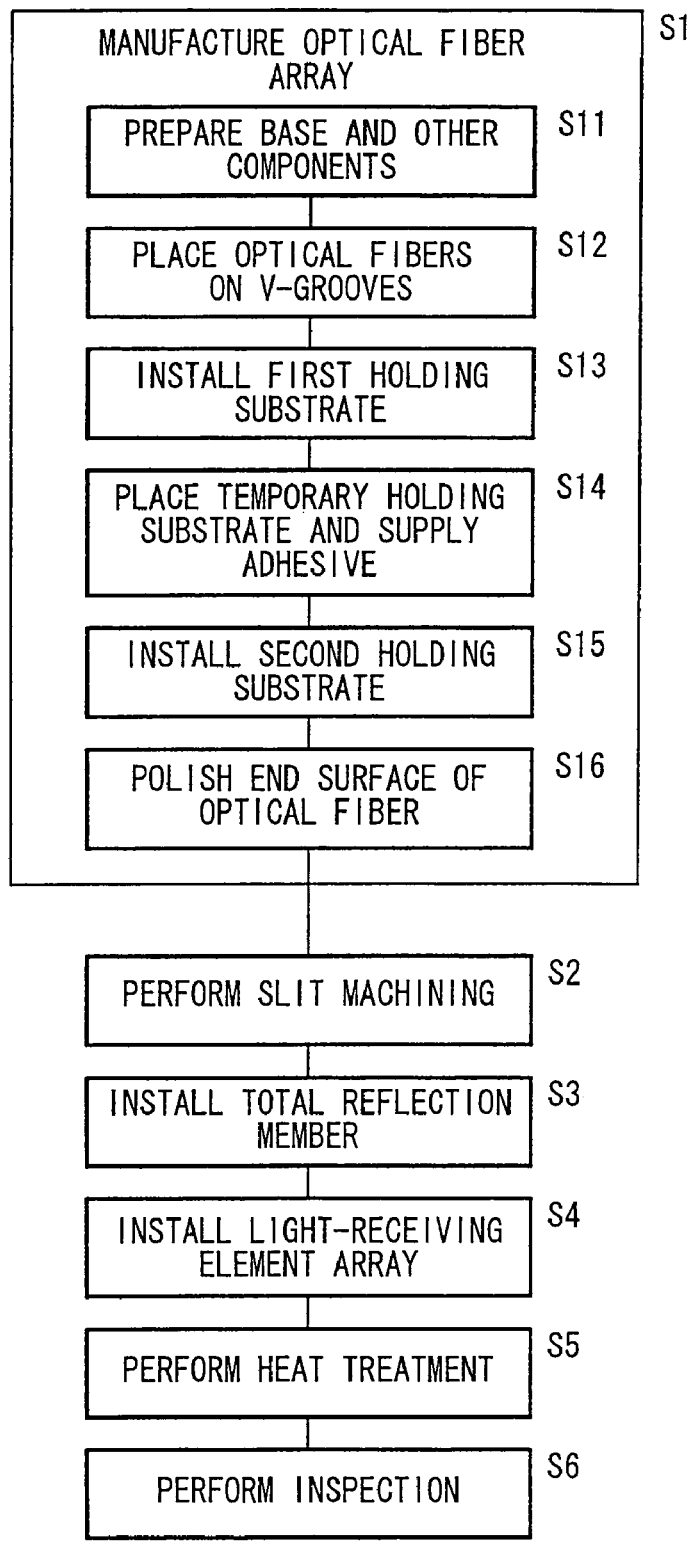
FIG. 8 is a block diagram illustrating steps of a method of producing an optical device according to the fourth embodiment.
Figure 9:
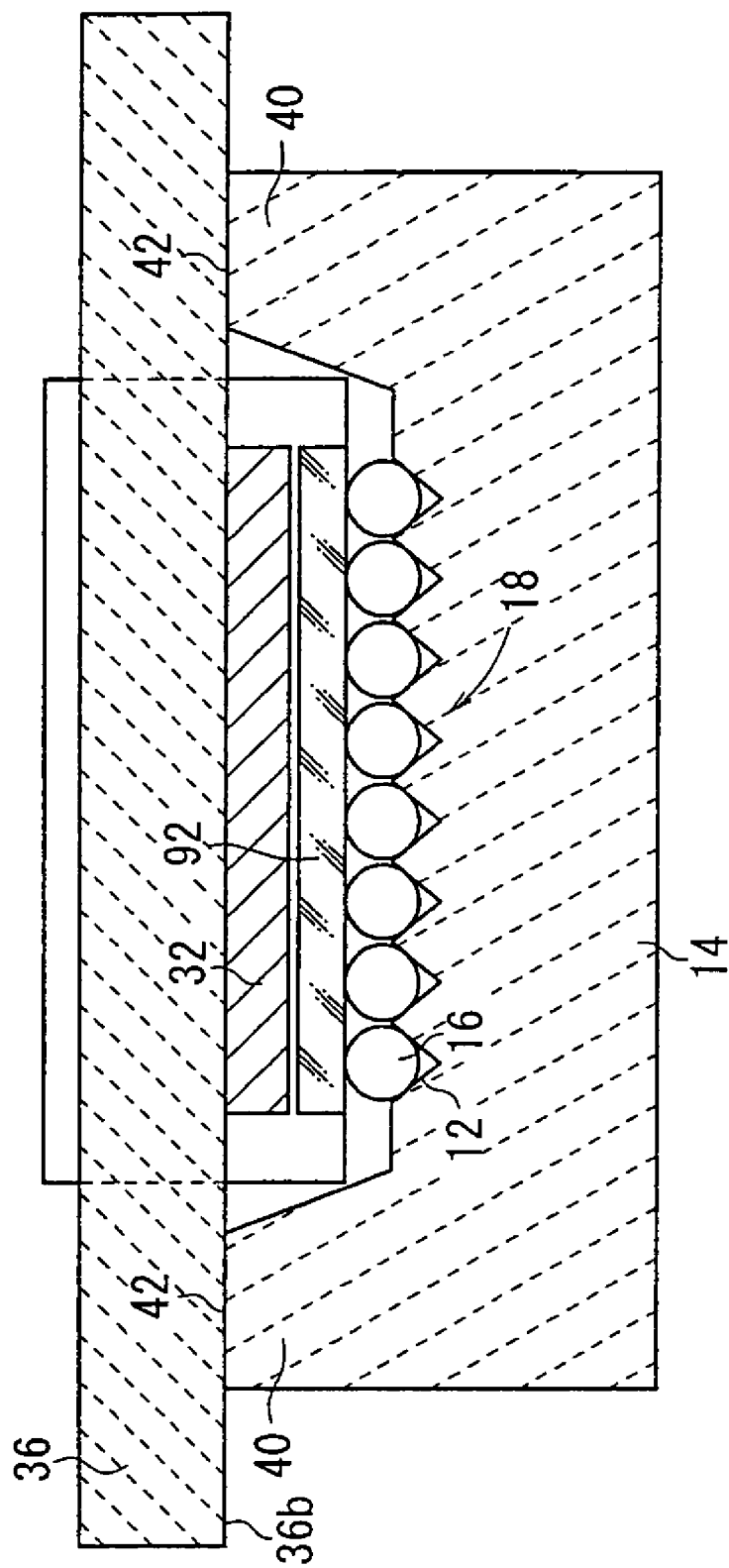
FIG. 9 is a sectional view as viewed from a front position illustrating the optical device according to the fourth embodiment manufactured by the production method according to the present invention.
Figure 10:
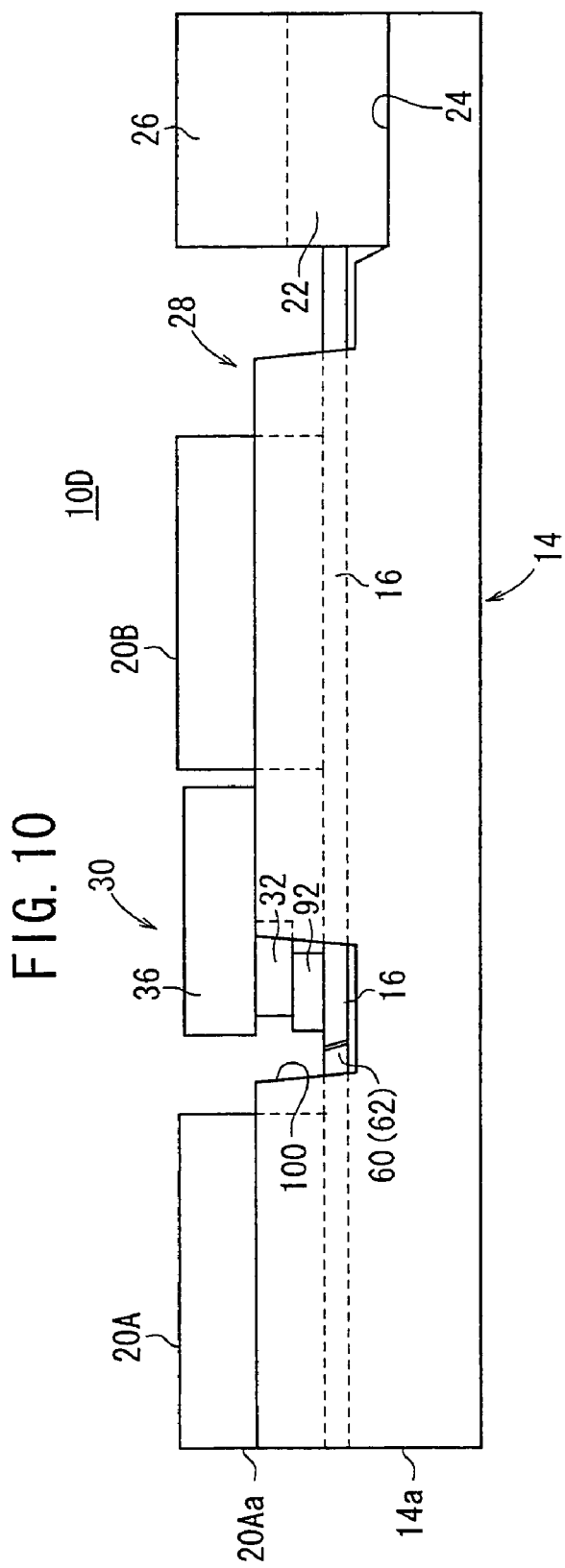
FIG. 10 is a sectional view illustrating the optical device according to the fourth embodiment as viewed from a side position.

At first, in Step S1 shown in FIG. 8, the optical fiber array 18 is manufactured. Specifically, in the first step of Step S11, the substrate 14, the wiring board 36, and the total reflection member 92 are prepared (see FIGS. 9 and 10).

In this procedure, a material, in which a plurality of the V-grooves 12 and the side walls 40 were formed in an integrated manner, was prepared as the substrate 14. Alumina was adopted for the wiring board 36, and the thickness was 1 mm. A photodiode having a thickness of 200 μm was used as the photodetectors 70 (see FIG. 7). A glass, which had a thickness of 100 μm and a refractive index of 2.2, was used for the total reflection member 92.

Taking the machining accuracy into consideration, for example, the heights of the mounting surfaces 42 of the side walls 40 of the substrate 14 were set so that the spacing distance was 120 μm between the optical fiber array 18 and the photodetecting array 32. The depth of the V-groove was set so that the top of the optical fibers 16 protruded by about 50 μm from the upper surface of the V-grooves 12.

A relief (recess 100) to be used during the slit machining was previously formed on the side wall 40 of the substrate 14 to give a state in which the slit machining was successfully performed for only the optical fibers 16 without machining the substrate 14 during the slit machining. The recess 100 had the bottom disposed at the depth coincident with the bottom of the V-grooves 12, and the width (length along the optical axis of the optical fibers 16) was 1 mm.

In this case, a structure is given, in which the V-grooves 12 are absent at the portion corresponding to the recess 100, and a portion of the optical fibers 16 corresponding to the recess 100 is in a floating state. However, when the adhesive to be used for the first layer 56 is applied to a part of the surface of the optical fibers 16 before forming the slit 62 (see FIG. 7) in the optical fibers 16, then a state is given, in which the optical fibers 16 are coated with the adhesive, and the floating state as described above disappears. Therefore, the fluctuation of the optical fibers 16 disappears during the formation of the slit to be performed thereafter. Thus, it is possible to form the slit 62 highly accurately.

Figure 11:
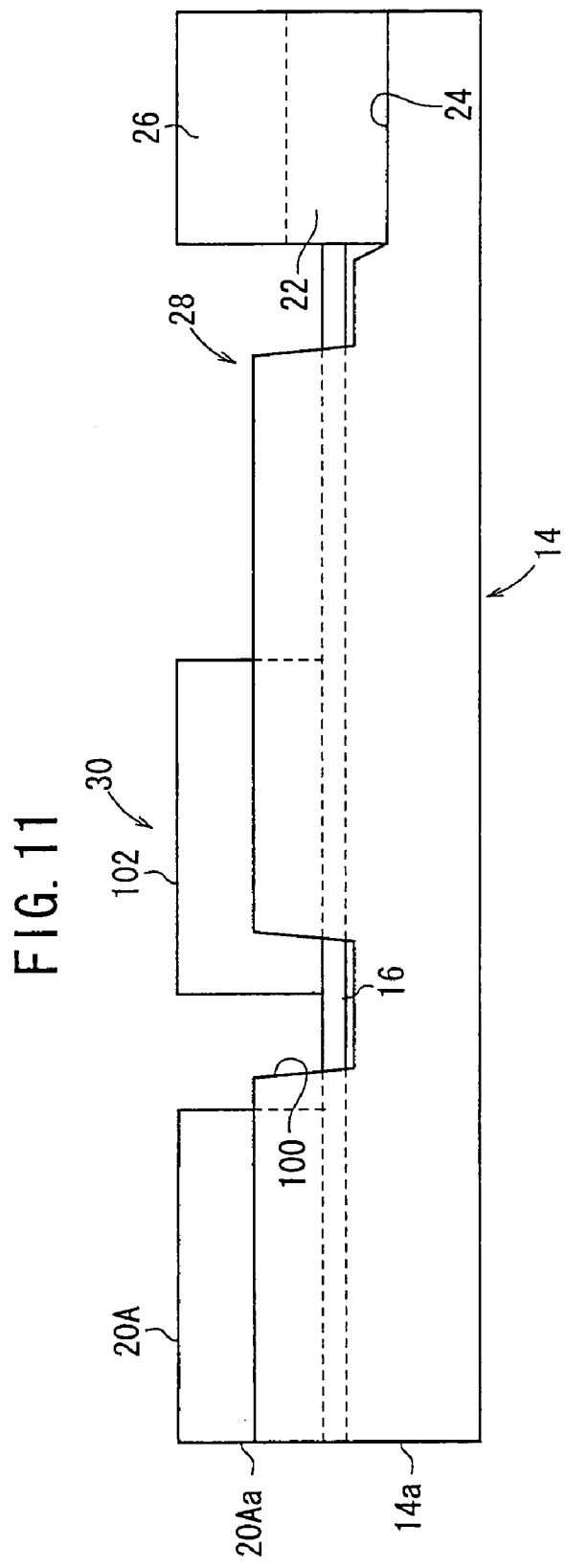
FIG. 11 is a view illustrating a state in which a temporary plate is placed.

After that, in Step S12 shown in FIG. 8, the optical fibers 16 were disposed on the V-grooves 12. After that, in Step S13, as shown in FIG. 11, the first plate 20A was disposed on the substrate 14. Subsequently, the adhesive was supplied through the gap between the first plate 20A and the substrate 14 or through an unillustrated adhesive-pouring port formed for the first plate 20A, and then the adhesive was hardened.

After that, in Step S14, as shown in FIG. 11, the temporary plate 102 was placed on a portion of the optical fibers 16 corresponding to the monitor section 30. The adhesive to be used as the first layer 56 was supplied through the gap between the temporary plate 102 and the substrate 14 or through an unillustrated adhesive-pouring port formed for the temporary plate 102.

After that, in Step S15, the temporary plate 102 was removed, and then the second plate 20B was disposed on the substrate 14. Subsequently, the adhesive was supplied through the gap between the second plate 20B and the substrate 14 or through an unillustrated adhesive-pouring port formed for the second plate 20B, and then the adhesive was hardened.

After that, in Step S16, the end surface of the optical fibers 16 was polished. At this stage, the optical fiber array 18, which was composed of a large number of the optical fibers 16, was constructed.

Subsequently, in Step S2 shown in FIG. 8, the slit 62 having a width of 20 μm was machined on a portion of the optical fibers 16 corresponding to the monitor section 30 by using a dicing machine with a #200 diamond grinding wheel having a width of 20 μm. The angle φ of the slit 62 (angle formed with respect to the reference plane (vertical plane)) was 10°.

Subsequently, in Step S3, the total reflection member 92 was mounted on the optical fibers 16. On condition that an adhesive having a refractive index of 1.8 was to be used as the adhesive for the first layer 56, the angle (angle formed with respect to the reference plane (vertical plane)) of the end surface 92a of the total reflection member 92 was 19°. Accordingly, the angle of incidence of the reflected light 52 into the photodetectors 70 to be mounted thereafter was to be 0°.

The reflected light 52 is extracted from the clad 54 at a position of about 170 μm from the reflecting section 60. Therefore, the length of the total reflection member 92 was 200 μm to make the setting so that the position for extracting the reflected light 52 from the clad was located at a position of 150 μm from the front surface 92b of the total reflection member 92 (see FIG. 7).

Accordingly, the front surface 92b of the total reflection member 92 is located at a position separated backwardly by about 20 μm from the reflecting section 60. Therefore, the adhesive, which is used as the first layer 56, does not flow into the reflecting section 60. The thickness of the total reflection member 92 was 100 μm and the width was 2.2 mm, because the pitch of the optical fiber array 18 was 250 μm including 8 cores.

The total reflection member 92 was fixed with a UV adhesive or a UV-curable adhesive having a refractive index of 1.8 (adhesive to be used as the first layer 56) so that the first layer 56 was reliably formed at the position for extracting the reflected light 52 from the clad 54. The total reflection member 92 was successfully mounted without any dispersion with respect to the respective channels, because the positioning was performed while observing the slit 62 of the reflecting section 60.

After that, in Step S4 shown in FIG. 8, the photodetecting array 32 was mounted. In this step, the backward end of the total reflection member 92 (portion on the side of the end surface 92a) was firstly recognized with an image, and the photodetecting array 32, which was mounted on the wiring board 36, was positioned. In this procedure, a laser beam having a wavelength of 1.55 μm is previously come into the forward end of the optical fiber array 18, and the outgoing reflected light 52 was received by the photodetecting array 32 to finely adjust the installation position so that the output was maximized while monitoring the output of the photodetecting array 32. In this procedure, the adjustment was performed while monitoring the outputs of the photodetectors 70 of 1-channel and 8-channel of the photodetecting array 32. The output of the photodetectors 70 was monitored and detected by applying a probe to the wiring pattern 34 formed on the wiring board 36.

The photodetecting array 32 was mounted in the height direction at a position of 20 μm from the total reflection member 92, because the wiring board 36 was mounted on the upper surfaces (mounting surfaces 42) of the side walls 40 of the substrate 14. In this procedure, an adhesive of the thermosetting type was previously applied to the space between the wiring board 36 and the mounting surfaces 42. A UV adhesive having a refractive index of 2.8 to serve as the second layer 94 was charged to the gap of 20 μm between the total reflection member 92 and the photodetecting array 32, and the adhesive was hardened by being irradiated with ultraviolet light.

After that, in Step S5, the entire substrate 14 including the optical fiber array 18 was heated to 80° C. to simultaneously perform the thermal aging of the UV adhesive and the curing of the thermosetting type adhesive.

Finally, in Step S6 shown in FIG. 8, an inspection was performed. A light of 13 dB was confirmed as the reflected light 52 (monitoring light). The crosstalk between the channels was 40 dB which was satisfactory. The loss of the signal light transmitted through the core 50 of the optical fibers 16 was 1 dB including the attenuation of the reflected light component. Thus, the obtained result involved no problem.

The execution of the steps described above led to the completion of the optical device (optical device 10D according to the fourth embodiment) provided with the monitoring function having the fiber array of 8 cores and 250 μm pitch.

In this case, the optical device was successfully manufactured to have such a compact size that the lengths of the portions on which the first and second plates 20A, 20B were mounted were 3 mm respectively, the length of the monitor section 30 was 3 mm, the length of the surface 24 was 3 mm, the length of the open section 28 was 2 mm, and the entire length was 14 mm. All of the thicknesses of the substrate 14 and the first and second plates 20A, 20B were 1.5 mm, and the width was 5 mm.

Next, an optical device 10E according to a fifth embodiments will be explained below with reference to FIGS. 12 and 13.

The optical device 10E according to the fifth embodiment has a similar constitution approximately to the optical device 10A according to the first embodiment described above except for the following modification.

Figure 12:
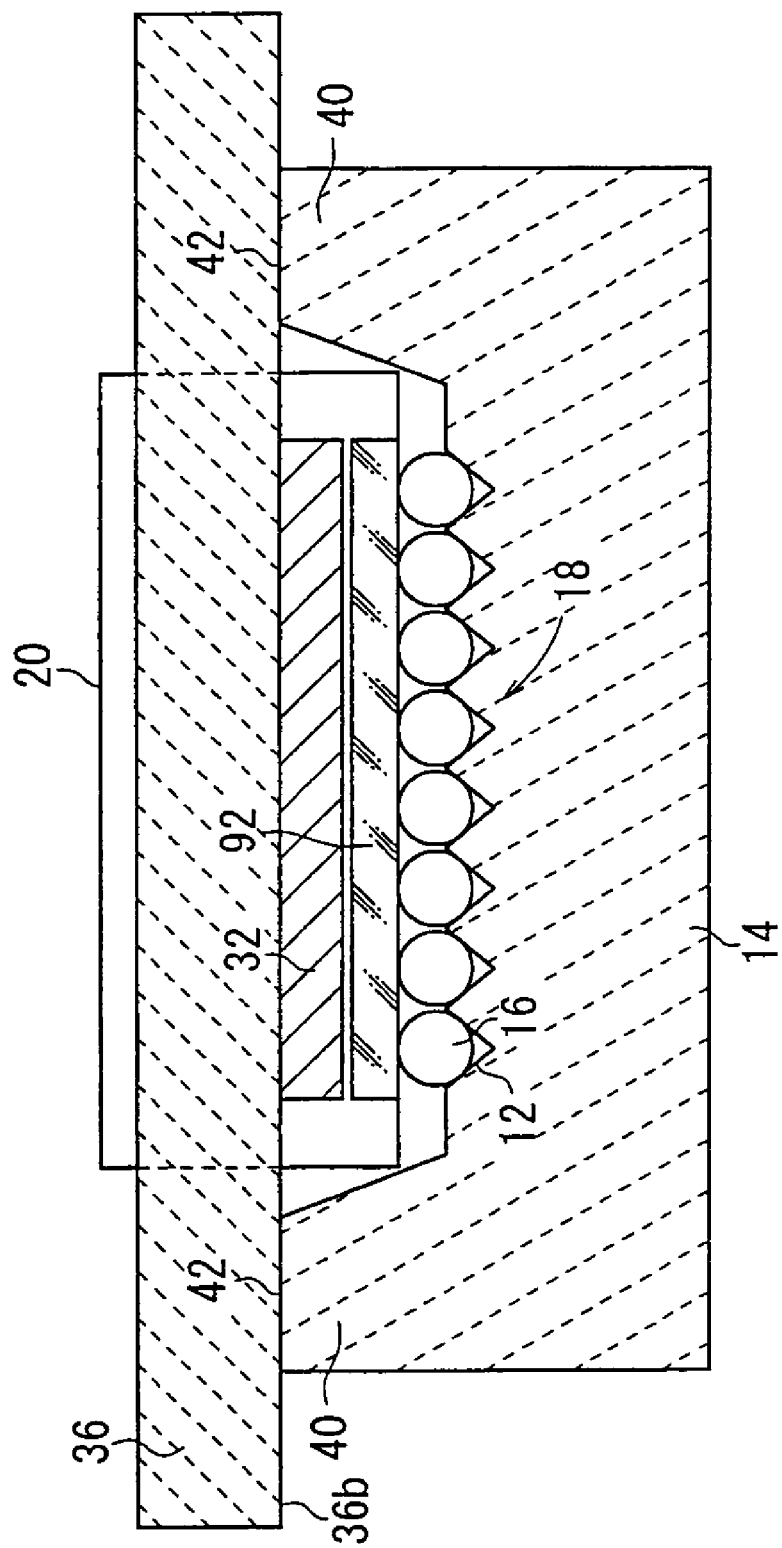
FIG. 12 is a sectional view illustrating an optical device according to a fifth embodiment as viewed from the front.
Figure 13:
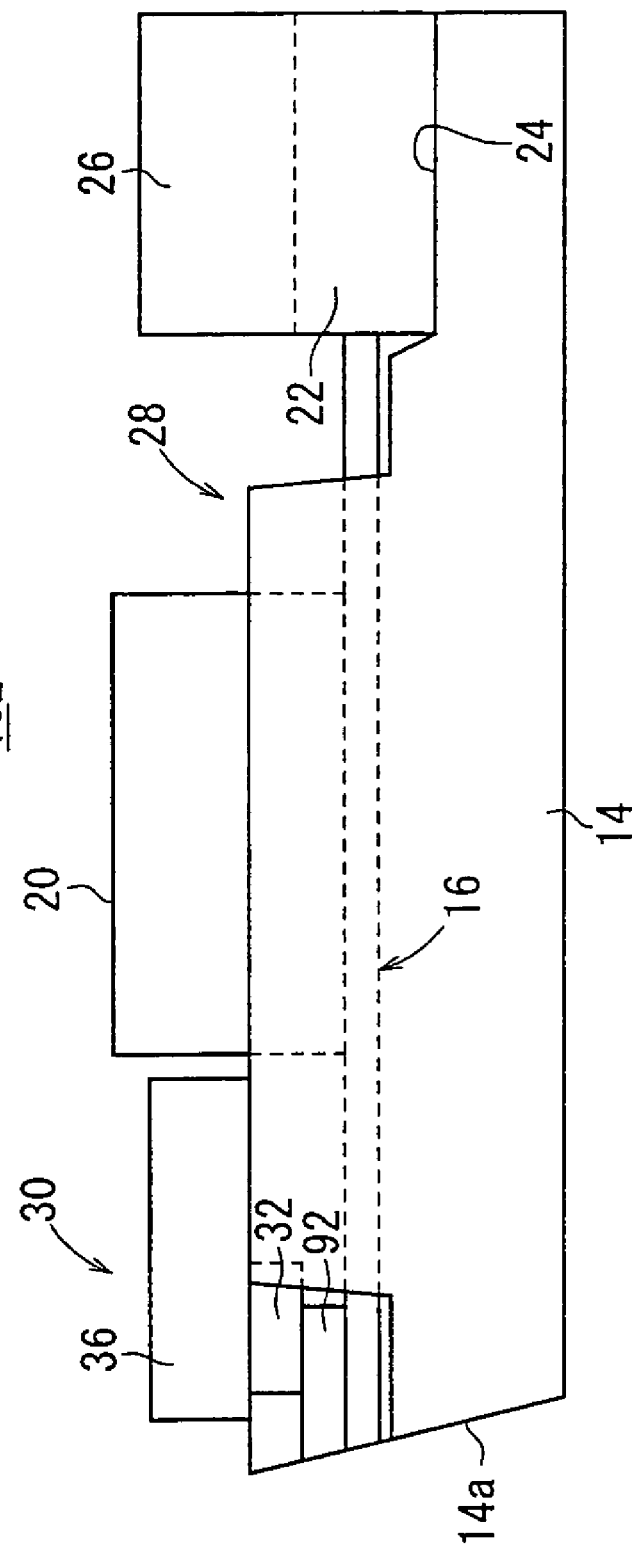
FIG. 13 is a sectional view illustrating the optical device according to the fifth embodiment as viewed from the side.

That is, as shown in FIGS. 12 and 13, a holding plate 20, which holds and presses the optical fiber array 18 onto the V-grooves 12, is secured on the base 14. The holding plate 20 is installed at a position spaced from an end surface 14a of the base 14 to some extent.

Figure 14:
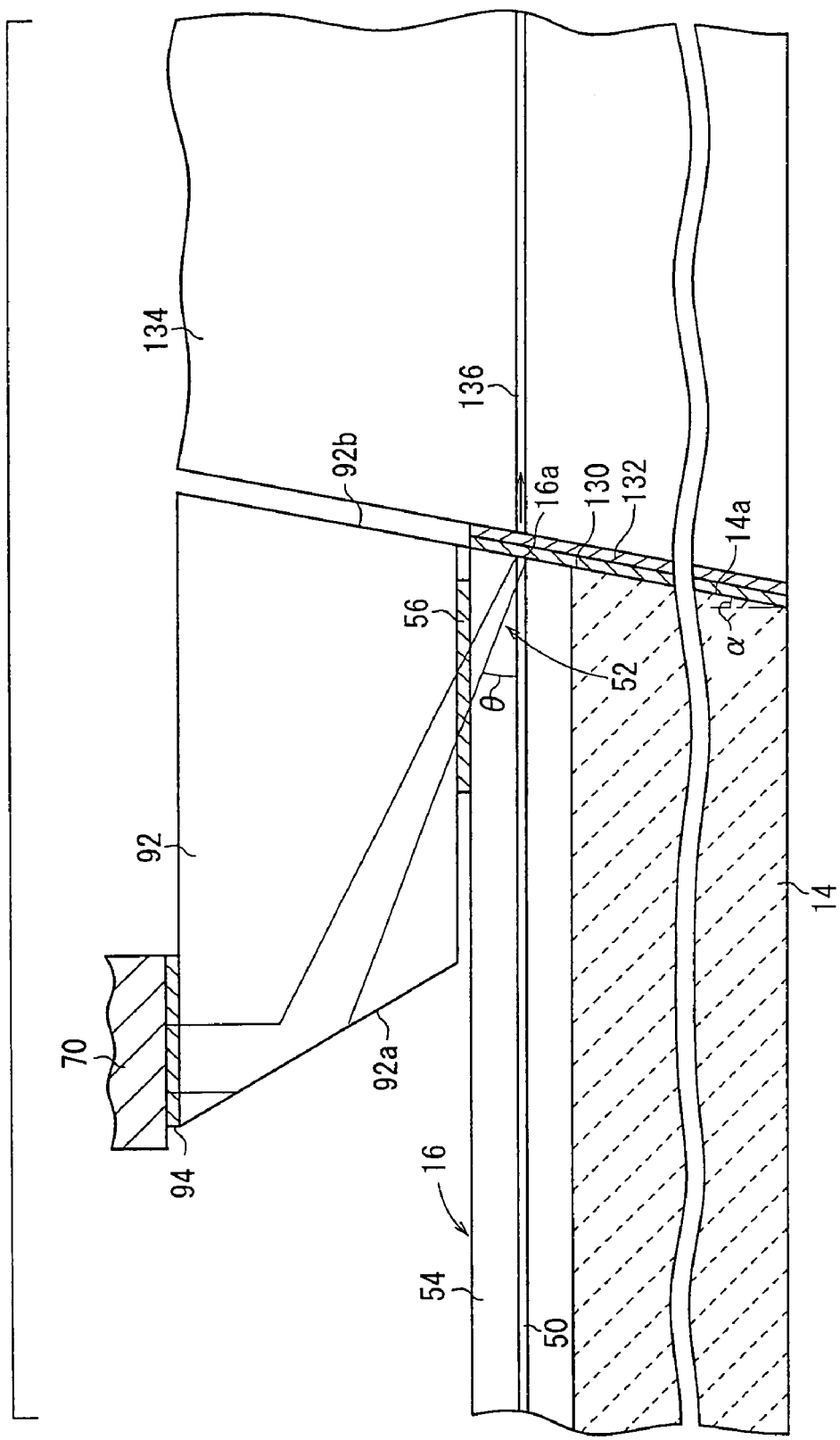
FIG. 14 is a magnified view illustrating an example of a monitor section of the optical device according to the fifth embodiment.

As shown in a magnified view in FIG. 14, all of the end surface 14a of the base 14 and end surfaces 16a of the respective optical fibers 16 are the inclined end surfaces 14a, 16a each having a predetermined angle α. The predetermined angle α refers to the angle α which is formed by the end surfaces 14a, 16a with respect to a reference plane. The reference plane (vertical plane) is defined by a plane which is perpendicular to the direction of transmission of the signal light through the optical fiber 16.

The end surface 16a of each of the optical fibers 16 has the reflecting function. As shown in FIG. 14, a reflective film 130, which reflects the light component having a predetermined wavelength, is formed on the end surface 16a. In the embodiment of the present invention, the reflective film 130 is formed on the entire surface of the inclined end surface 14a of the base including the end surfaces 16a of the respective optical fibers 16. In this embodiment, the film is a multilayer film composed of tantalum oxide and silicon oxide. It is a matter of course that the reflective film 130 may be formed on only the end surface 16a of each of the optical fibers 16.

Therefore, the light component having the specified wavelength, which is included in the signal light transmitted through the core 50 of the optical fiber 16, is reflected in a specified ratio by the reflective film 130 formed on the inclined surface 16a. When the reflected light 52 is split through the refractive index-adjusting layer to the outside of the clad 54, the optical device 10A can be used, for example, for monitoring the quantity of light.

In the fifth embodiment, a total reflection member 92, through which the reflected light 52 is transmitted, is installed on the optical fibers 16. Further, a first refractive index-adjusting layer 56 is formed between the clad 54 of the optical fiber 16 and the total reflection member 92, and a second refractive index-adjusting layer 94 is formed between the upper surface of the total reflection member 92 and the light-receiving element 70.

The total reflection member 92 has a refractive index which is higher than that of the air layer. The total reflection member 92 is positioned so that the reflected light 52 comes thereinto via the first refractive index-adjusting layer 56. The total reflection plane is constituted by the interface (end surface 92a) between the total reflection member 92 and the air layer.

That is, the reflected light 52 comes into the total reflection member 92 from the bottom surface thereof, and the reflected light 52 is totally reflected by the end surface 92a of the total reflection member 92. The total reflection can be effected on the end surface 92a, because the refractive index of the total reflection member 92 is higher than that of the air layer. Of course, the angle of the end surface 92a must be the angle at which the total reflection occurs. The reflected light 52 arrives at the light-receiving surface of the light-receiving element 70 through the second refractive index-adjusting layer 94. In this arrangement, it is possible for the reflected light 52 to perpendicularly come into the light-receiving surface of the light-receiving element 70.

It is preferable that the first refractive index-adjusting layer 56 has a refractive index at which total reflection does not occur in the clad 54, i.e., the first refractive index-adjusting layer 56 has an intermediate refractive index between the refractive index of the optical fiber 16 and the refractive index of the total reflection member. This condition is also applied to the second refractive index-adjusting layer 94. It is preferable that the second refractive index-adjusting layer 94 has an intermediate refractive index between the refractive index of the total reflection member 92 and the refractive index of the light-receiving surface of the light-receiving element 70. The refractive index of the quartz fiber is 1.44, and the refractive index of the light-receiving element (GaAs-photodiode) is 3.5.

Therefore, the following relationship is satisfied for the refractive indexes of the respective members: the light-receiving surface of the light-receiving element 70>the second refractive index-adjusting layer 94>the total reflection member 92>the first refractive index-adjusting layer 56>the clad 54 of the optical fiber 16.

Strictly, the minimum reflectance is obtained if the reflection occurs on all of the respective refractive index interfaces at the same reflectance. In the above case, if the respective refractive indexes of the members are 3.5, 2.8, 2.24, 1.8, and 1.44 in this order, then the reflection on the respective interfaces is 1.2%, and the reflection is 4.9% in total. The reflection loss is about 0.22 dB.

As shown in FIG. 14, an optical part 134 such as PLC is sometimes joined to the inclined end surfaces 14a, 16a of the base 14 and the optical fibers 16, for example, by a UV-curable adhesive 132. In this arrangement, the signal light components except for the reflected light component reflected on the inclined end surface 16a, which are included in the signal light transmitted through the core 50 of the optical fiber, come into a waveguide path 136 of the optical part 134 again, and they are transmitted through the waveguide path 136.

The angle (hereinafter referred to as "angle of reflection θ"), which is formed by the reflected light 52 with respect to the optical axis of the optical fiber 16, is preferably an angle that the reflected light 52 is totally reflected by the interface of the clad 54. The angle that the reflected light 52 is totally reflected by the interface of the clad 54 herein means an angle that the total reflection is effected at the interface of the clad 54 if the first refractive index-adjusting layer 56 is absent. Accordingly, almost all of the reflected light 52 does not return to the core 50 of the optical fiber 16, and advances toward the interface of the clad 54 of the optical fiber 16. This results in the prevention of the return reflection light and the improvement in the monitor efficiency.

The angle (end surface angle) α, which is formed by the inclined end surface 16a of the optical fiber 16 with respect to the reference plane, is within a range of 6° to 45°. If the angle is small, the return reflection light toward the core 50 appears. Therefore, the angle α is preferably at least not less than 60. An extremely large end surface angle is not appropriate for fear of the increase in size of the optical device 10A. However, there is a merit that the position of the light-receiving element 70 can be arbitrarily determined by adjusting the end surface angle. Accordingly, it is preferable that the range of the end surface angle α is 6° to 45°. In particular, when it is intended to miniaturize the optical device, it is preferable that the range is 6° to 20°. The attenuation of the reflected light, which is caused by the large end surface angle α, is small.

As described above, in the optical device 10A according to the fifth embodiment, the reflected light 52, which comes from the end surface 16a of the optical fiber 16, comes into the light-receiving surface of the light-receiving element 70 at the proper angle for receiving the light with respect to the light-receiving surface of the light-receiving element 70, i.e., at the right angle with respect to the light-receiving surface in the fifth embodiment. Therefore, for example, a part of the spot of the reflected light 52 does not protrude from the light-receiving surface. Thus, it is possible to improve the sensitivity of the light-receiving element 70.

In particular, even when the position of installation of the light-receiving element 70 is spaced from the end surface 16a of the optical fiber 16, the reflected light 52 comes into the light-receiving element 70 at the proper angle for receiving the light by the total reflection member 92. Therefore, the light-receiving element 70 can be installed at the position spaced from the end surface 16a of the optical fiber 16.

As a result, for example, when it is assumed that the UV-curable adhesive 132 interposes between the end surface 16a of the optical fiber 16 and the other optical part 134 jointed to the end surface 16a, the ultraviolet light is sufficiently radiated onto the UV-curable adhesive 132 when the ultraviolet light is radiated onto the end surface 16a of the optical fiber 16 from above. Therefore, it is possible to join with the UV-curable adhesive 132.

That is, the reflected light 52, which is reflected by the end surface 16a of the optical fiber 16, is split and utilized for the monitor, and hence the light-receiving element 70 may exist in the vicinity of the end surface 16a. When the light-receiving element 70 exists in the vicinity of the end surface 16a of the optical fiber 16, the ultraviolet light does not pass through this portion. For this reason, for example, the UV-curable adhesive 136 cannot be used to join the end surface 16a of the optical fiber 16 and another optical part 134. Therefore, it may be preferable that the light-receiving element 70 is installed at a position spaced from the end surface 16a of the optical fiber 16 as far as possible.

In the fifth embodiment, the light-receiving element 70 can be installed with a distance from the end surface 16a of the optical fiber 16 by using the total reflection member 92. In this case, it is possible to secure a distance of several hundreds of μm.

Considering the transmission of the ultraviolet light during UV curing, it is necessary to provide, as the distance for the transmission of the ultraviolet light, a distance of not less than 100 μm from the end surface 16a of the optical fiber 16. The distance is secured by adjusting the thickness and the length of the total reflection member 92.

Figure 15:
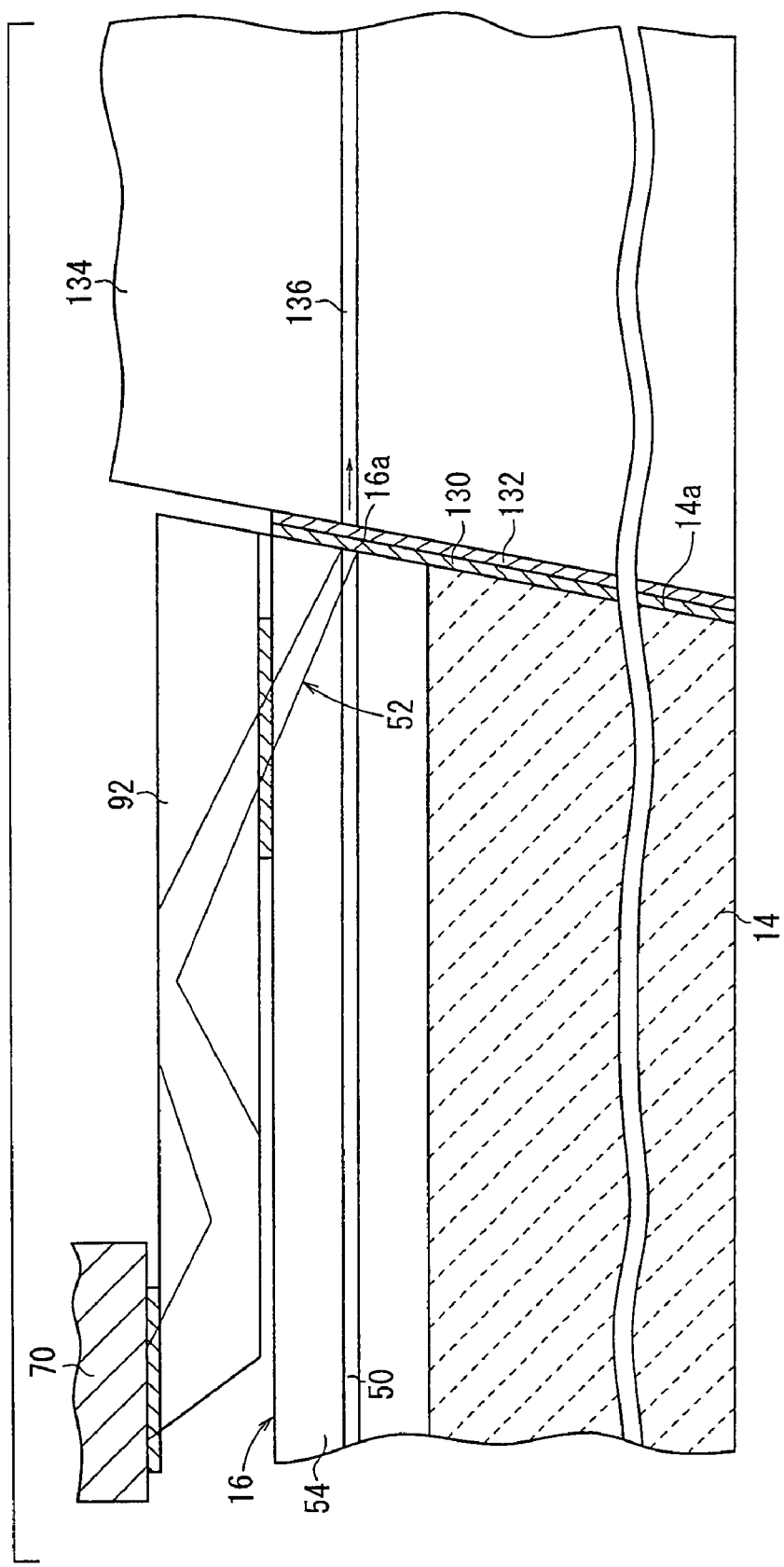
FIG. 15 is a magnified view illustrating another example of a monitor section of the optical device according to the fifth embodiment.

For example, when the thickness of the total reflection member 92 is restricted due to any problem such as a installation space, the arrangement shown in FIG. 15 may be adopted. The total reflection of the reflected light 52 is repeated in the total reflection member 92, and the reflected light 52 comes into the light-receiving element 70 thereafter. By doing so, it is possible to secure the distance from the end surface 16a of the optical fiber 16 to the position of installation of the light-receiving element 70 even when the total reflection member 92 is thin.

There is no means such as an optical waveguide path for confining the light on the optical path of the reflected light 52 emitted from the end surface 16a of the optical fiber 16. Therefore, the reflected light 52 is transmitted with a certain spread over the distance up to the light-receiving element 70, for example, through the clad 54. Therefore, taking the monitoring into consideration, if the distance from the clad 54 of the optical fiber 16 to the light-receiving element 70 is long, the spread of the reflected light 52 is increased. If the spot diameter exceeds the diameter of the light-receiving surface of the light-receiving element 70, the loss occurs. Further, if the optical fibers 16 of the optical fiber array 18 are aligned at narrow pitches, for example, at 250 μm pitches or 127 μm pitches, the problem of crosstalk also arises.

Therefore, it is necessary that the distance from the optical fiber 16 to the light-receiving element 70 is as short as possible. As one means for this requirement, it is preferable that the light-receiving element 70 is disposed as near as possible to the optical fiber 16. In this case, however, it is a problem how to dispose the light-receiving element 70 close to the optical fiber 16, when the wiring board 36 is set, on which the electric circuit for driving the light-receiving element 70 is wired and the light-receiving element 70 is mounted.

In order to solve this problem, in the fifth embodiment, as shown in FIG. 12, the wiring board 36 is installed on the base 14 while the back surface 36a of the wiring board 36 is directed upwardly and the surface 36b, on which the light-receiving element array 32 is mounted, is directed downwardly. This arrangement is realized by so-called flip chip mounting.

Further, for example, when it is assumed that the optical fiber array 18 has a large number of channels such as 40 channels, it is inevitable that the light-receiving element array 32 is long corresponding thereto. It is also a problem where to install precisely the long light-receiving element array 32 in the vicinity of the optical fiber array 18.

In order to solve this problem, in the fifth embodiment, the side walls 40, which have the installation surfaces 42 for installing the wiring board 36, are provided on both sides of the base 14 for the optical fiber array 18. When the light-receiving element array 32 is installed on the basis of the upper end surfaces (installation surfaces 42) of the side walls 40, it is easy to adjust the positions of the light-receiving element 70 and the optical fiber 16 (in the height direction).

When the upper end surfaces (installation surfaces 42) of the side walls 40 are continuously connected by certain angles to the surface (upper surface of the V-groove) on which the V-grooves 12 exist, then it is possible to correctly recognize the positional relationship between the installation surfaces 42 and the central position of the optical fiber 16 (center of the virtual circle of the V-groove 12) by using a highly accurate contact type measuring method disclosed in Japanese Laid-Open Patent Publication No. 2-96609. Thus, it is easy to perform the positional adjustment highly accurately.

For example, if it is intended to adjust the position actively without using the installation surfaces 42 as described above, it is extremely difficult to install the light-receiving element array having a slender shape in parallel to the optical fiber array 18, because the width of the light-receiving element array is about 5 mm while the length of the light-receiving element array itself is about 0.3 mm in the case of the light-receiving element array at 127 μm pitches and with 40 channels.

Therefore, it is preferable to install the light-receiving element array 32 on the basis of the upper end surfaces (installation surfaces 42) of the side walls 40 of the base 14 as in the fifth embodiment. Further, the holding plate 20 and the light-receiving element array 32 are installed to the portion which is interposed between the installation surfaces 42. Therefore, it is possible to install the holding plate 20 and the light-receiving element array 32 with high reliability as described in Japanese Laid-Open Patent Publication No. 9-120014.

Figure 16:
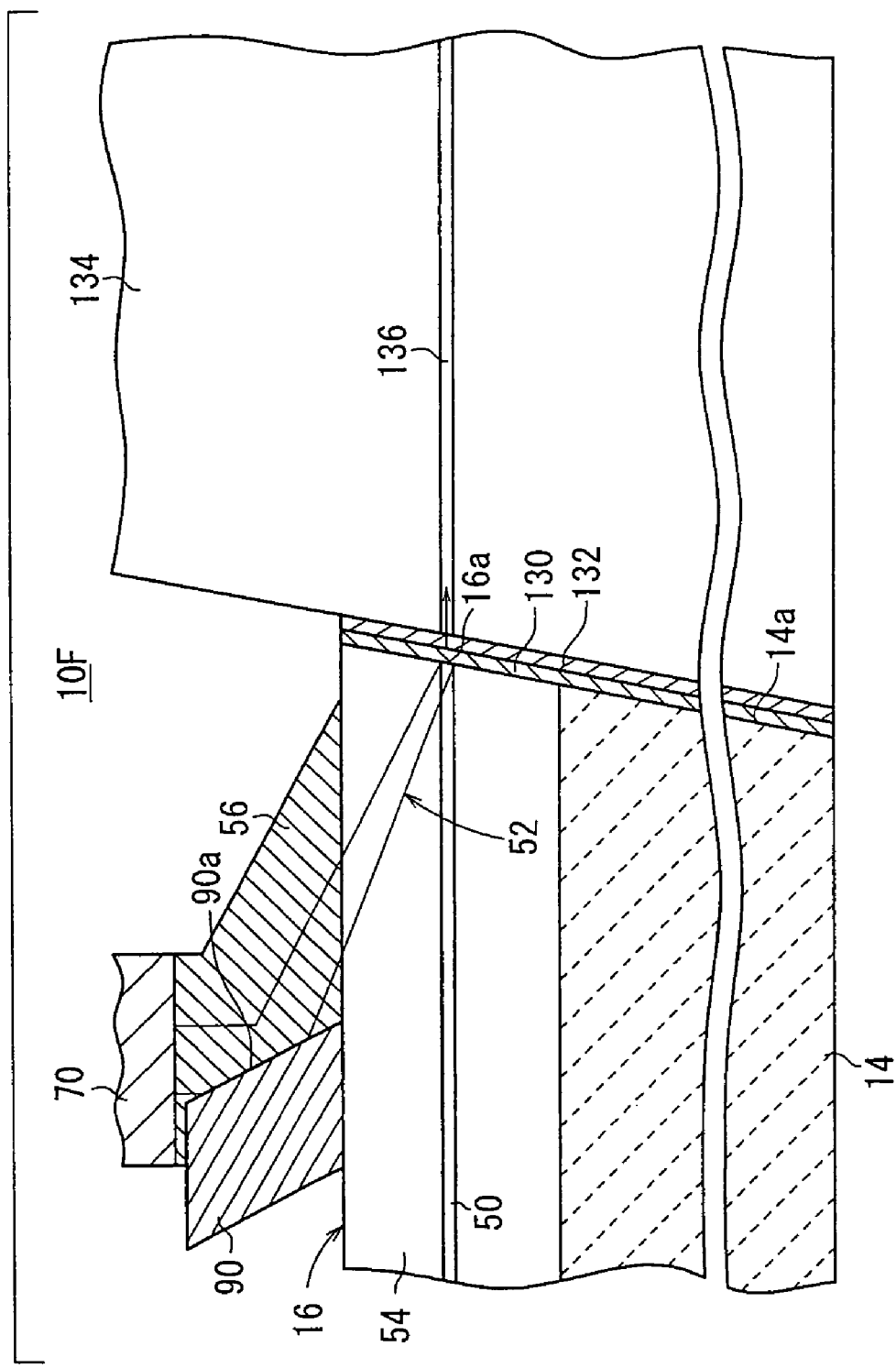
FIG. 16 is a magnified view illustrating an example of a monitor section of an optical device according to a sixth embodiment.

Next, an optical device 10F according to a sixth embodiment will be explained with reference to FIG. 16.

The optical device 10F according to the sixth embodiment is constructed in approximately the same manner as the optical device 10E according to the fifth embodiment described above. However, the optical device 10B differs in that a mirror member 90 is installed outside the optical fiber 16. A mirror surface 90a of the mirror member 90 constitutes a reflection plane which changes the optical path of the reflected light 52 split through the refractive index-adjusting layer 56.

The reflected light 52 is not transmitted through the interior of the mirror member 90. The reflected light 52 is totally reflected by the mirror surface 90a, and it arrives at the light-receiving surface of the light-receiving element 70. Also in this embodiment, it is necessary to provide the refractive index-adjusting layer 56 in order to avoid the total reflection on the interface of the clad 54. The reflected light 52 is transmitted through the refractive index-adjusting layer 56, and it is reflected by the mirror surface 90a. Therefore, the best refractive index of the refractive index-adjusting layer 56 is 2.44.

For example, a general mirror member, in which a reflective film is formed on the surface of a glass substrate, can be used as the mirror member 90.

In the optical device 10F according to the sixth embodiment, it is also possible to improve the light-receiving sensitivity when the light-receiving element 70 is installed. Further, when the UV-curable adhesive 132 is used to join the other optical part 134, it is possible to secure a sufficient distance to transmit the ultraviolet light, as the distance from the end surface 16a of the optical fiber 16 to the light-receiving element 70.

Next, an optical device 10G according to a seventh embodiment will be explained with reference to FIG. 17.

The optical device 10G according to the seventh embodiment has a feature that a total reflection plane 80, which changes the optical path of the reflected light 52, is formed in the clad 54 of the optical fiber 16.

That is, a low refractive index layer (total reflection layer 82), which allows the reflected light 52 to cause the total reflection, is provided in the optical fiber 16 separately from the reflective film 130 as described above. In the embodiment shown in FIG. 17, the slit 82, which has an angle required to cause the total reflection of the reflected light 52, is provided on the optical path of the reflected light 52 in the clad 54 of the optical fiber 16. The total reflection layer 82 is an air layer. Therefore, the reflected light 52, which comes from the clad 54 having a refractive index of 1.44, can cause the total reflection on the air layer having a refractive index of 1. When the angle of reflection θ of the reflected light 52 is 16°, the angle (angle formed with respect to the reference plane (vertical plane)), which is required for the slit 82, is 28°.

However, the best angle of incidence of the reflected light 52 into the light-receiving element 70 is 0°. Therefore, it is more preferable to adopt a slit angle which realizes this condition. In the case of the embodiment shown in FIG. 17, the angle is 37°.

When the slit 82 is directly provided in the optical fiber 16, some microcrack or the like may appear depending on the machining state. Therefore, the long term reliability may be deteriorated. Accordingly, for example, when the slit 82 is filled with an adhesive having a low refractive index, it is possible to reduce the occurrence of the problem as described above.

Also in this embodiment, it is preferable to provide the refractive index-adjusting layer 56 between the light-receiving element 70 and the portion from which the reflected light 52 is split, in consideration of the reflection on the refractive index interface. If the air layer is provided without providing the refractive index-adjusting layer 56, the light is transmitted from the optical fiber 16 to the air and from the air to the light-receiving element 70. Therefore, about 30% of the light is lost due to the reflection (loss: 1.55 dB). In view of the reflection loss, the minimum reflectance is obtained if the reflection occurs on all of the respective refractive index interfaces at the same reflectance, which is most appropriate. In this case, the reflection is about 9.5% in total by providing the refractive index-adjusting layer 56 having a refractive index of 2.44. The reflection loss is 0.44 dB.

As described above, in the optical device 10G according to the seventh embodiment, the total reflection plane 80, which changes the optical path of the reflected light 52, is formed in the clad 54 of the optical fiber 16. Therefore, it is possible to shorten the optical path of the reflected light 52, for example, the optical path from the end surface 16a of the optical fiber 16 to the refractive index-adjusting layer 56. Further, it is also possible for the reflected light 52 to come into the light-receiving surface of the light-receiving element 70 perpendicularly. Accordingly, it is possible to reduce the crosstalk in the optical fiber array 18, it is possible to realize a high density of the optical fiber array 18, and it is possible to improve the light-receiving sensitivity when the light-receiving element 70 is installed.

In the seventh embodiment, a distance of about 100 μm can merely be secured from the end surface 16a of the optical fiber 16 to the light-receiving element 70. In this case, as shown in FIG. 17, for example, when the optical part 140, which is jointed to the end surface 16a of the optical fiber 16, is a silicon substrate having the waveguide path 142, it may be impossible to sufficiently radiate the ultraviolet light onto the UV-curable adhesive 132, because the silicon substrate cannot allow the ultraviolet light to pass therethrough as well.

However, the problem can be avoided by using, for example, a form of pigtail as described below.

Figure 17:
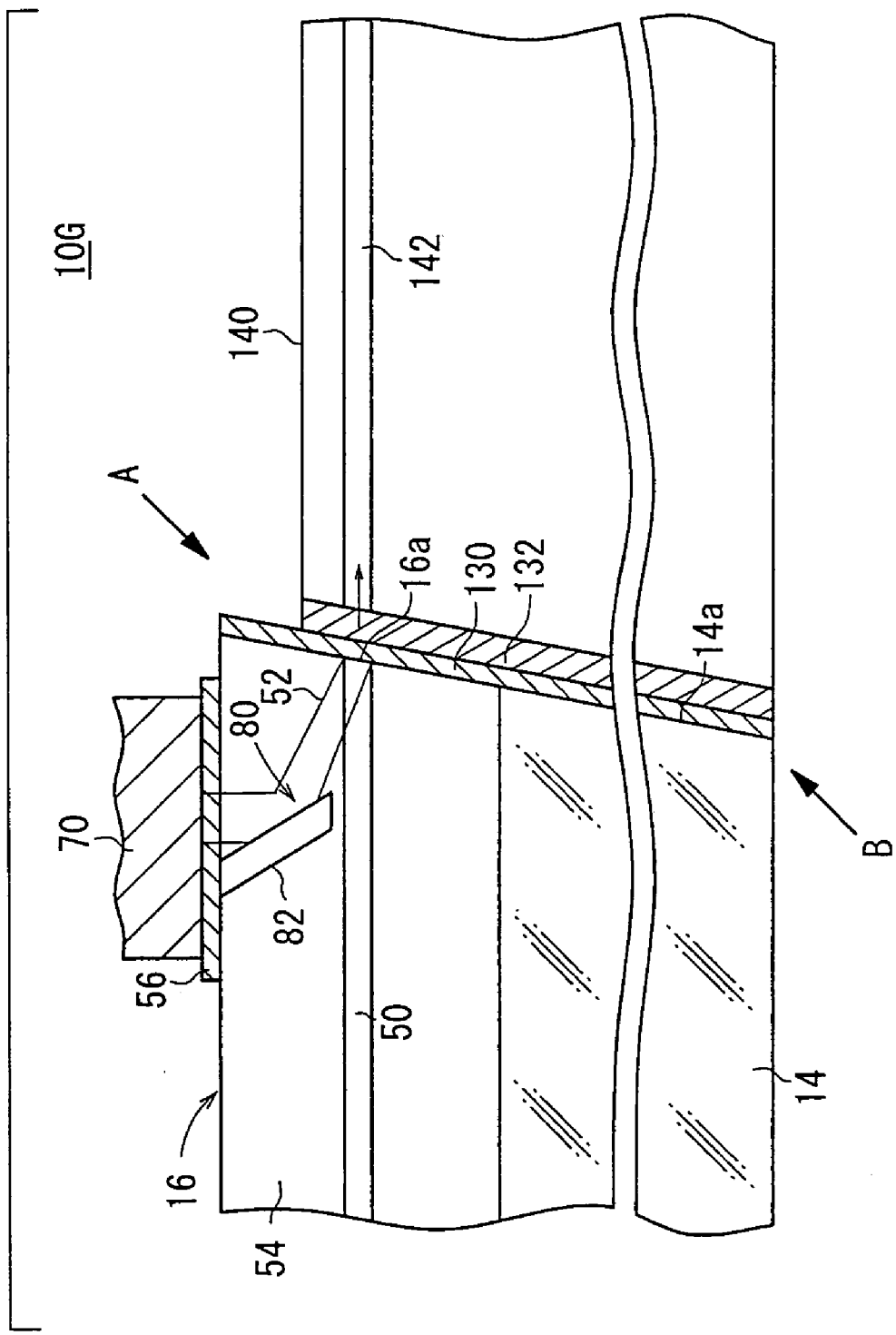
FIG. 17 is a magnified view illustrating an example of a monitor section of an optical device according to a seventh embodiment.

That is, as shown in FIG. 17, when a transparent fixture (not shown) is used for the upper portion of the optical part 140, or when there is no jig such as a fixture, then the ultraviolet light is radiated in a direction toward the end surface 16a of the optical fiber 16 (see the arrow A) from a position over the optical part 140 for the portion disposed higher than the core 50 of the optical fiber 16, and the ultraviolet light is radiated in a direction toward the end surface 16a of the optical fiber 16 (see the arrow B) from the back surface side of the base 14 for the portion disposed lower than the core 50 of the optical fiber 16. By doing so, it is possible to cure the UV-curable adhesive 132 between the end surface 16a of the optical fiber 16 and the optical part 140. In this case, it is of course necessary that the base 14 itself is transparent.

Next, an explanation will be made with reference to FIGS. 12 to 14 and 18 about an embodiment of the method of manufacturing the optical device 10E according to the fifth embodiment.

Figure 18:
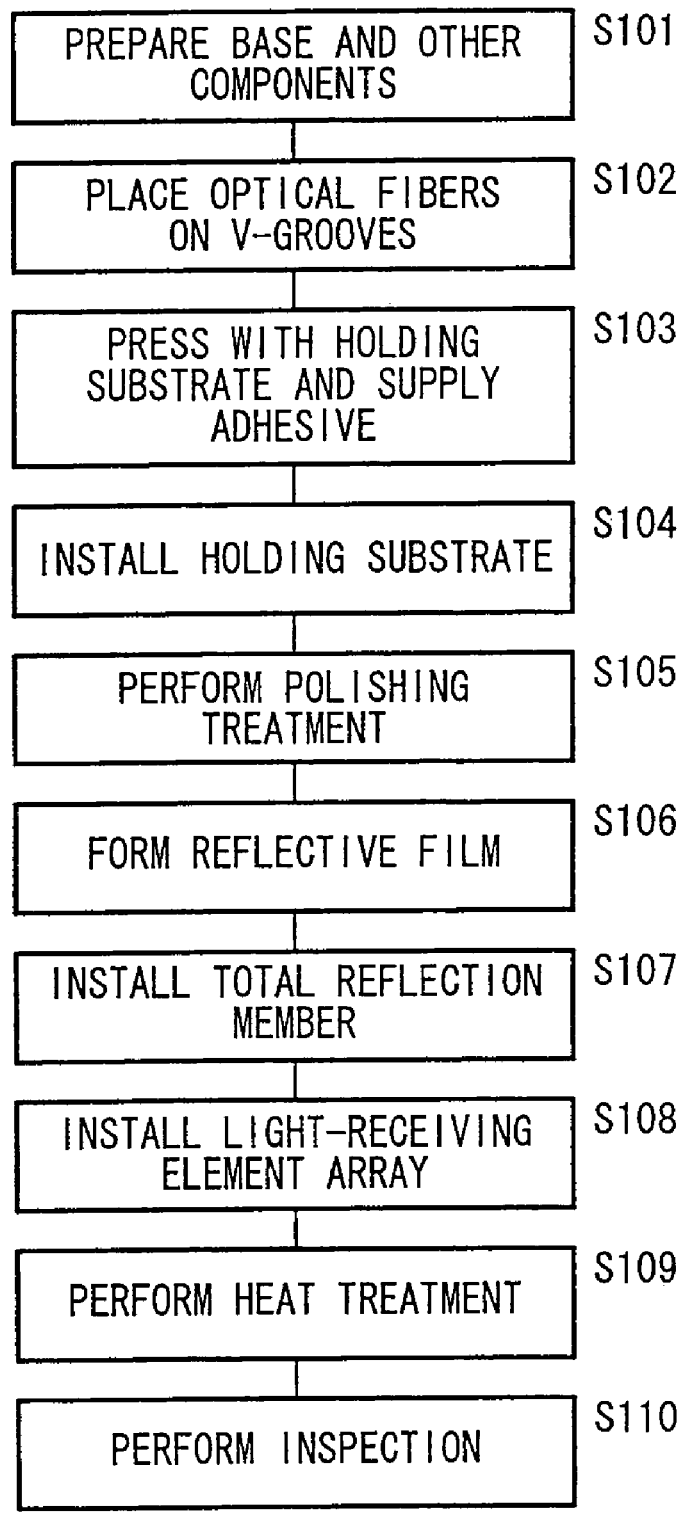
FIG. 18 shows a block diagram illustrating steps of a method of producing an optical device according to the fifth embodiment.

At first, in Step S101 shown in FIG. 18, the base 14, the wiring board 36, and the total reflection member 92 are prepared (see FIGS. 12 through 14).

In this procedure, a material, in which a plurality of the V-grooves 12 and the side walls 40 were formed integrally, was prepared as the base 14. Alumina was adopted for the wiring board 36, and the thickness was 1 mm. A photodiode having a thickness of 200 μm was used as the light-receiving element 70 (see FIG. 14). A glass having a thickness of 300 μm and a refractive index of 2.2 was used for the total reflection member 92.

Taking machining accuracy into consideration, for example, the heights of the installation surfaces 42 of the side walls 40 of the base 14 were set so that the distance was 320 μm between the optical fiber array 18 and the light-receiving element array 32. The depth of the V-groove was set so that the top of the optical fiber 16 protruded by about 50 μm from the upper surface of the V-groove 12.

After that, in Step S102 shown in FIG. 18, the optical fiber 16 was placed on the V-groove 12. After that, in Step S103, as shown in FIG. 13, the holding plate 20 was placed on the base 14. Subsequently, load was applied so that the optical fiber array 18 was pressed against the V-grooves 12, and adhesive for the first refractive index-adjusting layer 56 was supplied to the end portion of the optical fiber array 18. The adhesive used in this procedure had a refractive index of 1.8.

Subsequently, in Step S104, the adhesive was supplied through the gap between the holding plate 20 and the base 14 or through an unillustrated adhesive-pouring port formed for the holding plate 20, and then the adhesive was cured.

After that, in Step S105, polishing treatment was applied to the end surface 14a of the base 14 and the end surface 16a of each of the optical fibers 16. The optical path of the reflected light 52 changes depending on the angle of polishing. Therefore, the polishing treatment was performed so that the distance from the end surface 16a of each of the optical fibers 16 to the portion for splitting the reflected light 52 to the outside of the clad 54 was the distance necessary as designed. In the embodiment of the present invention, the polishing treatment was applied to the end surface 14a of the base 14 and the end surface 16a of each of the optical fibers 16 so that the distance was 380 μm. The end surface angle α, i.e., the angle α of the end surface 16a of each of the optical fibers 16 with respect to the reference plane was 8°.

Subsequently, in Step S106 shown in FIG. 18, the reflective film 130 (half mirror) was formed on the end surface 14a of the base 14 and the end surface 16a of each of the optical fibers 16. A multilayer film of a silicon oxide film and a titanium oxide film to give 10% reflected light and 90% transmitted light, was formed on the end surface 14a of the base 14 and the end surface 16a of each of the optical fibers 16 by vapor deposition.

Subsequently, in Step S107, the total reflection member 92 was installed. On condition that an adhesive having a refractive index of 1.8 was used as the adhesive for the first refractive index-adjusting layer 56, the angle (angle formed with respect to the reference plane (vertical plane)) of the end surface 92a of the total reflection member 92 was 19°. Accordingly, the angle of incidence of the reflected light 52 into the light-receiving element 70 installed thereafter was 0°.

The reflected light 52 was split from the clad 54 at a position of about 170 μm from the end surface 16a of the optical fiber 16. Therefore, the length of the total reflection member 92 was 200 μm, and the position for splitting the reflected light 52 from the clad 54 was located at a position of 150 μm from the front surface 92b of the total reflection member 92 (see FIG. 14).

The total reflection member 92 was fixed with a UV-curable adhesive having a refractive index of 1.8 (adhesive used as the first refractive index-adjusting layer 56) so that the first refractive index-adjusting layer 56 was reliably formed at the position for splitting the reflected light 52 from the clad 54. The total reflection member 92 was successfully installed without any dispersion with respect to the respective channels, because the positioning was performed while observing the end surface 16a of each of the optical fibers 16.

After that, in Step S108 shown in FIG. 18, the light-receiving element array 32 was installed. In this step, the backward end of the total reflection member 92 (portion on the end surface 92a) was firstly recognized with an image, and the light-receiving element array 32 on the wiring board 36 was positioned. In this procedure, a laser beam having a wavelength of 1.55 μm previously came into the end of the optical fiber array 18, and the outgoing reflected light 52 was received by the light-receiving element array 32 to finely adjust the installation position so that the output was maximized while monitoring the output of the light-receiving element array 32. In this procedure, the adjustment was performed while monitoring the outputs of the light-receiving elements 70 of a channel 1 and a channel 8 of the light-receiving element array 32. The output of the light-receiving element 70 was monitored and detected by applying a probe to the wiring pattern 34 formed on the wiring board 36.

The light-receiving element array 32 was installed in the height direction at a position of 20 μm from the total reflection member 92, because the wiring board 36 was installed on the upper end surfaces (installation surfaces 42) of the side walls 40 of the base 14. In this procedure, an adhesive of the thermosetting type was previously applied to the space between the wiring board 36 and the installation surfaces 42. A UV-curable adhesive having a refractive index of 2.8 to serve as the second refractive index-adjusting layer 94 was charged to the gap of 20 μm between the total reflection member 92 and the light-receiving element array 32, and the adhesive was cured by the irradiation of ultraviolet light.

After that, in Step S109, the entire base 14 including the optical fiber array 18 was heated to 80° C. to simultaneously perform the thermal aging of the UV-curable adhesive and the curing of the thermosetting type adhesive.

Finally, in Step S110 shown in FIG. 18, an inspection was performed. A light of 13 dB was confirmed as the reflected light 52 (monitoring light). The crosstalk between the channels was 40 dB which was satisfactory. The loss of the signal light transmitted through the core 50 of the optical fiber 16 was 1 dB including the attenuation of the reflected light component. Thus, there was no problem in the result.

With these steps described above, the optical device (optical device 10E according to the fifth embodiment) was completed, provided with the monitoring function and having the fiber array of 8 cores and 250 μm pitches.

In this case, the optical device was successfully manufactured to have a compact size, where the length of the portion on which the holding plate 20 was installed was 3 mm, the length of the monitor section 30 was 3 mm, the length of the placement surface 24 was 3 mm, the length of the open section 28 was 2 mm, and the entire length was 11 mm. Both of the thicknesses of the base 14 and the holding plate 20 were 1.5 mm, and the width was 5 mm.

Next, an optical device 10H according to an eighth embodiment will be explained below with reference to FIG. 19.

The optical device 10H according to the eighth embodiment has a similar constitution approximately to the optical device 10E according to the fifth embodiment as described above except for the following modifications.

That is, an air layer 133 contacts the core end surfaces 16a of the respective optical fibers 16. The reflected light 52, which is obtained by utilizing the difference in refractive index on the core end surface 16a, is obtained through a refractive index-adjusting layer to the outside of the clad 54 of the optical fiber 16. The air layer 133 close to the core end surface 16a has a refractive index of 1. Therefore, it is possible to obtain the reflected light 52 in a quantity necessary to perform the monitoring.

Figure 19:
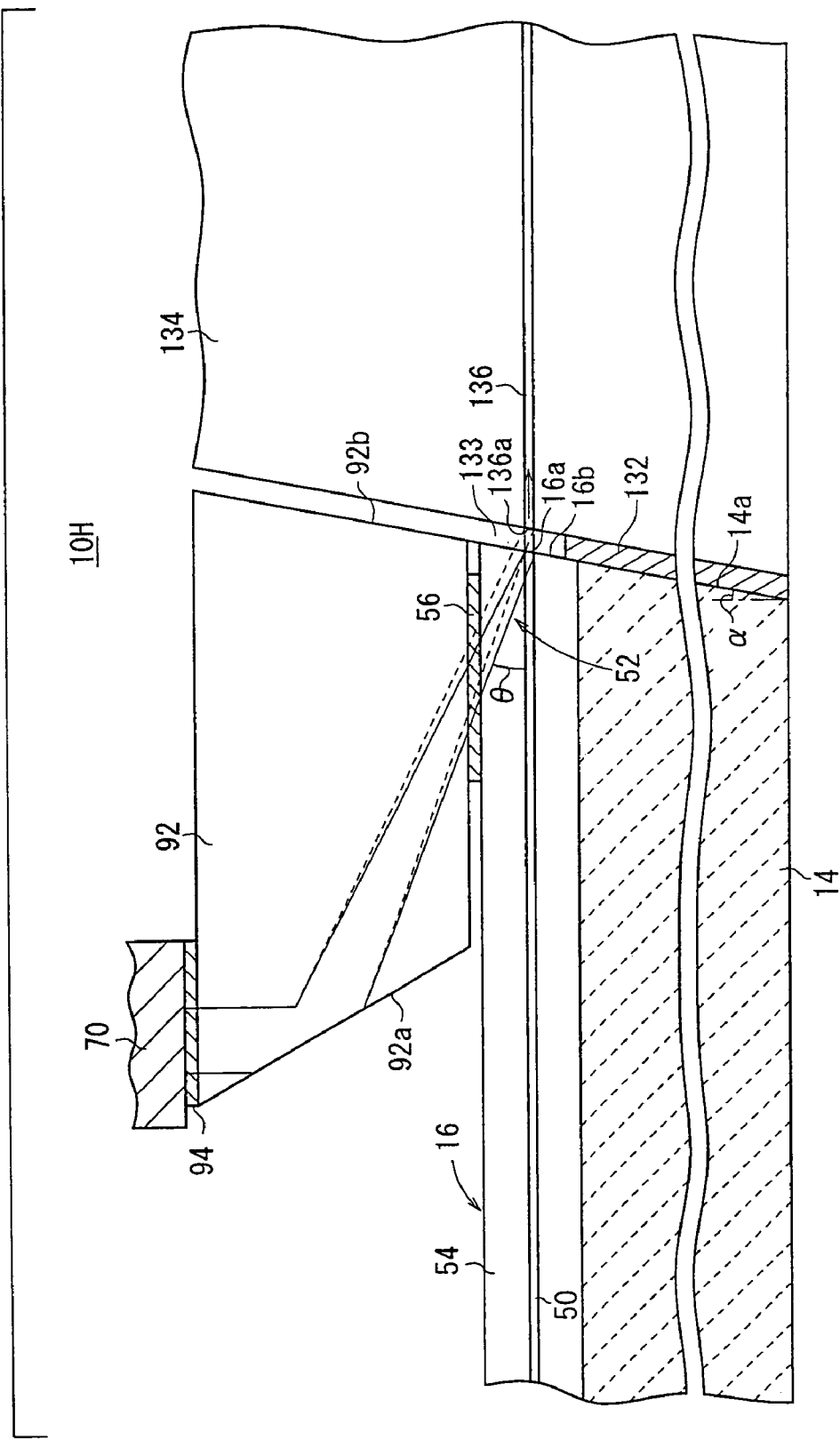
FIG. 19 is a magnified view illustrating an example of a monitor section of the optical device according to the eighth embodiment.

As shown in FIG. 19, an optical part 134 such as PLC is fixed to a portion of the end surface of the substrate 14 except for the core end surface 16a of the optical fiber 16, for example, by a UV-curable adhesive 132. In this arrangement, at least the core end surface 16a of the optical fiber 16 and an end surface 136a of an optical waveguide path 136 of the optical part 134 are coupled to one another by the air layer 133.

For keeping the adhesive off the core end surface 16a of the optical fiber 16, for example, the adhesive 132 is applied to the space between the substrate 14 and the optical part 134, and the adhesive 132 is cured before the adhesive 132 arrives at the core end surface 16a.

The signal light components in the signal light transmitted through the core 50 of the optical fiber come into the waveguide path 136 of the optical part 134 again, except for the reflected light component reflected on the core end surface 16a of the optical fiber 16 and the end surface 136a of the optical waveguide path 136. The signal light components are transmitted through the waveguide path 136.

The angle (hereinafter referred to as "angle of reflection θ"), which is formed by the reflected light 52 with respect to the optical axis of the optical fiber 16, is preferably an angle at which the reflected light 52 is totally reflected by the interface of the clad 54. Such an angle at which the reflected light 52 is totally reflected by the interface of the clad 54 herein means an angle at which the total reflection is effected at the interface of the clad 54 if the first refractive index-adjusting layer 56 is absent. Accordingly, almost all of the reflected light 52 is not returned to the core 50 of the optical fiber 16, and it is advanced toward the interface of the clad 54 of the optical fiber 16. This results in the prevention of a return reflection light and the improvement in the monitor efficiency.

The angle (end surface angle) α, which is formed by the core end surface 16a of the optical fiber 16 with respect to the reference plane, is within a range of 6° to 45°. If the end surface angle α is small, the return reflection light toward the core 50 appears. Therefore, the end surface angle α is preferably at least not less than 6°. An extremely large end surface angle α is not appropriate for fear of the increase in size of the optical device 10A. However, it is a merit that the position of the photodetector 70 can be arbitrarily set by adjusting the end surface angle α. Accordingly, it is preferable that the range of the end surface angle α is 6° to 45°. In particular, when it is intended to miniaturize the optical device 10A, it is preferable that the range is 6° to 20°. The attenuation of the reflected light caused by the large end surface angle α is small. On condition that the end surface angle α is within a proper range, the reflected light component returned to the core 50 has an extremely small value of not less than 60 dB, even when the core end surface 16a of the optical fiber 16 is close to the air layer 133.

As described above, in the optical device 10H according to the eighth embodiment, the waveguide path 136 of the another optical part 134 is arranged on the core end surface 16a of each of the optical fibers 16 with the interposed air layer 133. Accordingly, the air layer 133 rather than the adhesive is interposed between the core end surface 16a of each of the optical fibers 16 and the another optical part 134.

Therefore, it is unnecessary to consider, for example, the exfoliation of the adhesive due to changes over time and the deterioration of the adhesive itself. Therefore, it is possible to maintain the stable joining with respect to the other optical part 134, and it is possible to maintain the high monitoring efficiency for a long period of time.

Further, in the optical device 10H according to the eighth embodiment, the reflected light 52, which comes from the core end surface 16a of the optical fiber 16, comes also into the light-receiving surface of the photodetector 70 at the proper angle for receiving the light with respect to the light-receiving surface of the photodetector 70, i.e., at the right angle with respect to the light-receiving surface. Therefore, a part of the spot of the reflected light 52 may not protrude from the light-receiving surface. Thus, it is possible to improve the sensitivity of the photodetector 70.

As a result, for example, when it is assumed that the UV-curable adhesive 132 is interposed between end surface 14a of the substrate 14 (except for the core end surface 16a of the optical fiber 16) and the other optical part 134 fixed to the end surface 14a, the ultraviolet light is sufficiently radiated onto the UV-curable adhesive 132 from above. Therefore, it is possible to realize the joining with the UV-curable adhesive 132.

In the eighth embodiment, the photodetector 70 can be also installed with a distance from the end surface 16a of the optical fiber 16 because the total reflection member 92 is used. In this case, it is possible to secure a distance of several hundred micrometers (μm).

Considering the transmission of the ultraviolet light during UV curing, it is necessary to provide, as the distance for the transmission of the ultraviolet light, a distance of not less than 100 μm from the end surface 16a of the optical fiber 16. The distance can be obtained by the adjustment of the thickness and the length of the total reflection member 92.

Figure 20:
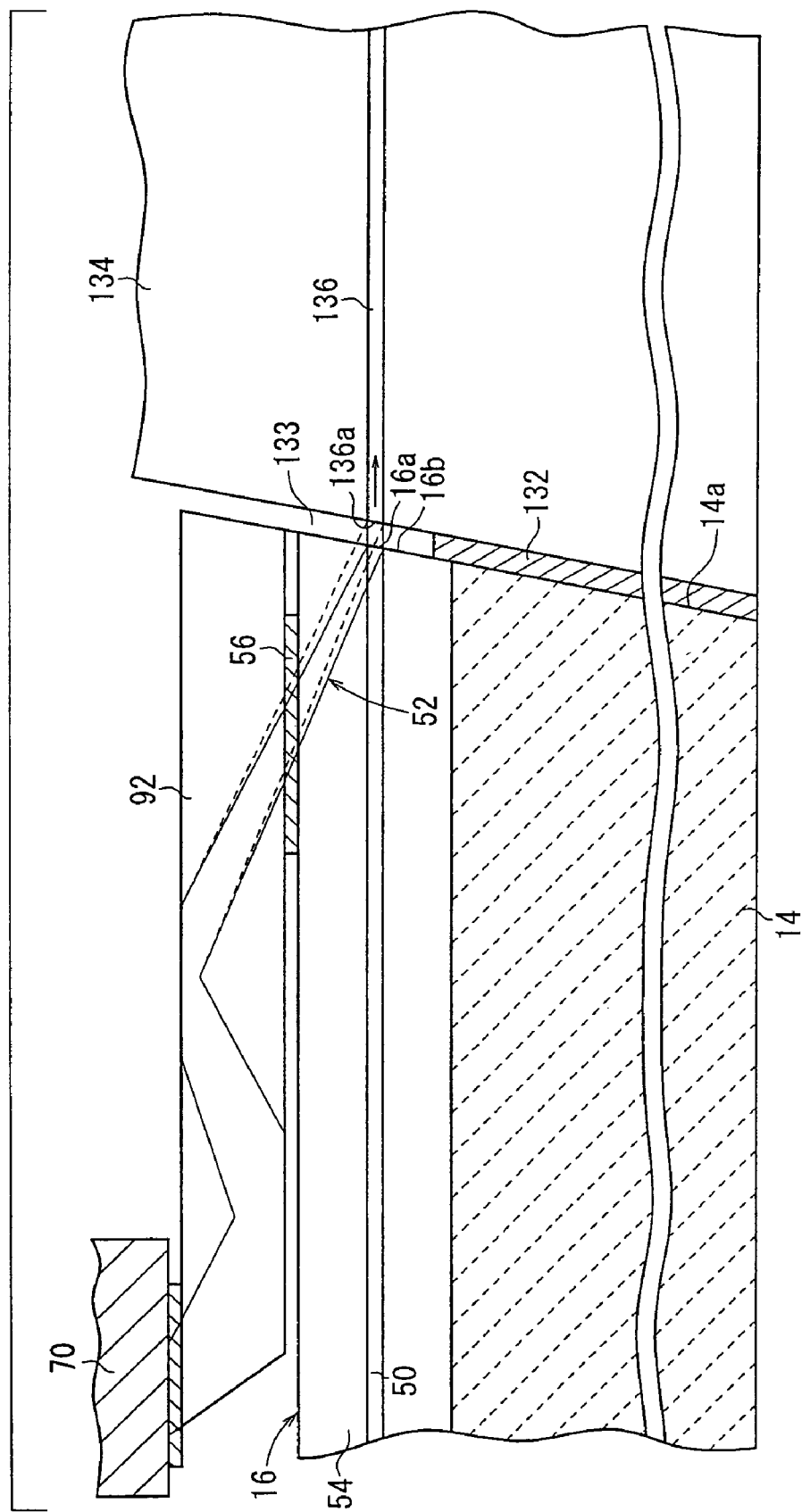
FIG. 20 is a magnified view illustrating another example of a monitor section of the optical device according to the eighth embodiment.

For example, when the thickness of the total reflection member 92 is restricted due to an installation space, the arrangement shown in FIG. 20 may be adopted. The total reflection of the reflected light 52 is repeated in the total reflection member 92, and the reflected light 52 comes into the photodetector 70 thereafter. By doing so, it is possible to obtain the distance from the end surface 16a of the optical fiber 16 to the position of installation of the photodetector 70 even when the total reflection member 92 is thin.

The embodiment described above is illustrative of the method of keeping the adhesive 132 off the core end surface 16a of the optical fiber 16 when the adhesive 132 is supplied to the space between the substrate 14 and the optical part 134. Alternatively, although not shown, the welding may be performed by using a YAG laser or the like after the substrate 14 and the optical part 134 are disposed closely in a distance in which the substrate 14 and the optical part 134 approximately contacts each other.

Figure 21:
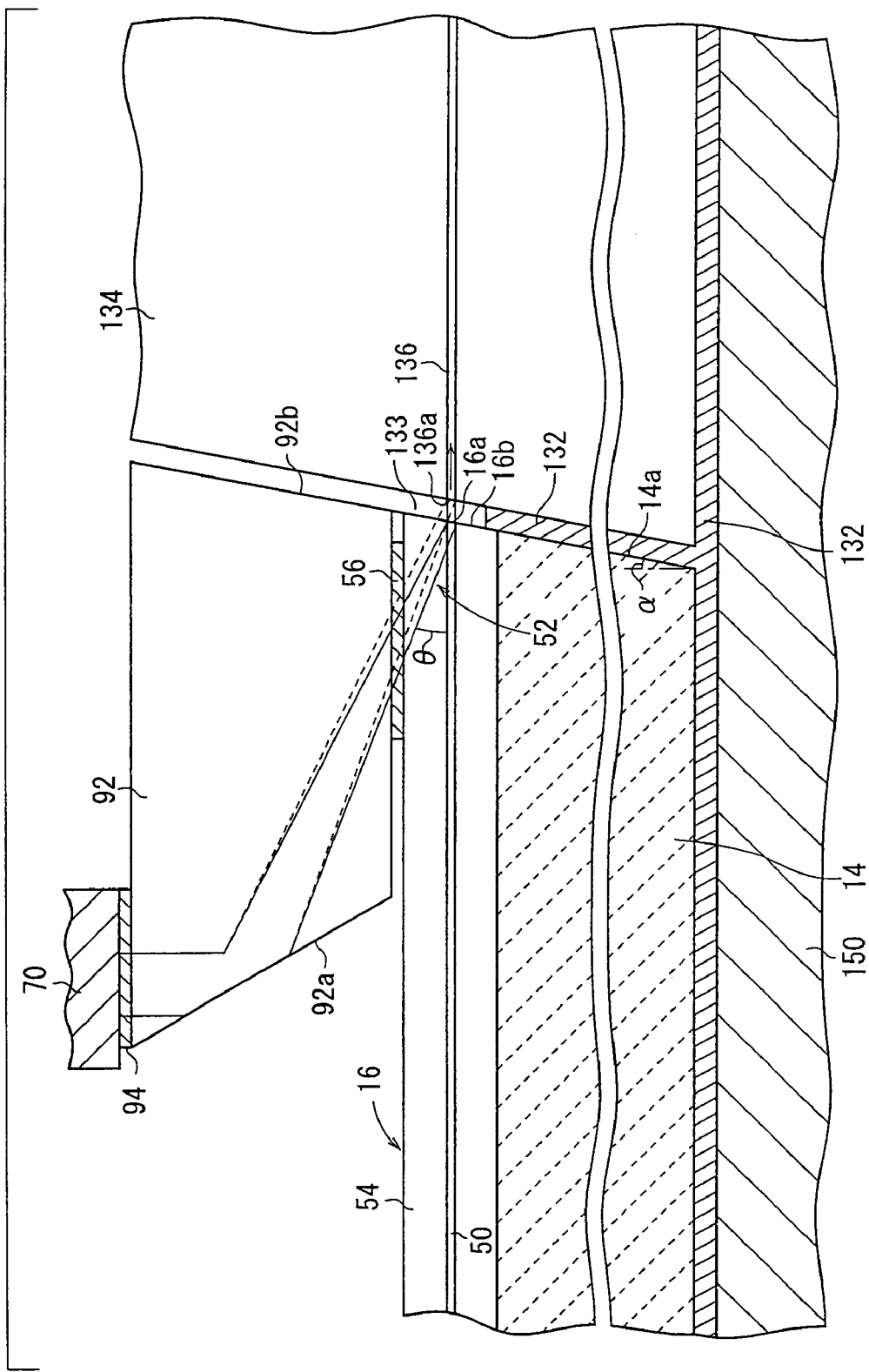
FIG. 21 shows another example of a method of fixing the optical device according to the eighth embodiment.

Alternatively, as shown in FIG. 21, a base 150 is prepared, on which at least the substrate 14 and the optical part 134 are placed. The adhesive 132 is provided on the base 150, and then the substrate 14 and the optical part 134 are fixed on the base 150 in which the substrate 14 and the optical part 134 are disposed closely in a distance in which the substrate 14 and the optical part 134 approximately contact each other. In this procedure, the adhesive 132 may enter the gap between the substrate 14 and the optical part 134 due to the surface tension of the adhesive 132. However, in such a case, the adhesive 132 may also be cured before the adhesive 132 arrives at the core end surface 16a.

Figure 22:
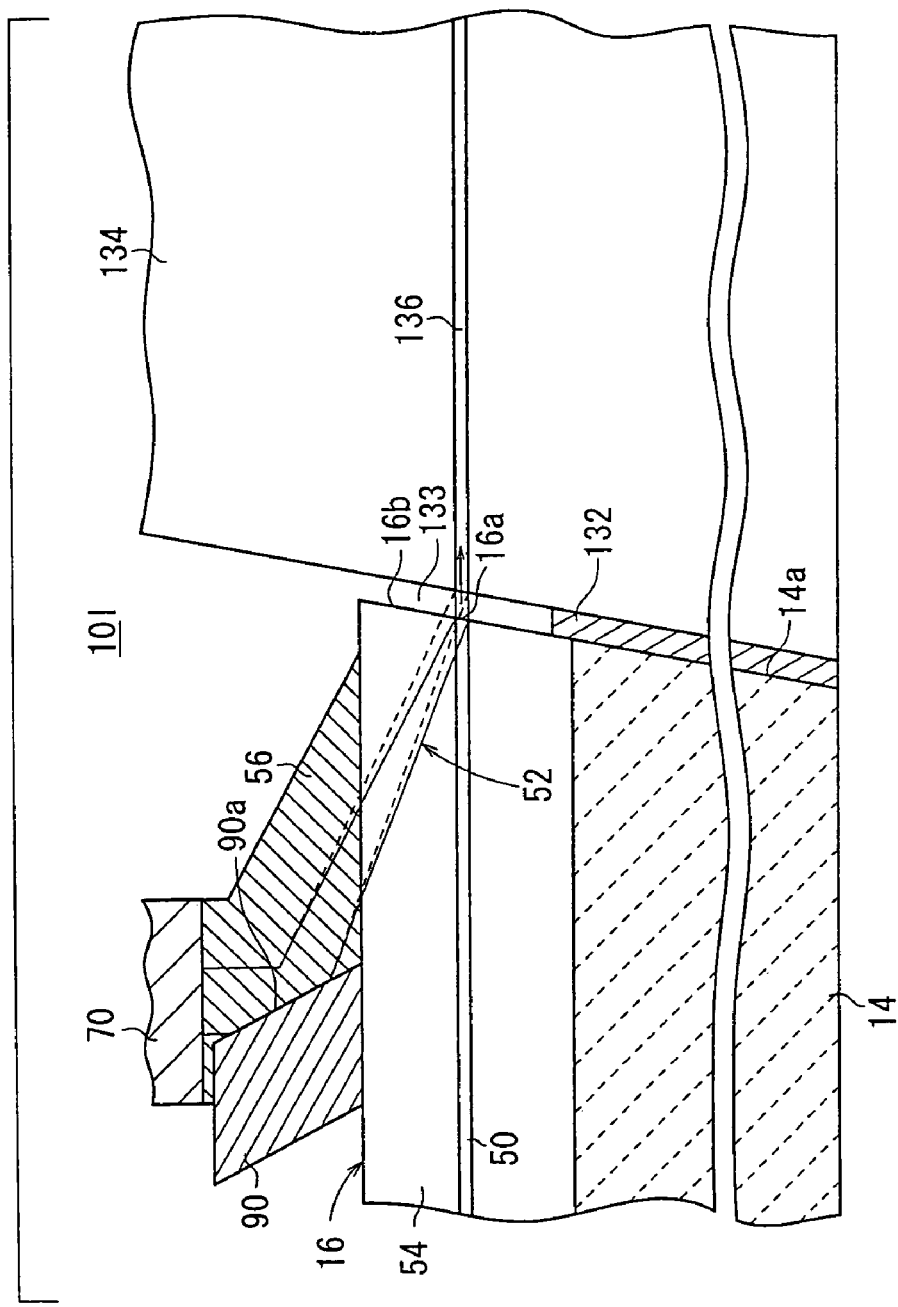
FIG. 22 is a magnified view illustrating an example of a monitor section of an optical device according to a ninth embodiment.

Next, an optical device 10I according to a seventh embodiment will be explained with reference to FIG. 22.

The optical device 10I according to the ninth embodiment is constructed in approximately the same manner as the optical device 10F (see FIG. 16) according to the sixth embodiment described above. However, the optical device 10I differs in that the air layer 133 is interposed between the core end surface of the optical fiber and the another optical part.

In the optical device 10I according to the ninth embodiment, it is possible to maintain a stable joining with respect to the other optical part 134 for a long period of time, and it is possible to maintain a high monitoring efficiency. Moreover, the optical device 10I according to the ninth embodiment has the similar effect to the optical device according to the sixth embodiment described above.

Further, the reflected light 52 from the core end surface 16a of the optical fiber 16 comes into the light-receiving surface of the photodetector 70 at the proper angle in receiving the light. Therefore, it is possible to improve the sensitivity in photodetecting when the photodetector 70 is installed. Further, when the UV-curable adhesive 132 is used to fix the substrate 14 and the other optical part 134, it is possible to secure a sufficient distance to transmit the ultraviolet light, as the distance from the end surface 16b of the optical fiber 16 to the photodetector 70.

Next, an optical device 10J according to a tenth embodiment will be explained with reference to FIG. 23.

The optical device 10J according to the tenth embodiment has an approximate feature to the optical device 10G (see FIG. 17) according to the seventh embodiment described above. However, the optical device 10J according to the tenth embodiment differs in that the air layer 133 is interposed between the core end surface of the optical fiber and the another optical part.

It is possible to maintain a stable joining with respect to the other optical part 134 for a long period of time, and it is possible to maintain a high monitoring efficiency. Moreover, the optical device 10J according to the tenth embodiment has a similar effect to the optical device according to the seventh embodiment described above.

In the tenth embodiment, a distance of about 100 μm can merely be secured from the end surface 16a of the optical fiber 16 to the photodetector 70. In this case, as shown in FIG. 23, for example, when the optical part 140, which is fixed to the substrate 14, is a silicon substrate having the waveguide path 142, it may be impossible to sufficiently radiate the ultraviolet light onto the UV-curable adhesive 132, because the silicon substrate cannot allow the ultraviolet light to pass therethrough.

However, the problem can be avoided by using, for example, a form of pigtail in the similar method to the seventh embodiment described above.

Figure 23:
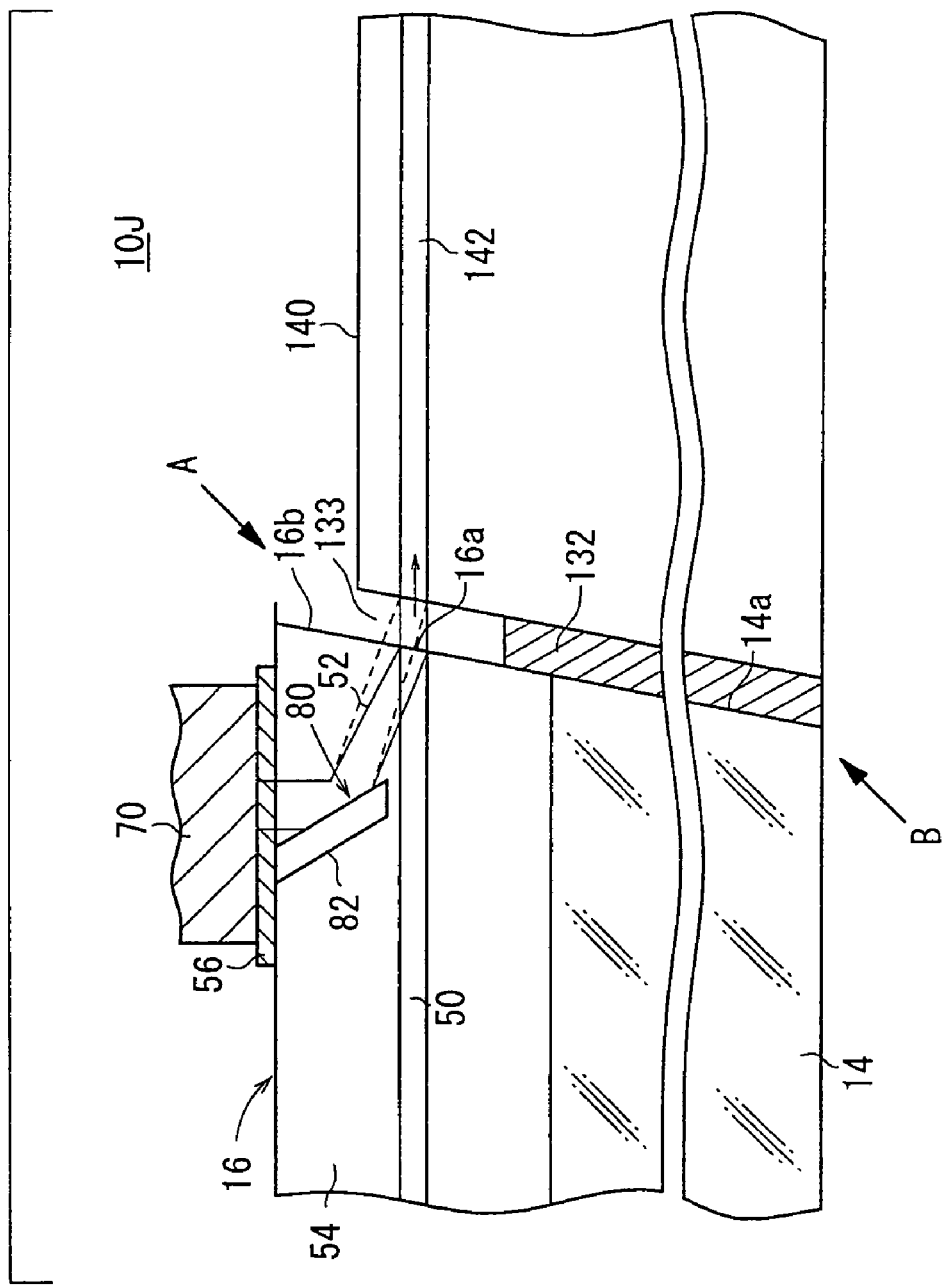
FIG. 23 is a magnified view illustrating an example of a monitor section of an optical device according to a tenth embodiment.

That is, as shown in FIG. 23, when a transparent fixture (not shown) is used for the upper portion of the optical part 140, or when there is no jig such as a fixture, then the ultraviolet light is radiated in a direction toward the end surface 16b of the optical fiber 16 (see the arrow A) from a position over the optical part 140 for the portion disposed higher than the core 50 of the optical fiber 16, and the ultraviolet light is radiated in a direction toward the end surface 16b of the optical fiber 16 (see the arrow B) from the back surface side of the substrate 14 for the portion disposed lower than the core 50 of the optical fiber 16. By doing so, it is possible to cure the UV-curable adhesive 132 between the substrate 14 and the optical part 140. In this case, it is of course necessary that the substrate 14 itself is transparent.

Next, an explanation will be made with reference to FIGS. 19 and 24 about an embodiment of the method of manufacturing the optical device 10H according to the eighth embodiment.

Figure 24:
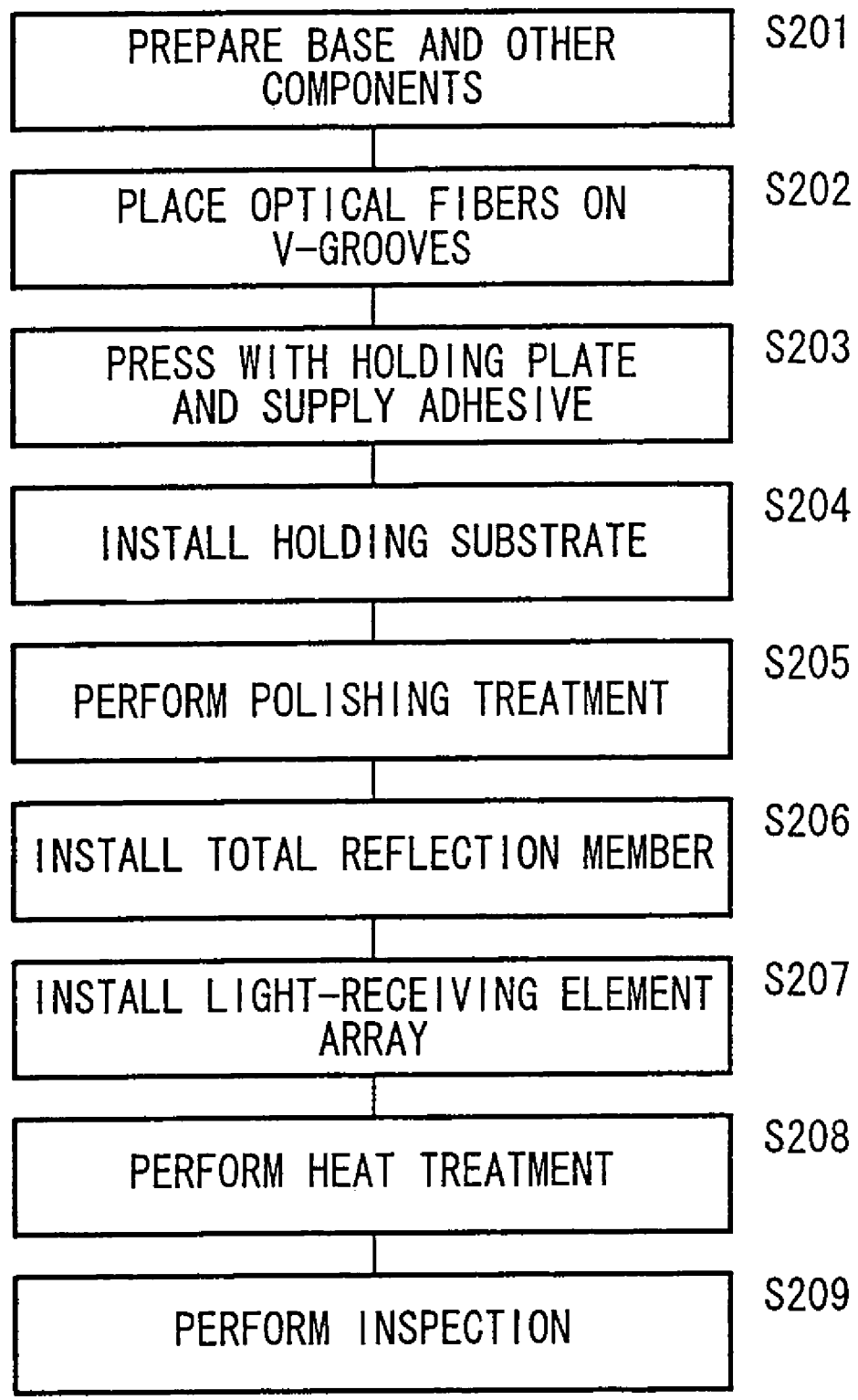
FIG. 24 is a block diagram illustrating steps of a method of producing the optical device according to the eighth embodiment.

At first, in Step S201 shown in FIG. 24, the substrate 14, the wiring board 36, and the total reflection member 92 are prepared (see FIG. 19).

In this procedure, a material, in which a plurality of the V-grooves 12 and the side walls 40 were formed integrally, was prepared as the substrate 14. Alumina was adopted for the wiring board 36, and the thickness was 1 mm. A photodiode having a thickness of 200 μm was used as the photodetector 70 (see FIG. 19). A glass having a thickness of 300 μm and a refractive index of 2.2 was used for the total reflection member 92.

Taking machining accuracy into consideration, for example, the heights of the installation surfaces 42 of the side walls 40 of the substrate 14 were set so that the distance was 320 μm between the optical fiber array 18 and the photodetector array 32. The depth of the V-groove was set so that the top of the optical fiber 16 protruded by about 50 μm from the upper surface of the V-groove 12.

After that, in Step S202 shown in FIG. 24, the optical fiber 16 was placed on the V-groove 12. After that, in Step S203, the holding plate 20 was placed on the substrate 14, for example, in the similar method as shown in FIG. 13. Subsequently, load was applied so that the optical fiber array 18 was pressed against the V-grooves 12, and adhesive as the first refractive index-adjusting layer 56 was supplied to the end portion of the optical fiber array 18. The adhesive used in this procedure had a refractive index of 1.8.

Subsequently, in Step S204, the adhesive was supplied through the gap between the holding plate 20 and the substrate 14 or through an unillustrated adhesive-pouring port formed for the holding plate 40, and then the adhesive was cured.

After that, in Step S205, polishing treatment was applied to the end surface 14a of the substrate 14 and the end surface 16a of each of the optical fibers 16. The optical path of the reflected light 52 changes depending on the angle of polishing. Therefore, the polishing treatment was performed so that the distance from the end surface 16a of each of the optical fibers 16 to the portion for obtaining the reflected light 52 to the outside of the clad 54, was the distance necessary as designed. In the embodiment of the present invention, the polishing treatment was applied to the end surface 14a of the substrate 14 and the end surface 16a of each of the optical fibers 16 so that the distance was 380 μm. The end surface angle, i.e., the angle φ of the end surface 16a of each of the optical fibers 16 with respect to the reference plane was 8°.

Subsequently, in Step S206 shown in FIG. 24, the total reflection member 92 was installed. On condition that an adhesive having a refractive index of 1.8 was used as the adhesive for the first refractive index-adjusting layer 56, the angle (angle formed with respect to the reference plane (vertical plane)) of the end surface 92a of the total reflection member 92 was 19°. Accordingly, the angle of incidence of the reflected light 52 into the photodetector 70 installed thereafter was 0°.

The reflected light 52 was obtained from the clad 54 at a position of about 170 μm from the end surface 16a of the optical fiber 16. Therefore, the length of the total reflection member 92 was 200 μm and the position for obtaining the reflected light 52 from the clad 54 was located at a position of 150 μm from the front surface 92b of the total reflection member 92 (see FIG. 19).

The total reflection member 92 was fixed with a UV-curable adhesive having a refractive index of 1.8 (adhesive used as the first refractive index-adjusting layer 56) so that the first refractive index-adjusting layer 56 was reliably formed at the position for obtaining the reflected light 52 from the clad 54. The total reflection member 92 was successfully installed without any dispersion with respect to the respective channels, because the positioning was performed while observing the end surface 16a of each of the optical fibers 16.

After that, in Step S207 shown in FIG. 24, the photodetector array 32 was installed. In this step, the backward end of the total reflection member 92 (portion on the end surface 92a) was firstly recognized with an image, and the photodetector array 32 on the wiring board 36 was positioned. In this procedure, a laser beam having a wavelength of 1.55 μm previously come into the end of the optical fiber array 18, and the outgoing reflected light 52 was received by the photodetector array 32 to finely adjust the installation position so that the output was maximized while monitoring the output of the photodetector array 32. In this procedure, the adjustment was performed while monitoring the outputs of the photodetectors 70 of a channel 1 and a channel 8 of the photodetector array 32. The output of the photodetector 70 was monitored and detected by applying a probe to the wiring pattern 34 formed on the wiring board 36.

The photodetector array 32 was installed in the height direction at a position of 20 μm from the total reflection member 92, because the wiring board 36 was installed on the upper end surfaces (installation surfaces 42) of the side walls 40 of the substrate 14. In this procedure, an adhesive of the thermosetting type was previously applied to the space between the wiring board 36 and the installation surfaces 42. A UV-curable adhesive having a refractive index of 2.8 as the second refractive index-adjusting layer 94 was charged to the gap of 20 μm between the total reflection member 92 and the photodetector array 32, and the adhesive was cured by the irradiation of ultraviolet light.

After that, in Step S208, the entire substrate 14 including the optical fiber array 18 was heated to 80° C. to simultaneously perform the thermal aging of the UV-curable adhesive and the curing of the thermosetting type adhesive.

Finally, in Step S209 shown in FIG. 24, an inspection was performed. A light of 13 dB was confirmed as the reflected light 52 (monitoring light). The crosstalk between the channels was 40 dB which was satisfactory. The loss of the signal light transmitted through the core 50 of the optical fiber 16 was 1 dB including the attenuation of the reflected light component. Thus, there was no problem in the result.

With these steps described above, the optical device (optical device 10H according to the eighth embodiment) was completed, being provided with the monitoring function and having the fiber array of 8 cores and 250 μm pitches.

In this case, the optical device was successfully manufactured to have a compact size in which the length of the portion on which the holding plate 20 was installed was 3 mm, the length of the monitor section 30 was 3 mm, the length of the placement surface 24 was 3 mm, the length of the open section 28 was 2 mm, and the entire length was 11 mm. Both of the thicknesses of the substrate 14 and the holding plate 20 were 1.5 mm, and the width was 5 mm.

In the optical devices 10A to 10J according to the first to tenth embodiments described above, the photodetectors 70 are mounted on the clad 54 of the optical fibers 16 with the layer 56 intervening therebetween. Alternatively, a part of the clad 54 may be cut, and the photodetectors 70 may be mounted on the cut portion.

Optical devices according to embodiments, which adopt this structure, will be explained below with reference to FIGS. 25 to 41.

Modified embodiments of the optical devices according to the first through fourth embodiments applied above structure will be typically explained as an optical device 10K according to an eleventh embodiment. Modified embodiments of the optical devices according to the fifth through tenth embodiments applied above structure will be typically explained as an optical device 10L according to a twelfth embodiment.

Figure 25:
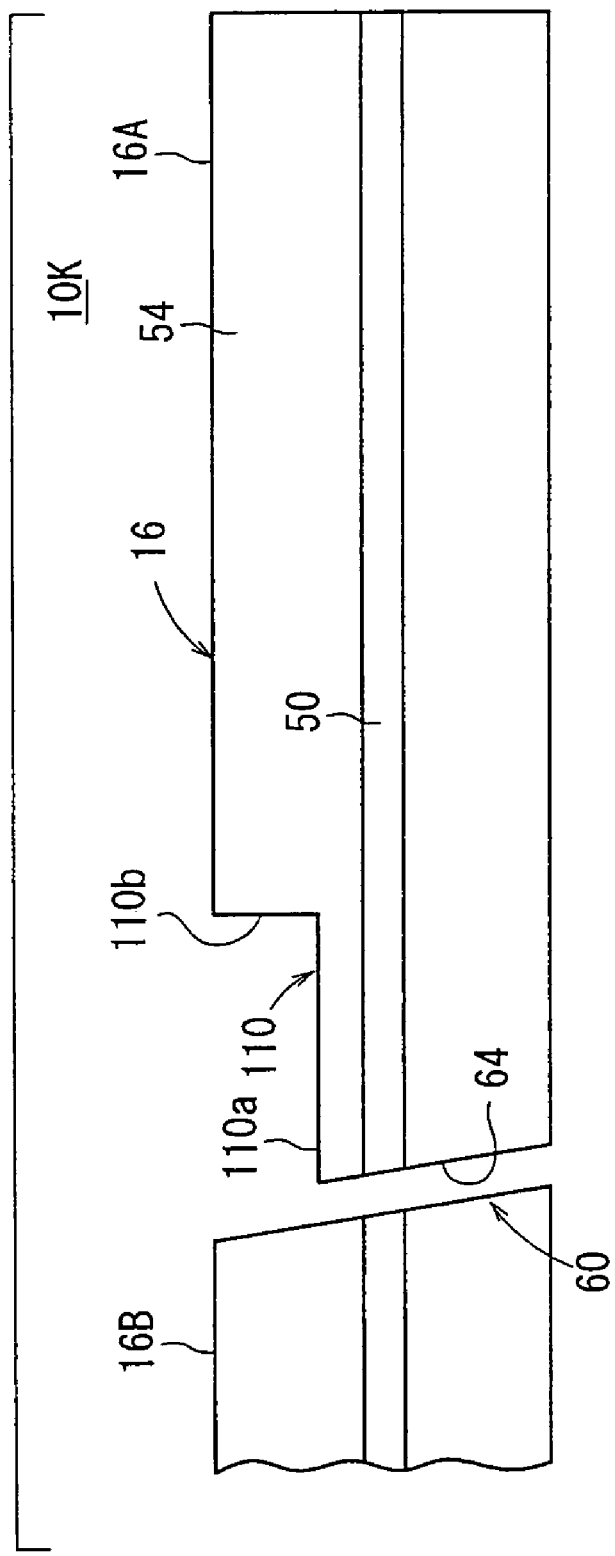
FIG. 25 is a view illustrating a state in which a recess is formed on a clad in an optical device according to an eleventh embodiment.
Figure 26:
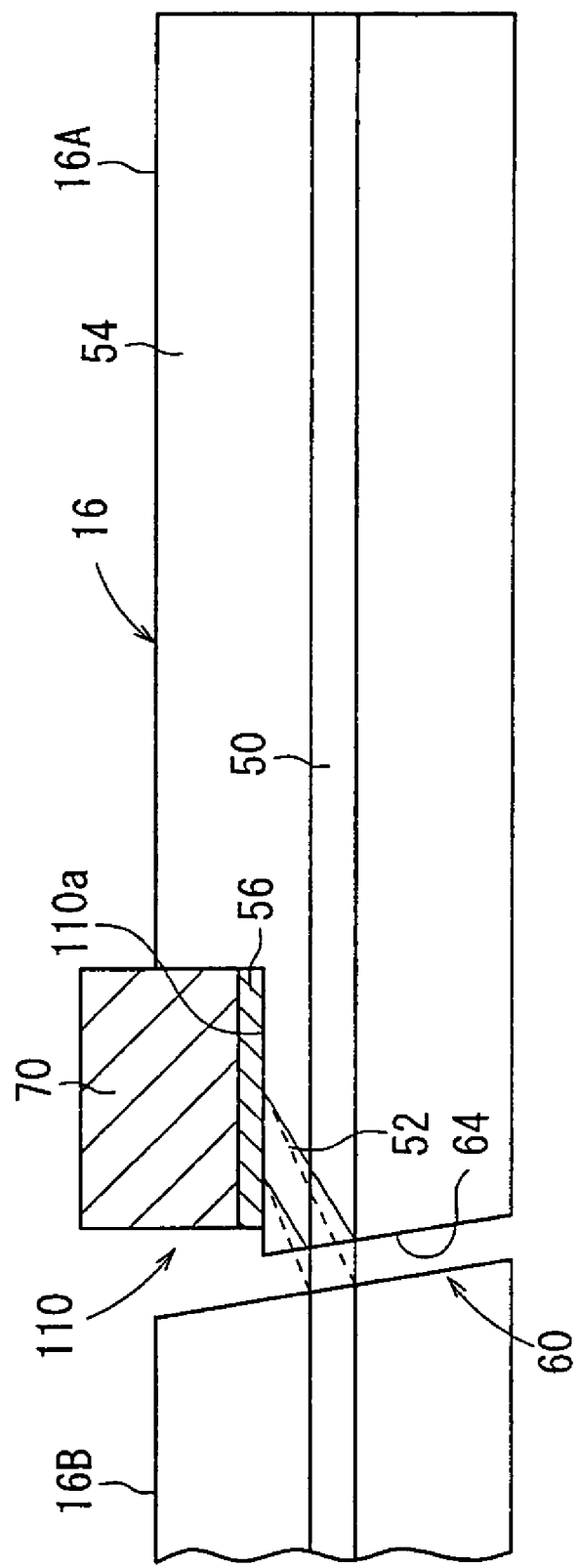
FIG. 26 is a sectional view illustrating the optical device according to the eleventh embodiment as viewed from a side position.
Figure 28:
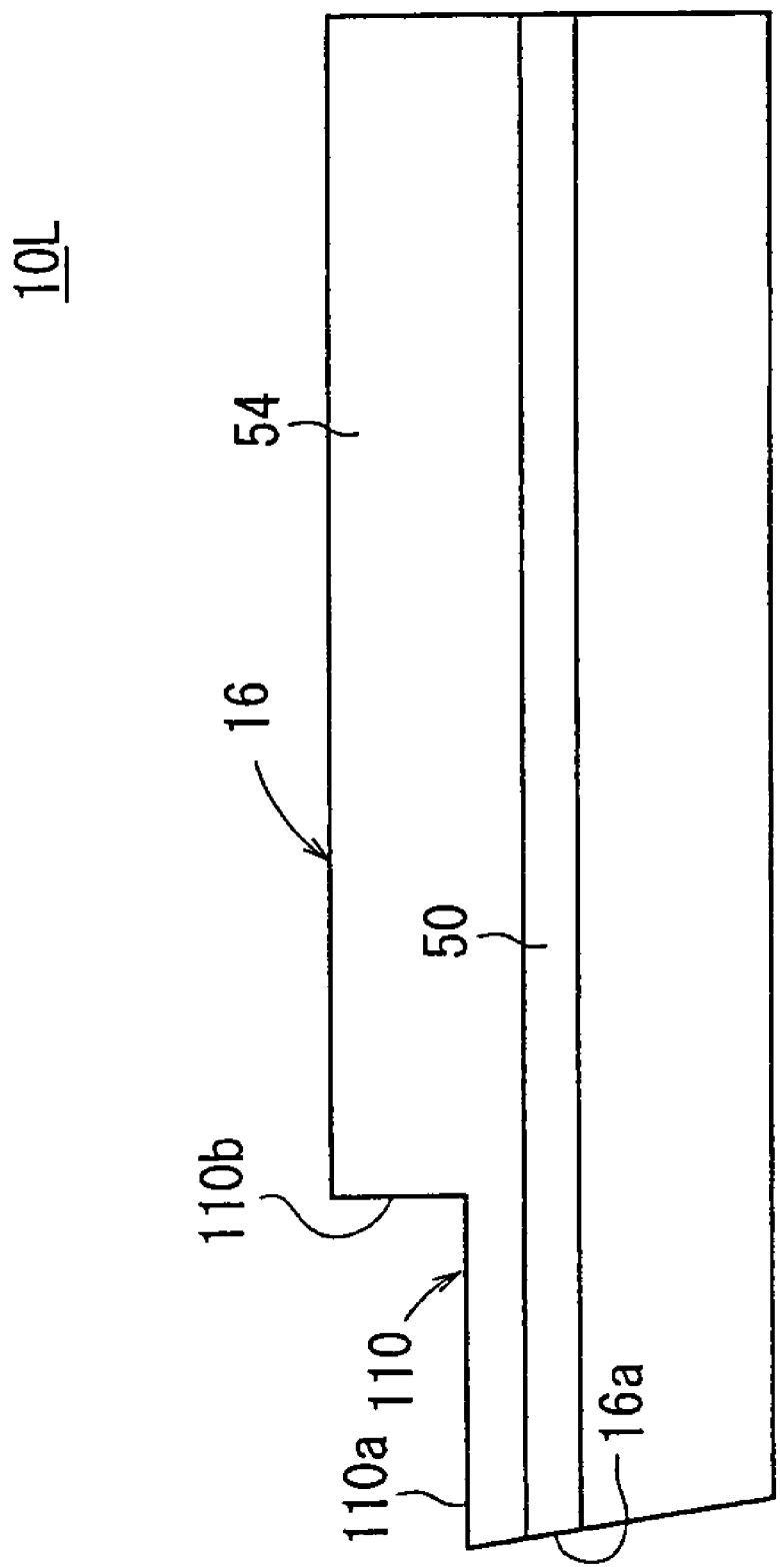
FIG. 28 shows that a recess is formed on a clad in an optical device according to a twelfth embodiment.
Figure 29:
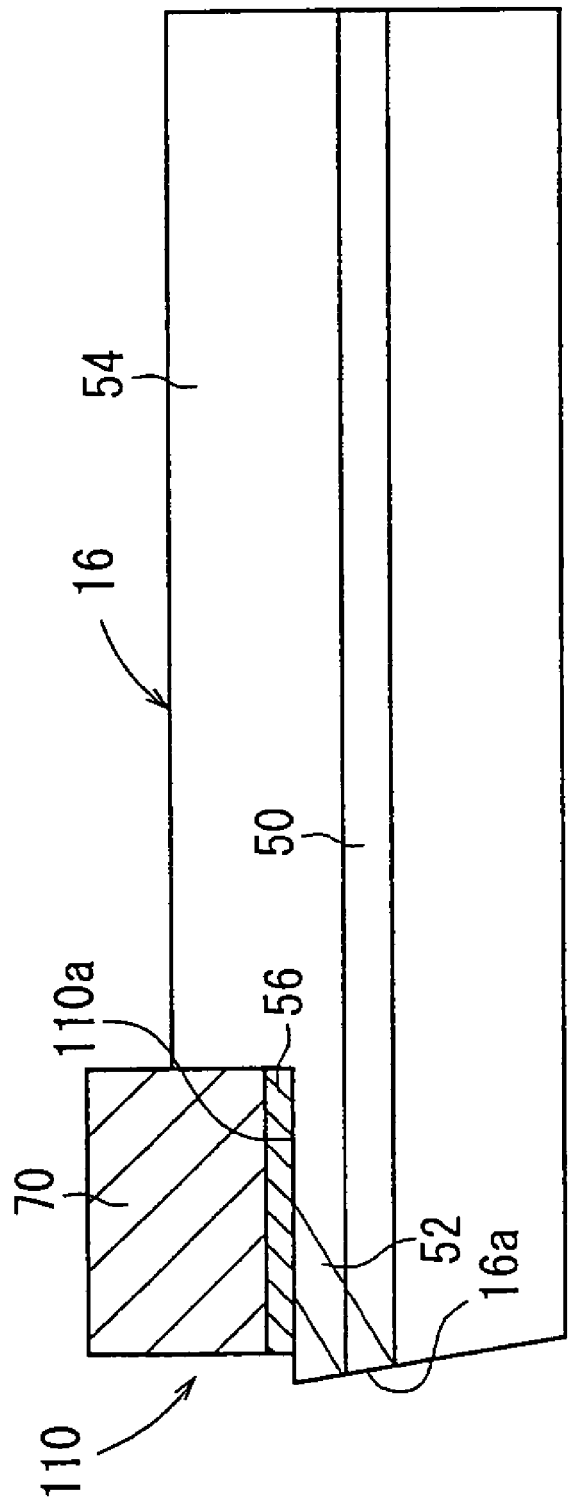
FIG. 29 is a sectional view illustrating the optical device according to the twelfth embodiment as viewed from the side.

The optical devices 10K and 10L according to the eleventh and twelfth embodiments as shown in FIGS. 25 and 28 have a portion of the clad 54 of the optical fibers 16, on which the photodetectors 70 (see FIGS. 26 and 29) are mounted, is subjected to the cutting machining to provide, for example, a recess 110 (cut portion) with a flat bottom surface 110a, and the photodetectors 70 are mounted on the recess 110 with the layer 56 (adhesive layer) intervening therebetween as shown in FIGS. 26 and 29. Accordingly, it is possible to shorten the distance from the reflecting section 60 to the light-receiving surface of the photodetectors 70.

Figure 27:
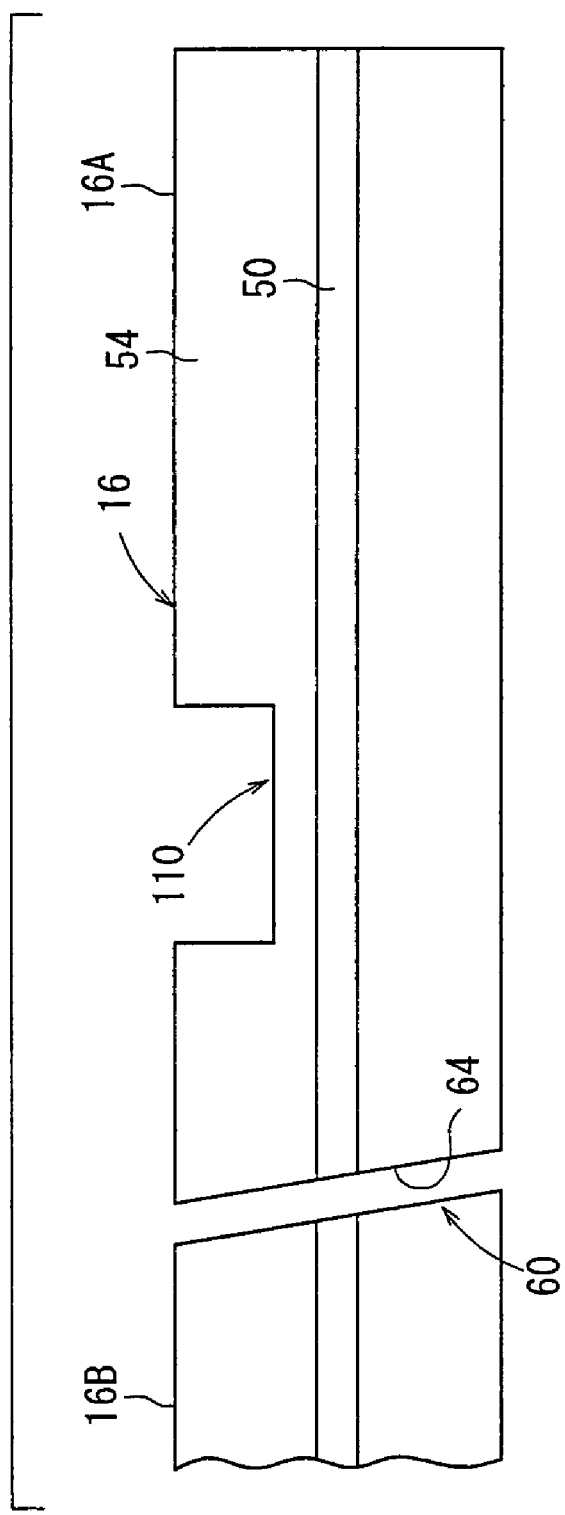
FIG. 27 is a view illustrating a state in which a recess is formed on another portion of the clad.
Figure 30:
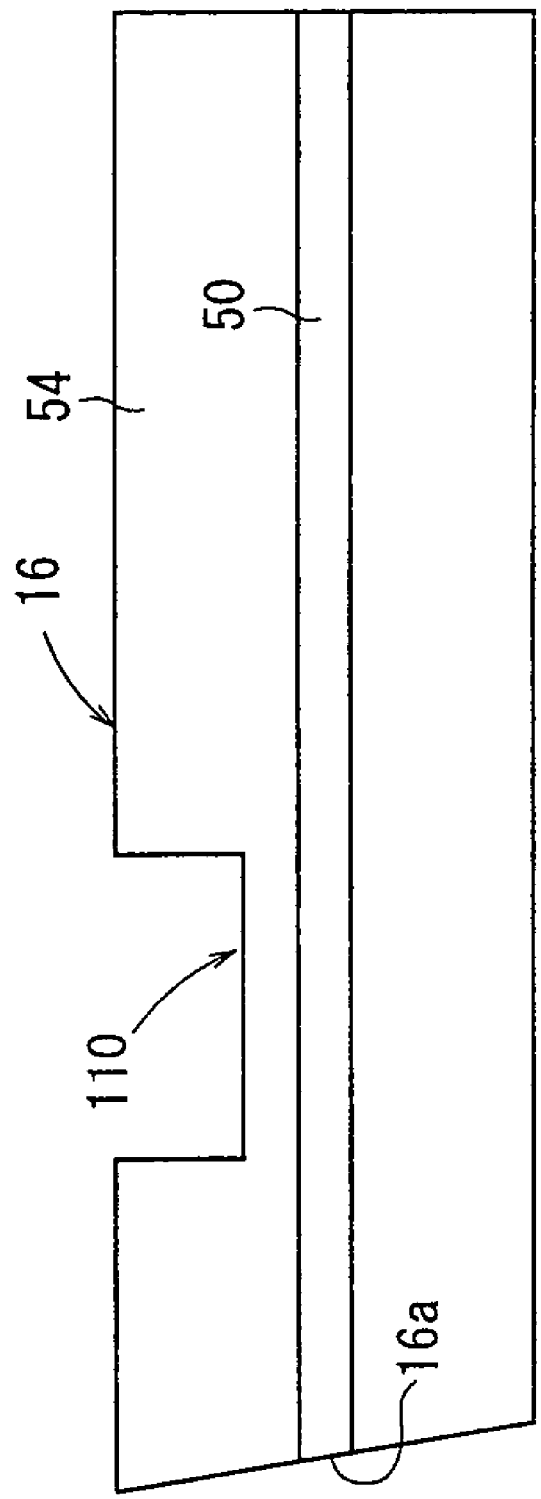
FIG. 30 shows that a recess is formed on another portion of the clad.

FIGS. 25, 26, 28 and 29 are illustrative of a case in which the bottom surface 110a of the recess 110 is formed continuously to the rear reflecting surface 64 of the rear fiber 16A. It is a matter of course that the recess 110 may be formed at a position separated far from the rear reflecting surface 64 as shown in FIGS. 27 and 30.

The optical devices 10K and 10L according to the eleventh and twelfth embodiments have the following effects.

Firstly, the optical fiber array 18 having narrow spacing distances such as those of 127 μm pitch or the like involves the following problem. That is, the spot diameter of the reflected light 52 is restricted because it is necessary to decrease the light-receiving area of the photodetectors 70. Further, the crosstalk, in which the light enters other channels, appears because the arrangement pitch is narrow. However, in the eleventh and twelfth embodiments, the recess 110 is provided on the clad 54, and the photodetectors 70 are mounted on the recess 110. Accordingly, it is possible to shorten the distance from the reflecting section 60 to the light-receiving surface of the photodetectors 70, and it is possible to decrease the spot diameter of the reflected light 52 on the light-receiving surface of the photodetectors 70. This feature is effective to reduce the crosstalk.

Secondly, the inner wall 110b of the recess 110 (see FIGS. 25 and 28), which is formed by the cutting, is used as a reference for mounting the photodetectors 70. Accordingly, it is possible to perform the passive alignment of the photodetectors 70 (as well as the photodetecting array 32) in the optical axis direction. Usually, when the photodetectors 70 (as well as the photodetecting array 32) are mounted, the installation is effected by performing the adjustment of the optical axis with respect to the optical fibers 16 while monitoring the light from the photodetectors 70 (to find the position at which the output of the light signal is observed most intensely). However, when the inner wall 110b of the recess 110 is used as the reference of installation, it is possible to eliminate the time and labor for monitoring the light signal output as described above. It is possible to shorten the time and simplify the steps required to mount the photodetectors 70 (as well as the photodetecting array 32).

Figure 31A:
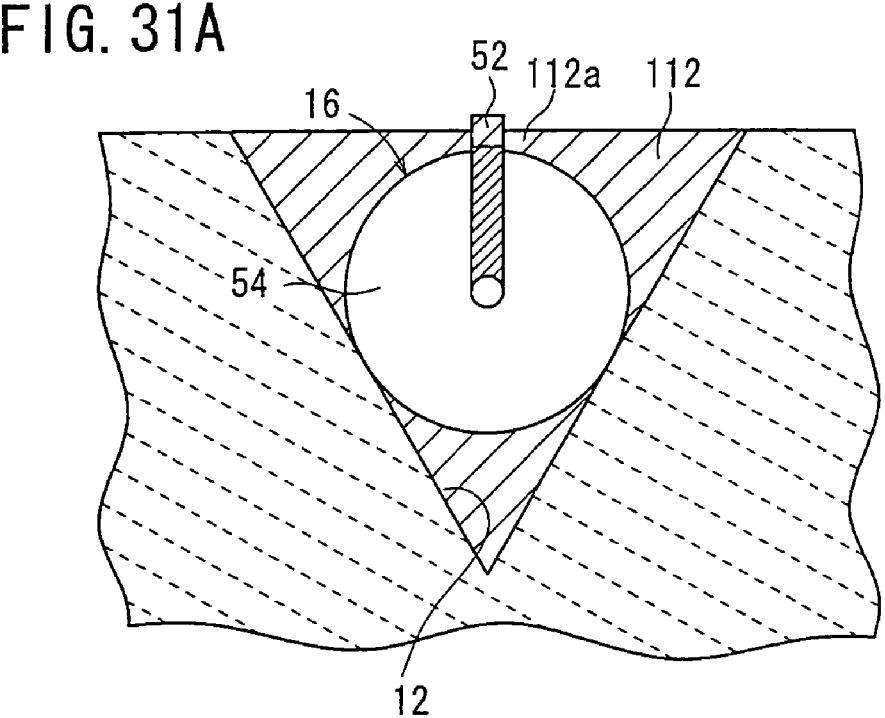
FIG. 31A is a view illustrating the influence of an adhesive remaining on the clad.

Thirdly, it is possible to eliminate the factor of loss of the reflected light 52 at an upper portion of the rear fiber 16A. That is, as shown in FIG. 31A, for example, it is assumed that the optical fibers 16 are fixed on the V-grooves 12 with an adhesive 112 which does not constitute the refractive index-adjusting layer. In this case, if the adhesive 112 remains on the clad 54 of the optical fibers 16, the photodetectors 70 are mounted on the remaining adhesive (residual adhesive 112a) with the layer 56 intervening therebetween. However, the output of the reflected light 52 is weakened at the interface between the clad 54 and the residual adhesive 112a and at the interface between the residual adhesive 112a and the layer 56.

Figure 31B:
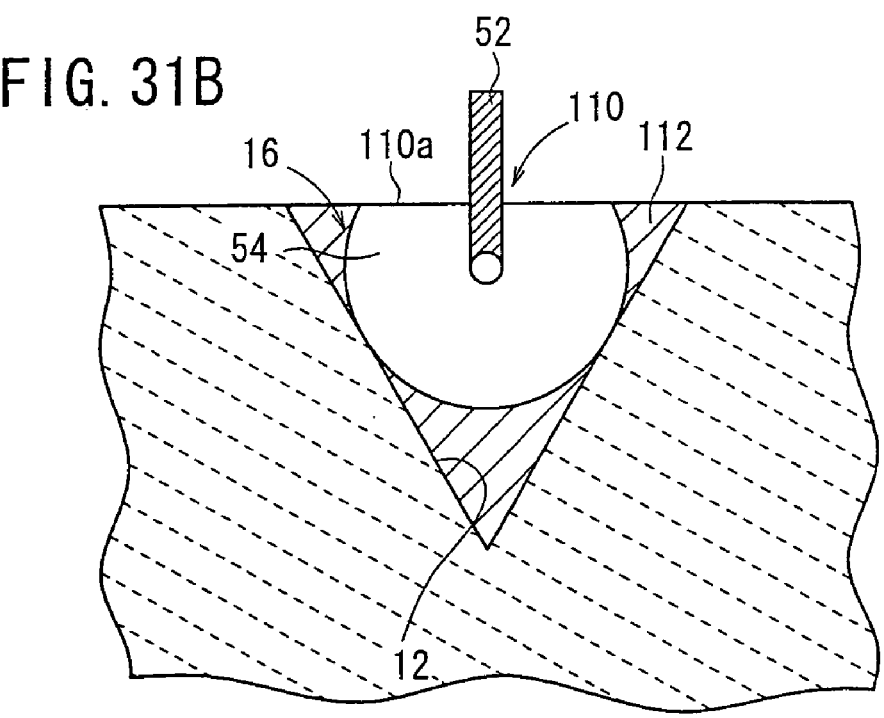
FIG. 31B is a view illustrating the effect by the recess.
Figure 32A:
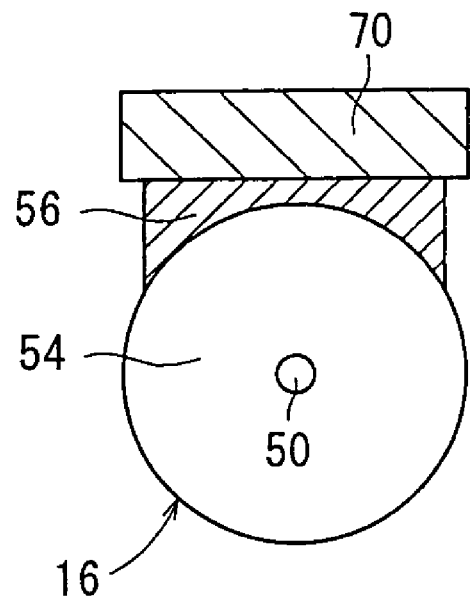
FIG. 32A is a view illustrating the influence exerted when a index matching layer is formed on a cylindrical optical fiber.
Figure 32B:
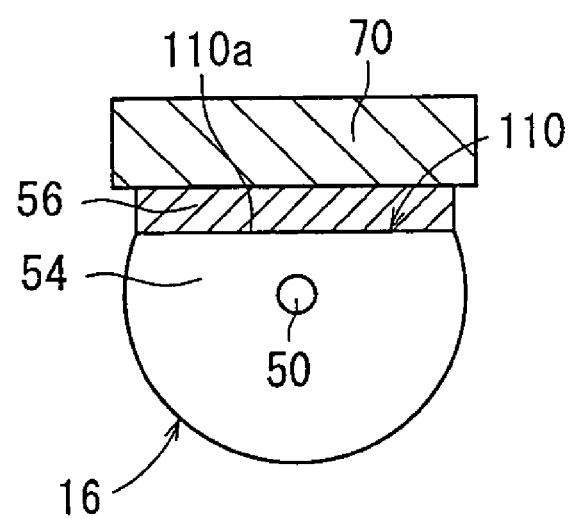
FIG. 32B is a view illustrating the effect brought about by the recess.

On the other hand, in the eleventh and twelfth embodiments, the recess 110 is formed on the clad 54 by means of the cutting of the clad 54. Therefore, as shown in FIG. 31B, no adhesive 112 remains on the bottom surface 110a of the recess 110. Accordingly, even when the photodetectors 70 are mounted on the bottom surface 110a of the recess 110 with the layer 56 intervening therebetween, the loss of the reflected light 52 is not caused, which would be otherwise caused by the adhesive 112.

Fourthly, the light can be stably received by the photodetectors 70 even in the case of any thermal fluctuation. That is, when the recess 110 is formed by means of the cutting, the portion (bottom surface 110a of the recess 110), on which the photodetectors 70 are mounted, has the structure provided with the flat surface.

Therefore, for example, when the photodetectors 70 are mounted on the bottom surface 110a of the recess 110 with the layer 56 intervening therebetween as shown in FIGS. 26 and 29, or when a waveguide member 120 is mounted on the bottom surface of the recess 110 with a first layer 56 intervening therebetween and the photodetectors 70 are mounted on the waveguide member 120 with a second layer 94 intervening therebetween (see FIGS. 36 and 37) as described later on, then the layer 56 (first layer), which is provided on the bottom surface 110a of the recess 110, is successfully has a uniform thickness on the bottom surface 110a of the recess 110.

Usually, when the photodetectors 70 are mounted on the columnar optical fibers 16 with the layer 56 intervening therebetween, the installation is effected while maintaining the light-receiving surface of the photodetectors 70 to be substantially horizontal. The attention is now directed to the center line of the light-receiving surface of the photodetectors 70 (line extending along the optical axis of the optical fibers 16). The larger the distance from the center line to the left or the right is, the thicker the thickness of the layer 56 is. The adhesive, which is used as the layer 56, has a large coefficient of thermal expansion of 200 to $300 \times 10^{-7}$ [1/° C.]. Therefore, if the thickness of the adhesive to be used as the layer 56 is nonuniform, any nonuniform stress brought about by the thermal fluctuation is not negligible in some cases. In such a state of the nonuniform stress, it is assumed that the refractive index distribution is also nonuniform in some cases.

This problem can be also avoided, for example, by means of the curing condition (method) for the adhesive. However, one of the effective means includes the formation of the recess 110 on the clad 54 by means of the cutting as in the optical devices 10K and 10L according to the eleventh and twelfth embodiments described above so that the thickness of the adhesive to be used as the layer 56 is uniform.

Other preferred embodiments will now be explained. The position for performing the cutting is not specifically limited. However, it is preferable to use a position at which the distance from the core end surface of the reflecting section 60 to the light-receiving center of the photodetectors 70 is within a range of 5 mm, for the following reason. That is, if the light-receiving position is separated far from the reflecting section, the power in photodetecting of the reflection monitoring light is attenuated.

It is desirable that the cutting amount is 21 µm at the minimum and 55 µm at the maximum from the upper of the rear fiber 16A in the case of a single mode fiber having a diameter of 125 am.

As for the minimum value of the cutting amount, it is considered that the influence of the factor of loss is not exerted when the spot diameter of the reflected light 52 is about 10 µm. Therefore, in the case of a fiber having a diameter of 125 µm, the cutting amount is preferably 21 µm at the minimum so that the width of the bottom surface 110a of the recess 110 is 10 µm at the minimum.

The leakage light, which is brought about by the total reflection in the core 50, exists in a surrounding area of about 2 µm around the core 50 of the optical fibers 16. If the cutting is performed up to this range, the signal light, which is transmitted through the core 50, is split, resulting in the factor of loss of the signal light. Therefore, it is preferable that the maximum value of the cutting does not range to the range of the leakage light. For example, in the case of a single mode fiber having a diameter of 125 µm, the cutting can be performed up to 55 µm.

Next, several forms (specified embodiments) for mounting the photodetectors 70 on the recess 110 will be explained in relation to the optical devices 10K and 10L according to the eleventh and twelfth embodiments.

Figure 34:
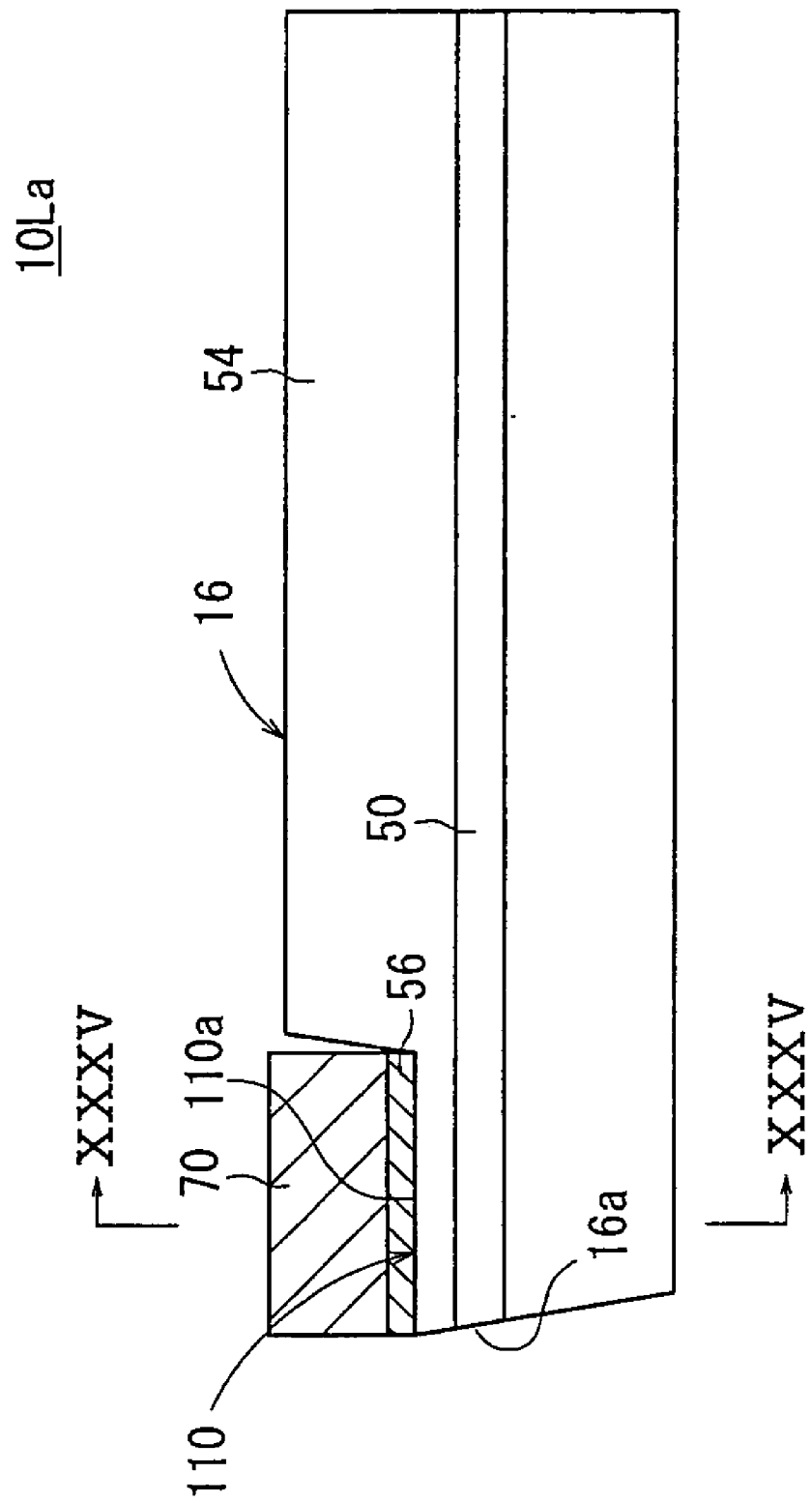
FIG. 34 is a sectional view illustrating a first specified embodiment of the optical device according to the twelfth embodiment as viewed from the side.
Figure 35:
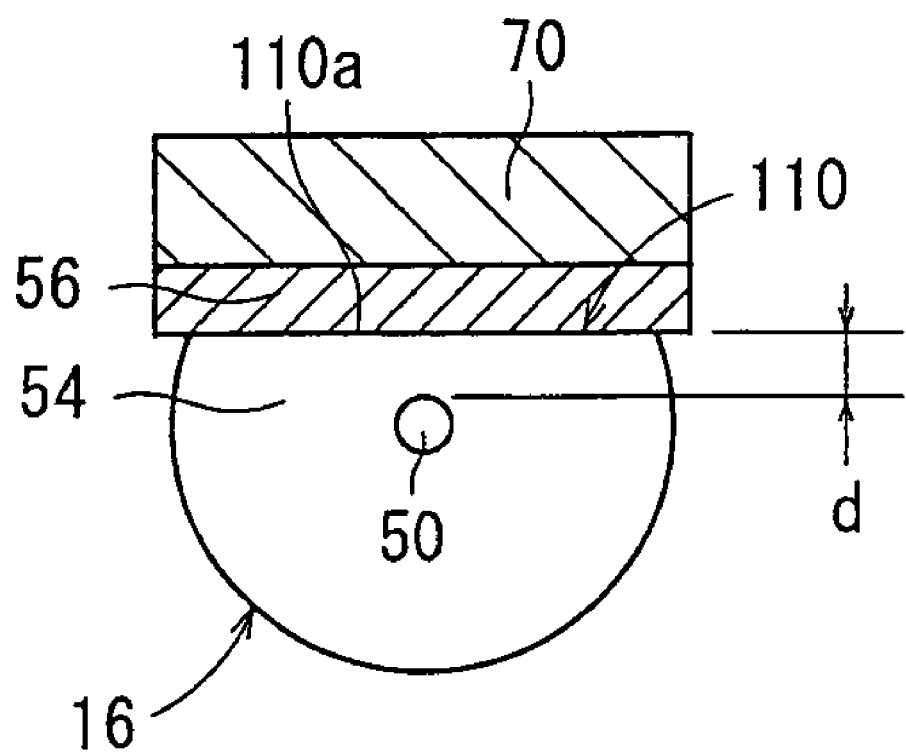
FIG. 35 is a sectional view along a line XXXV—XXXV shown in FIGS. 33 and 34.

At first, as shown in FIGS. 33 to 35, optical devices 10Ka and 10La according to a first specified embodiment include the installation of the photodetectors 70 on the bottom surface 110a of the recess 110 with the layer 56 intervening therebetween. In this case, it is preferable that the shortest distance d from the core 50 to the bottom surface 110a of the recess 110 is 2 µm or more, and the thickness t of the layer 56 is less than 3 µm.

Figure 36:
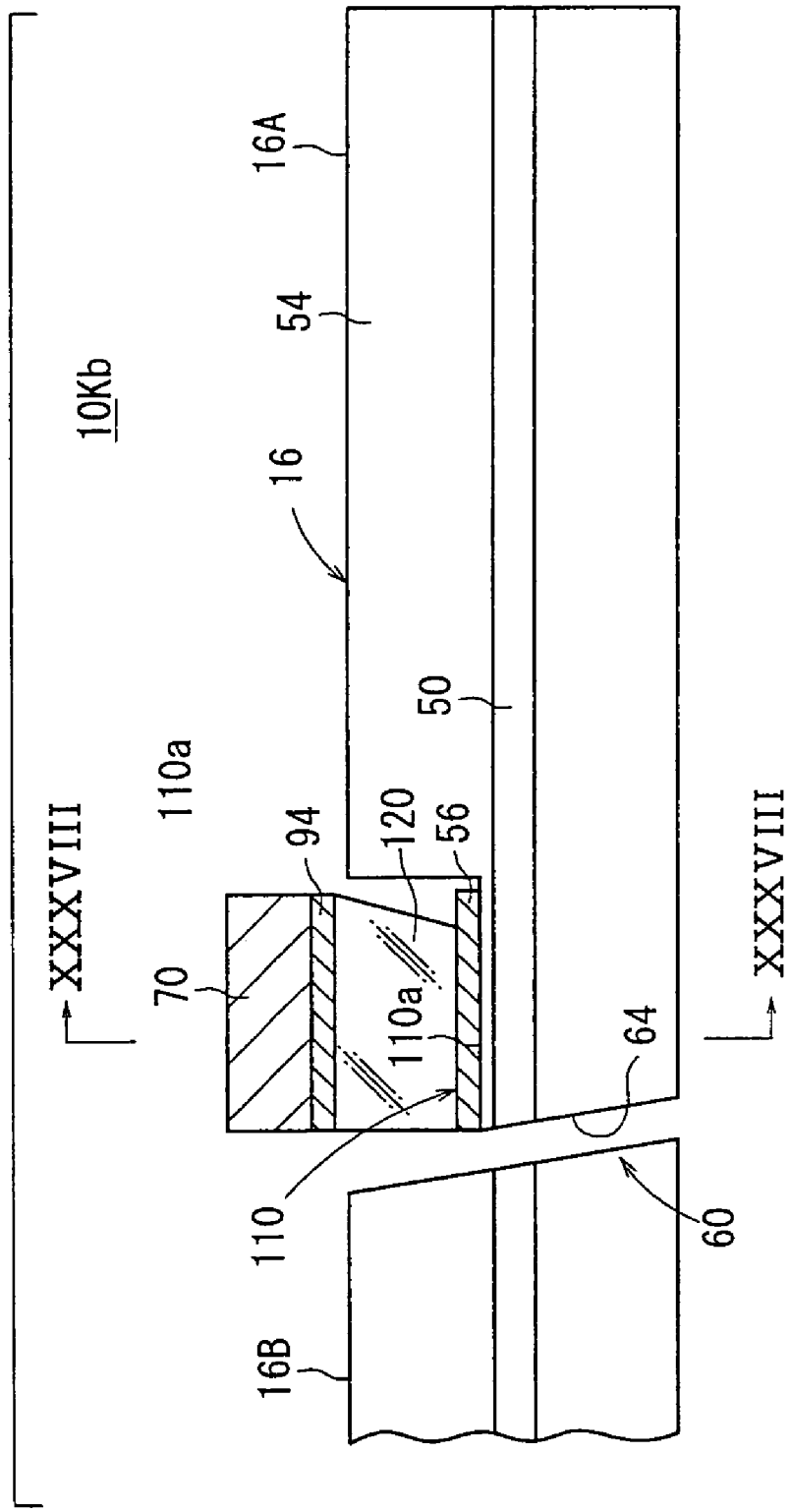
FIG. 36 is a sectional view illustrating a second specified embodiment of the optical device according to the eleventh embodiment as viewed from a side position.
Figure 37:
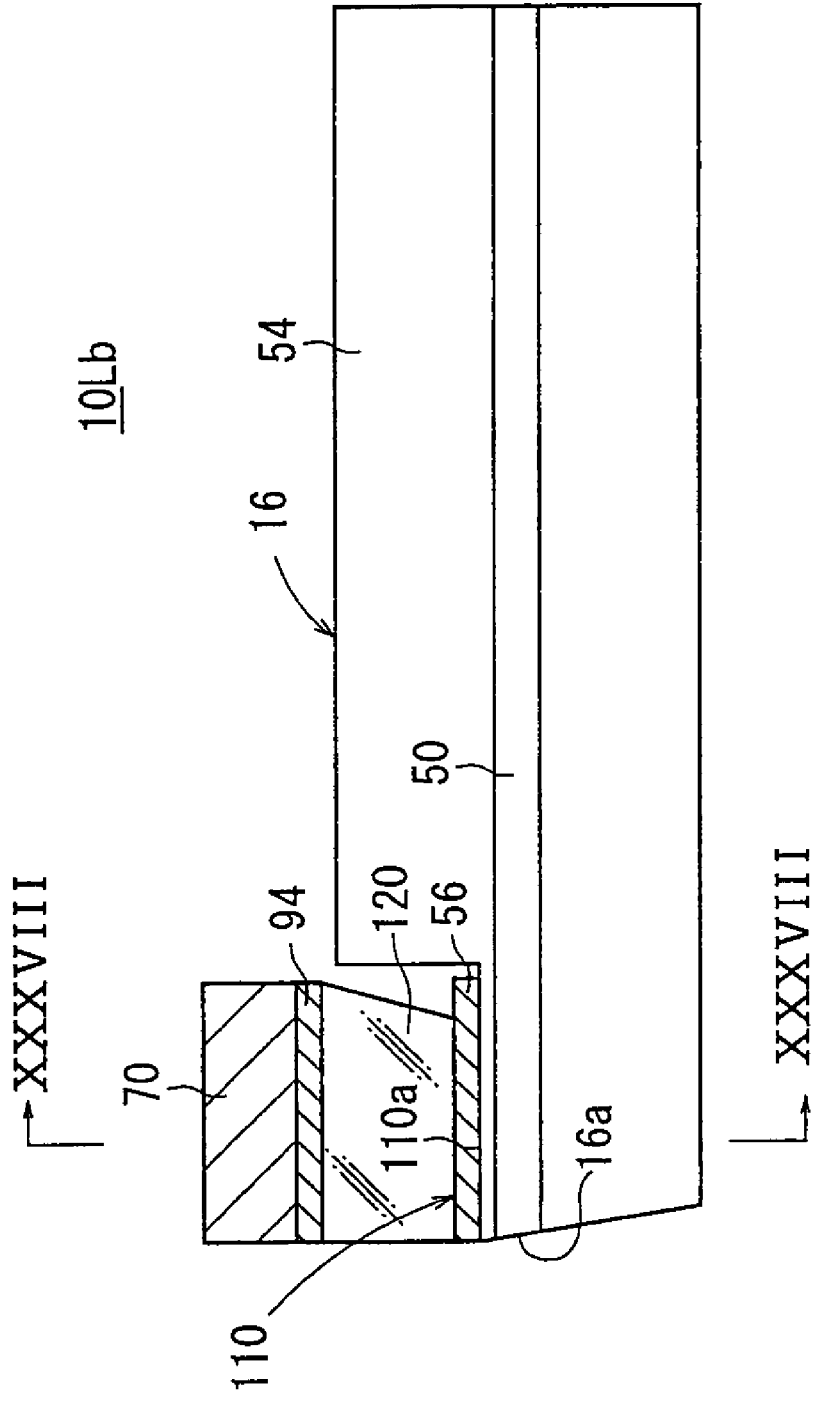
FIG. 37 is a sectional view illustrating a second specified embodiment of the optical device according to the twelfth embodiment as viewed from the side.
Figure 38:
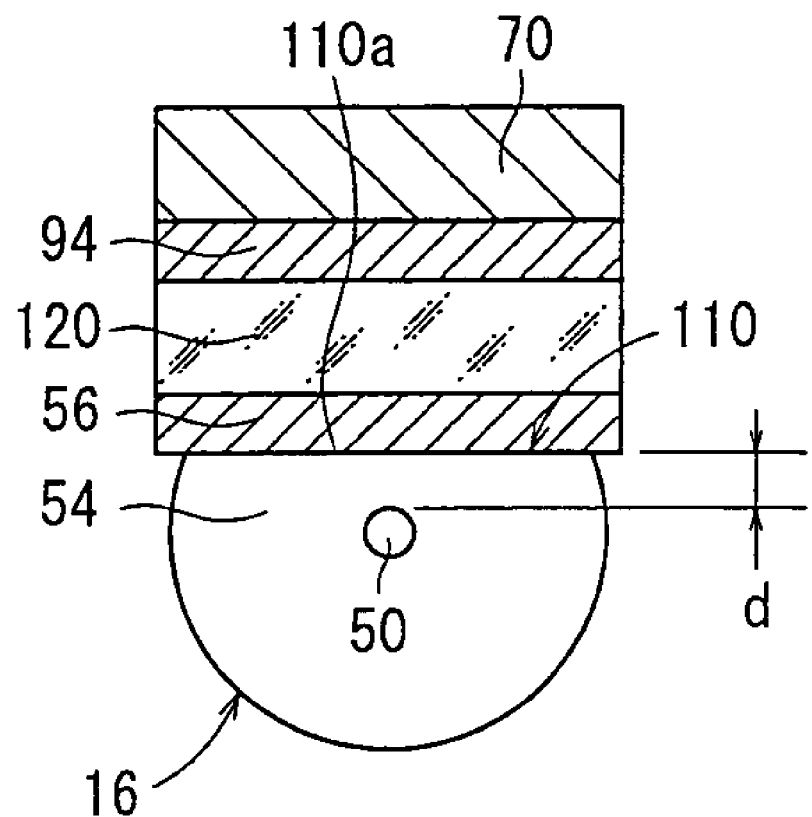
FIG. 38 is a sectional view along a line XXXVIII—XXXVIII shown in FIGS. 36 and 37.

Next, as shown in FIGS. 36 to 38, in optical devices 10Kb and 10Lb according to a second specified embodiment, the waveguide member 120 is mounted on the bottom surface 110a of the recess 110 with the first layer 56 intervening therebetween, and the photodetectors 70 are mounted on the waveguide member 120 with the second layer 94 intervening therebetween. Glass or high molecular weight material may be exemplified as the waveguide member 120.

The optical devices 10Kb and 10Lb according to the second specified embodiment are preferred when the cutting is performed up to a position in the vicinity of the core 50 to form the recess 110. That is, the form of light transmission through the waveguide path such as the optical fibers 16 are determined by the effective refractive index thereof. When the substance such as the photodetectors 70 having a large refractive index is arranged in the vicinity of the core 50, the form of light transmission through the core 50 is affected in some cases. The waveguide member 120, which is composed of glass or high molecular weight material, may be arranged just on the recess 110 with the layer 56 intervening therebetween as illustrated in the second specified embodiment to such an influence.

Figure 39:
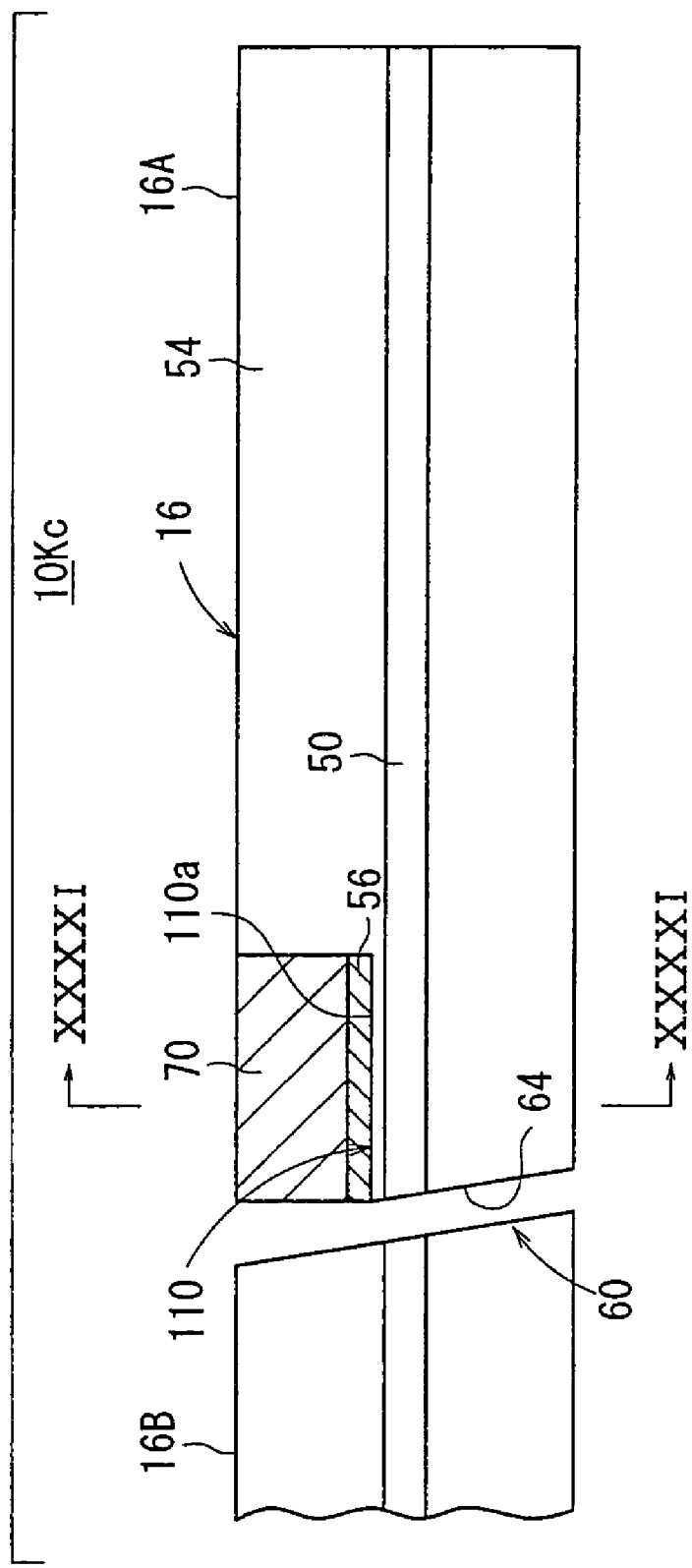
FIG. 39 is a sectional view illustrating a third specified embodiment of the optical device according to the eleventh embodiment as viewed from a side position.
Figure 40:
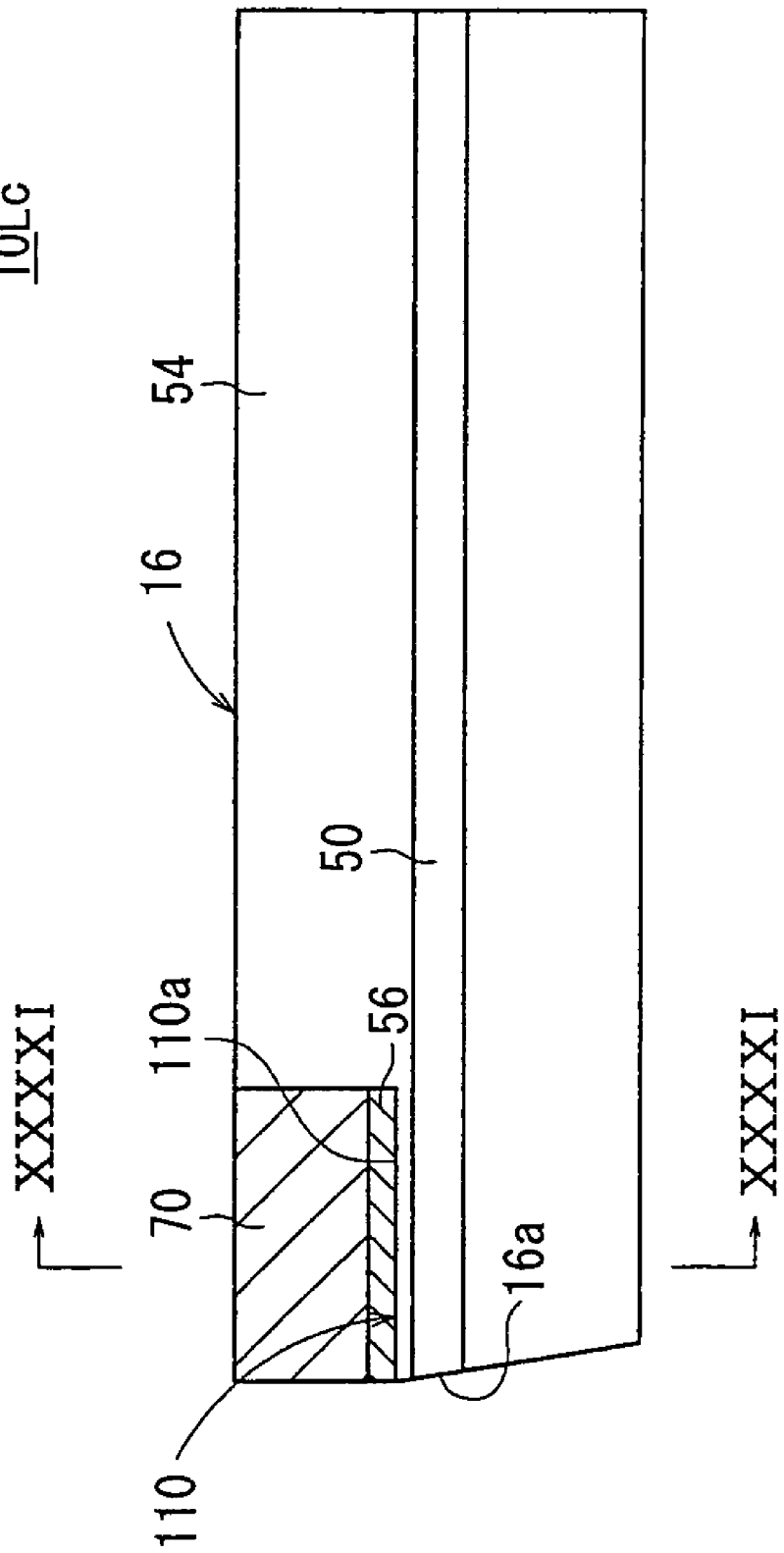
FIG. 40 is a sectional view illustrating a third specified embodiment of the optical device according to the twelfth embodiment as viewed from the side.
Figure 41:
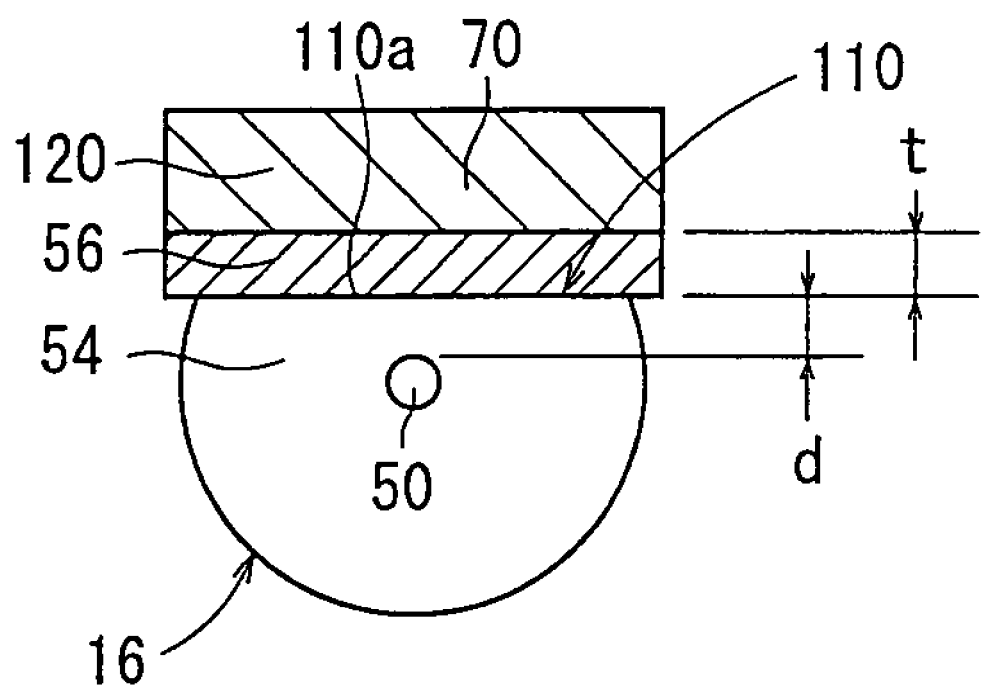
FIG. 41 is a sectional view along a line XXXXI—XXXXI shown in FIGS. 39 and 40.
Figure 42:
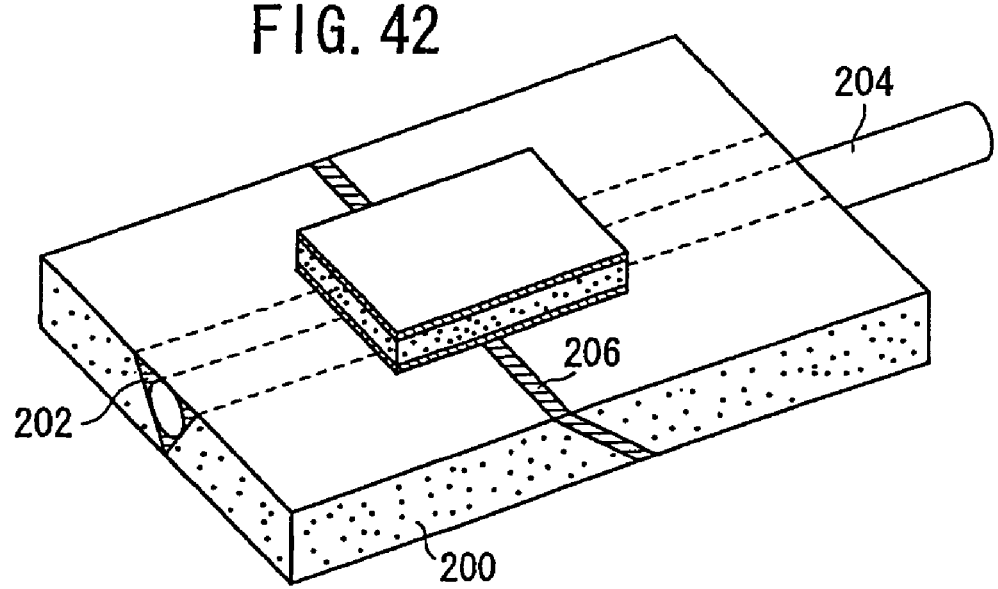
FIG. 42 is a perspective view illustrating a conventional monitor device.
Figure 43:
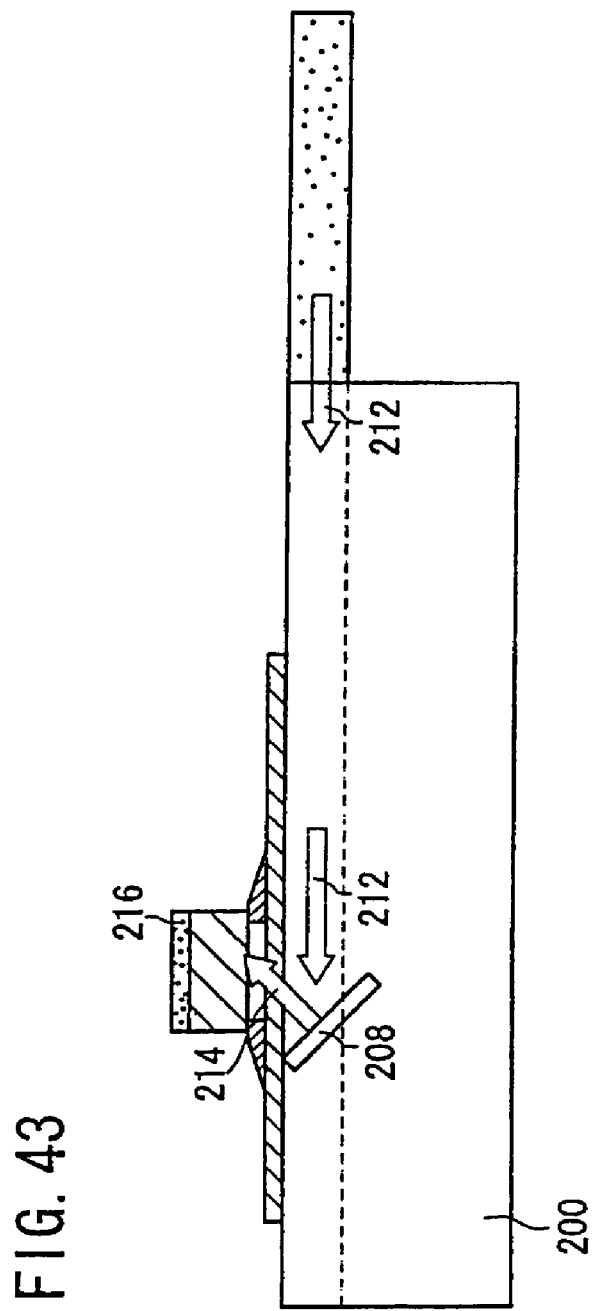
FIG. 43 is a sectional view illustrating the conventional monitor device as viewed from a side position.
Figure 44:
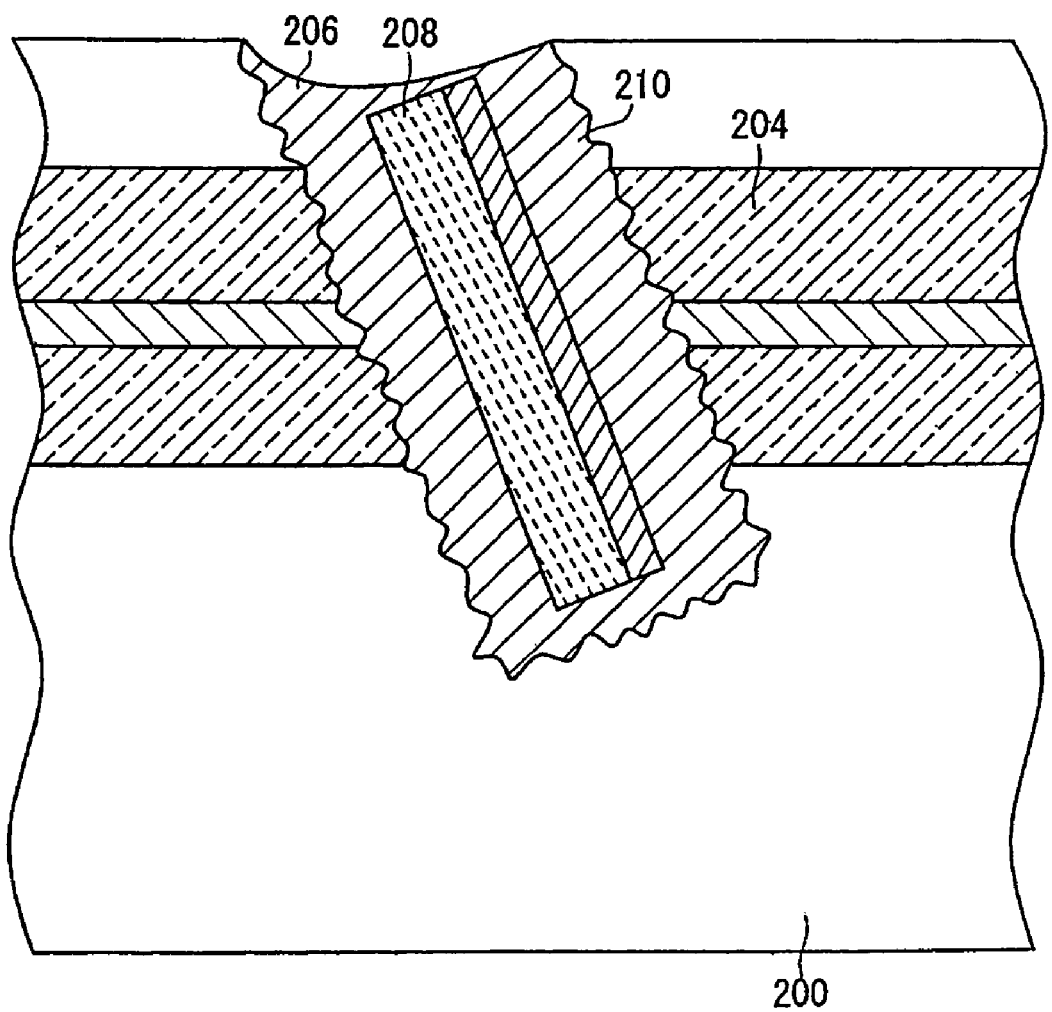
FIG. 44 is a magnified view illustrating a portion of a parallel groove of the conventional monitor device.
Figure 45:
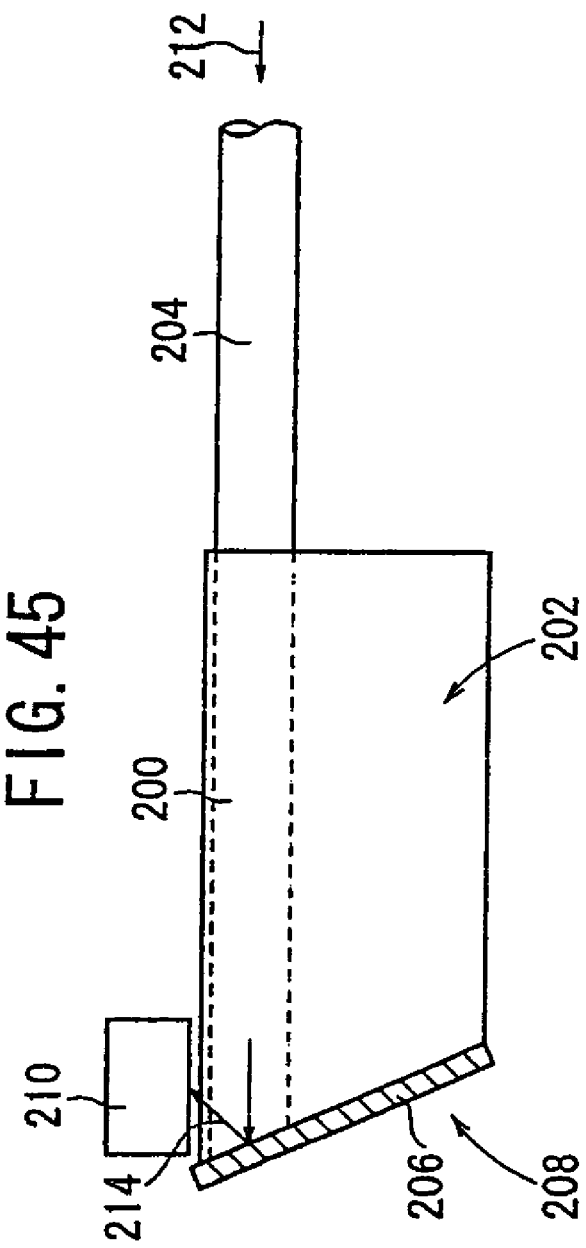
FIG. 45 is a perspective view illustrating the structure the another conventional exemplary monitor device.

Next, optical devices 10Kc and 10Lc according to a third specified embodiment as shown in FIGS. 39 to 41 are constructed in approximately the same manner as the optical devices 10Ka and 10La according to the first specified embodiment described above. However, the optical devices 10Kc and 10Lc differ in that the thickness t of the layer 56 is 3 µm or more. The third specified embodiment is effective when it is intended to eliminate any fear of the influence exerted when the photodetectors 70 are mounted in the vicinity of the core 50 and when it is difficult to install the waveguide member 120 as illustrated in the second specified embodiment.

In the optical devices 10Ka to 10Kc and 10La to 10Lc according to the specified embodiments as described above, the layer 56 is interposed between the recess 110 and the photodetectors 70 or between the recess 110 and the waveguide member 120. However, in these cases, it is pointed out that the adhesive, which functions as the layer 56, is used. In general, it is not easy to control the thickness of the adhesive, and especially control the thickness to be thin. However, it is easy to thicken the thickness of the adhesive. Therefore, the optical devices 10Kc and 10Lc according to the third specified embodiment are also advantageous to simplify the production.

In the optical device 10L acording to the twelfth embodiment as described above and the optical devices 10La to 10Lc according to the first to third specified embodiment corresponding to the optical device 10L, when another optical part 140 (see FIGS. 17 and 23) is joined to the end surface 16a of the optical fiber 16 by the UV-curable adhesive 132, then the ultraviolet light is radiated in a direction toward the end surface 16a of the optical fiber 16 (see the arrow A) from a position over the optical part 140 for the portion disposed higher than the core 50 of the optical fiber 16 in a manner similar to the optical devices 10G and 10J according to the seventh and tenth embodiments as described above. Further, for the portion disposed lower than the core 50 of the optical fiber 16, the ultraviolet light is radiated in a direction toward the end surface 16a of the optical fiber 16 (see the arrow B) from the back side of the base 14 in the same manner as in the optical device 10C according to the third embodiment described above. By doing so, it is possible to cure the UV-curable adhesive 132 between the end surface 16a of the optical fiber 16 and the optical part 140.

It is a matter of course that the optical device and the method of producing the same according to the present invention are not limited to the embodiments described above, which may be embodied in other various forms without deviating from the gist or essential characteristics of the present invention.

What is claimed is:

1. An optical device having a structure wherein a reflected light, which is acquired by a refractive index difference, is obtained through an index matching layer from an intermediate position of one or more optical fibers to the outside of a clad of said one or more optical fibers.

2. The optical device according to claim 1, wherein said intermediate position in said one or more optical fibers is a portion at which a core of said one or wore optical fibers is cut out, a layer is provided in said portion cut out and a relative index difference between said layer and said one or more optical fibers is 10% or more.

3. The optical device according to claim 2, wherein said portion cut out is formed by a slit which extends from a surface of said clad to said core.

4. The optical device according to claim 1, further comprising a substrate including one or more V-grooves for housing each of said one or more optical fibers; and a photodetector mounted at a portion of said one or more optical fibers from which said reflected light is obtained, wherein said photodetector is mounted on a wiring board supported by said substrate.

5. The optical device according to claim 4, wherein said substrate has side walls which project in an upper direction of said substrate and in parallel to said one or more V-grooves on both sides of a portion at which said one or more V-grooves are formed; and said wiring board is disposed on upper surfaces of said side walls so that said photodetector is opposite to said one or more optical fibers.

6. The optical device according to claim 1, wherein a refractive index-adjusting layer is formed at least on a portion of a surface of said optical fiber from which said reflected light is split.

7. The optical device according to claim 1, wherein a top of said one or more optical fibers is located at a position higher than an upper surface of one or more V-grooves when said one or more optical fibers are fixed on said one or more V-grooves; and a depth ranging from said upper surface of said one or more V-grooves to a bottom of a portion at which a core of said one or more optical fibers is cut out is 100 μm or less.

8. The optical device according to claim 1, wherein a recess is formed on said clad of said one or more optical fibers; and a photodetector is mourned on said recess.

9. The optical device according to claim 1, wherein an angle formed by said reflected light with respect to an optical axis of said one or more optical fibers is a total reflection angle at an interface of said clad when said index matching layer is not provided.

10. An optical device comprising:

one or more optical fibers, an end surface of each of which has a reflecting function;

an optical element which is installed at a position outside a clad of said optical fiber in communication with an optical pat of a reflected light generated by said reflecting function; and a total reflection plane provided inside or outside said clad, wherein said total reflection plane shortens said optical path of said reflected light and adjusts said reflected light to come into said optical element at a desired angle.

11. The optical device according to claim 10, further comprising a portion at which a core of said one or more optical fibers is cut out and formed by a slit which extends from a surface of said clad to said core.

12. The optical device according to claim 11, wherein a top of said one or more optical fibers is located at a position higher than an upper surface of one or more V-grooves when said one or more optical fibers are fixed on said one or more V-grooves; and a depth ranging from said upper surface of said one or more V-grooves to a bottom of said portion cut out is 100 μm or less.

13. The optical device according to claim 10, wherein a refractive index-adjusting layer is formed at least on a portion of a surface of said optical fiber from which said reflected light is split, and said total reflection plane is installed outside said optical fiber and changes said optical path of said reflected light split through said refractive index-adjusting layer, a member, into which said reflected light comes through said refractive index-adjusting layer and which has a refractive index higher than that of an air layer, is installed on said optical fiber, and said total reflection plane is constituted by an interface between said member and said air layer.

14. The optical device according to claim 10,
wherein a refractive index-adjusting layer is formed at least on a portion of a surface of said optical fiber from which said reflected light is split, and
said total reflection plane has a waveguide member which is installed outside said optical fiber and which waveguides said reflected light to come through said refractive index-adjusting layer to said optical element.

15. An optical device provided with a waveguide path of another optical part, said waveguide path being disposed at least on a core end surface of each of one or more optical fibers, an air layer being interposed between said waveguide path and the core end surface, wherein said optical fibers are supported by a substrate having upwardly extending sidewalls and said optical device is mounted on a base member that is supported by said sidewalls.

16. The optical device according to claim 15, wherein said substrate has one or more V-grooves formed thereon for placing said one or more optical fibers thereon.

17. The optical device according to claim 15, wherein said substrate has one or more V-grooves formed thereon for placing said one or more optical fibers thereon, and
wherein a portion of an end surface of said substrate except for at least said core end surface of each of said one or more optical fibers and said other optical part are fixed by a securing member.

18. A method of producing an optical device comprising the steps of:
fixing one or more optical fibers on one or more V-grooves of a substrate;
applying an adhesive as an index matching layer to a part of a surface of said one or more optical fibers; and
forming a slit in a part of said one or more optical fibers so that said slit cuts at least a core of the optical fibers.

19. The method of producing said optical device according to claim 18, further comprising the step of positioning a photodetector on said adhesive to be used as said index matching layer or on a second adhesive.

20. The method of producing said optical device according to claim 19, wherein
said step of positioning said photodetector is performed such that upper surfaces of side walls which project in an upper direction of said substrate and in parallel to said one or more V-grooves on both sides of a portion at which said one or more V-grooves are formed are hardened with an adhesive, and then a wiring board, on which said photodetector is previously mounted, is placed on said upper surfaces of said side walls so that said photodetector is opposite to said one or more optical fibers.

21. The method of producing said optical device according to claim 18, wherein said adhesive, which is used as said index matching layer, is applied to said part of said surface of said one or more optical fibers by placing a temporary plate on said one or more optical fibers fixed on said one or more V-grooves and supplying said adhesive to a space between said temporary plate and said substrate, and then said temporary plate is removed.

* * * * *

UNITED STATES PATENT AND TRADEMARK OFFICE
CERTIFICATE OF CORRECTION

PATENT NO.        : 7,123,798 B2
APPLICATION NO. : 10/396734
DATED             : October 17, 2006
INVENTOR(S)       : Masashi Fukuyama and Akiyoshi Ide It is certified that error appears in the above-identified patent and that said Letters Patent is hereby corrected as shown below:

<u>Column 43</u>

*Line 51*: please change "wore" to --more--

<u>Column 44</u>

*Line 33*: please change "pat" to --path--

Signed and Sealed this

Twenty-sixth Day of December, 2006

JON W. DUDAS
*Director of the United States Patent and Trademark Office*